United States Patent
Chandler, Jr. et al.

(10) Patent No.: US 12,451,561 B2
(45) Date of Patent: Oct. 21, 2025

(54) ELECTRODE ASSEMBLY STRUCTURE, SECONDARY BATTERY, AND METHODS OF MANUFACTURE

(71) Applicant: Enovix Corporation, Fremont, CA (US)

(72) Inventors: William H. Chandler, Jr., Milpitas, CA (US); Robert S. Busacca, Oakland, CA (US); Bruno A. Valdes, Sunnyvale, CA (US); Kim Han Lee, Pleasanton, CA (US); Anthony Calcaterra, Milpitas, CA (US); Miles A. M. Kool, San Francisco, CA (US); Robert Kinchen, Fremont, CA (US)

(73) Assignee: Enovix Corporation, Fremont, CA (US)

( * ) Notice: Subject to any disclaimer, the term of this patent is extended or adjusted under 35 U.S.C. 154(b) by 0 days.

(21) Appl. No.: 18/235,180

(22) Filed: Aug. 17, 2023

(65) Prior Publication Data
US 2023/0395935 A1   Dec. 7, 2023

Related U.S. Application Data

(63) Continuation of application No. 17/977,728, filed on Oct. 31, 2022, now Pat. No. 11,777,174, which is a
(Continued)

(51) Int. Cl.
*H01M 50/403* (2021.01)
*H01M 50/204* (2021.01)
*H01M 50/289* (2021.01)

(52) U.S. Cl.
CPC ....... *H01M 50/403* (2021.01); *H01M 50/204* (2021.01); *H01M 50/289* (2021.01)

(58) Field of Classification Search
CPC .......... H01M 50/264; H01M 10/0481; H01M 10/0468
See application file for complete search history.

(56) References Cited

U.S. PATENT DOCUMENTS

| 3,563,805 A | 2/1971 | Deierhoi, Jr. |
| 5,350,645 A | 9/1994 | Lake et al. |

(Continued)

FOREIGN PATENT DOCUMENTS

| WO | WO-2018115016 A1 * | 6/2018 | ........ H01M 10/0525 |
| WO | 2022/212436 A1 | 10/2022 | |
| WO | 2022/221056 A2 | 10/2022 | |

OTHER PUBLICATIONS

Machine translation of WO2018115016 (Year: 2018).*
(Continued)

*Primary Examiner* — Maria Laios
(74) *Attorney, Agent, or Firm* — Haley Guiliano LLP; Ronit Buller

(57) ABSTRACT

A method for manufacturing a structure comprising and electrode assembly having a porous electrically insulating material, and first and second endplates, is provided. The electrode assembly comprises a population of unit cells stacked in series in a stacking direction, opposing first and second longitudinal end surfaces separated along the stacking direction. First and second endplates are separated in the stacking direction and overlie the first and second longitudinal end surfaces. According to embodiments of the structure, (i) each unit cell comprises an electrode structure, a counter-electrode structure, and an electrically insulating separator between the electrode and counter-electrode structures, (ii) the electrode structures, counter-electrode structures and electrically insulating separators within each unit cell have opposing first and second vertical end surfaces separated in a vertical direction, and (iii) the vertical direc-
(Continued)

tion is orthogonal to the stacking direction. The method comprises providing a porous electrically insulating material to the electrode assembly using a stencil.

20 Claims, 17 Drawing Sheets

Related U.S. Application Data continuation of application No. PCT/US2022/022445, filed on Mar. 30, 2022.

(60) Provisional application No. 63/168,638, filed on Mar. 31, 2021, provisional application No. 63/293,272, filed on Dec. 23, 2021, provisional application No. 63/293,391, filed on Dec. 23, 2021, provisional application No. 63/168,454, filed on Mar. 31, 2021.

(56) References Cited

U.S. PATENT DOCUMENTS

| | | | |
|---|---|---|---|
| 8,927,128 B2* | 1/2015 | Kuroda | H01M 50/209 429/82 |
| 9,225,035 B1* | 12/2015 | Werre | H01M 50/516 |
| 10,177,400 B2 | 1/2019 | Busacca et al. | |
| 10,770,760 B2 | 9/2020 | Castledine et al. | |
| 11,128,020 B2 | 9/2021 | Busacca et al. | |
| 11,777,174 B1 | 10/2023 | Chandler, Jr. et al. | |
| 2006/0035152 A1* | 2/2006 | Nishimura | H01M 10/0431 429/234 |
| 2007/0026306 A1 | 2/2007 | Lee et al. | |
| 2007/0052390 A1* | 3/2007 | Kim | B60L 50/52 320/116 |
| 2009/0155678 A1 | 6/2009 | Less et al. | |
| 2010/0086843 A1* | 4/2010 | Kawai | H01M 4/661 429/163 |
| 2017/0279113 A1 | 9/2017 | Ohsawa et al. | |
| 2017/0352850 A1 | 12/2017 | Nagane et al. | |
| 2019/0341589 A1* | 11/2019 | Kato | H01M 50/264 |
| 2020/0152348 A1 | 5/2020 | Ota et al. | |
| 2020/0350633 A1 | 11/2020 | Busacca et al. | |
| 2024/0178521 A1 | 5/2024 | Singh et al. | |
| 2024/0186589 A1 | 6/2024 | Rosen et al. | |

OTHER PUBLICATIONS

Machine translation of WO2018115016 printed May 5, 2023 (Year: 2018).

Patent Cooperation Treaty, International Search Report and Written Option for PCT/US2022/022445, 7 pages Jul. 6, 2022.

* cited by examiner

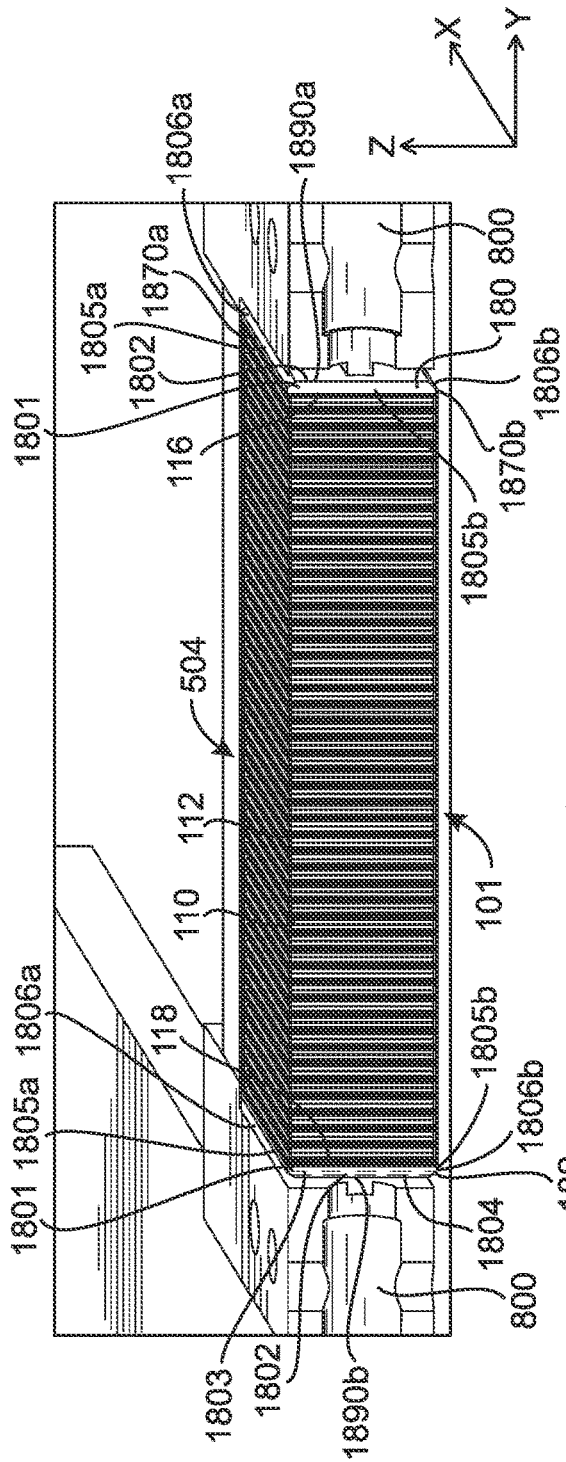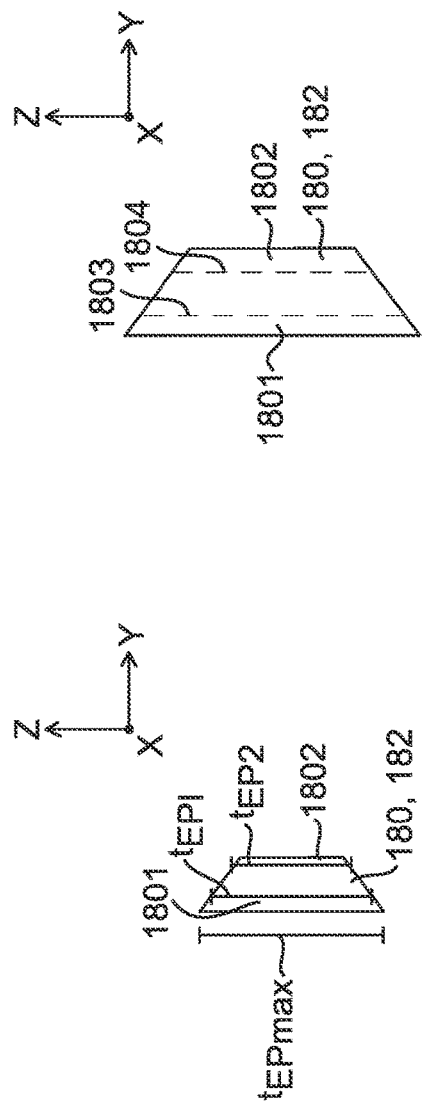

ELECTRODE ASSEMBLY STRUCTURE, SECONDARY BATTERY, AND METHODS OF MANUFACTURE

CROSS REFERENCE TO RELATED APPLICATIONS

This is a continuation of U.S. application Ser. No. 17/977,728, filed on Oct. 31, 2022, which claims priority as a continuation of PCT Patent Application Serial No. PCT/US2022/022445, filed on Mar. 30, 2022, which claims priority to U.S. Provisional Patent Application Ser. No. 63/293,272, filed on Dec. 23, 2021, U.S. Provisional Patent Application Ser. No. 63/293,391, filed on Dec. 23, 2021, U.S. Provisional Patent Application Ser. No. 63/168,638, filed on Mar. 31, 2021, and U.S. Provisional Patent Application Ser. No. 63/168,454, filed on Mar. 31, 2021, each of which applications are hereby incorporated by reference herein in their entireties.

FIELD OF THE INVENTION

This disclosure generally relates to methods and structures such as electrode assemblies for use in energy storage devices such as secondary batteries, to energy storage devices employing such structures, and to methods for manufacturing such structures and energy devices.

BACKGROUND

Rocking chair or insertion secondary batteries are a type of energy storage device in which carrier ions, such as lithium, sodium, potassium, calcium or magnesium ions, move between a positive electrode and a negative electrode through an electrolyte, such as a solid or liquid electrolyte. The secondary battery may comprise a single battery cell, or two or more battery cells that have been electrically coupled to form the battery, with each battery cell comprising a positive electrode, a negative electrode, an electrically insulating separator, and an electrolyte. In solid state secondary batteries, a single solid state material can serve as both the electrically insulating separator and the electrolyte.

In rocking chair battery cells, both the positive and negative electrodes comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

However, as a part of this carrier ion extraction and insertion process that occurs during charging and/or discharging of the secondary battery, at least a portion of the carrier ions can be irreversibly lost to the electrochemical reaction. For example, a decomposition product comprising lithium (or other carrier ions) and electrolyte components, known as solid electrolyte interphase (SEI) can forms on the surfaces of the negative electrodes. The formation of this SEI layer traps carrier ions and removes them from the cyclic operation of the secondary battery, and leading to irreversible capacity loss. Other chemical and electrochemical process in the electrode assembly can also contribute to a loss of carrier ions. Such losses often occur during the initial charging steps performed as a part of the formation process for the secondary batteries, e.g. due to formation of the SEI layer in the initial charging steps, resulting in significantly lower capacities compared to the amount of carrier ion contained in the secondary battery pre-formation.

Methods for the replenishment of electrodes of secondary batteries have been described (see, e.g., U.S. Pat. No. 10,770,760 to Castiedine et al., which is hereby incorporated by reference herein in its entirety). However, there remains a need for new methods and structures for effectively and efficiently providing carrier ions to secondary batteries to replenish lost carrier ions.

Among the various aspects of the present disclosure are methods of manufacturing structures comprising electrode assemblies for energy storage devices such as secondary batteries, fuel cells, and electrochemical capacitors, in which capacity lost as a result of SEI formation and/or mechanical or electrical degradation of the negative electrode and/or the positive electrode may be restored. Advantageously, energy storage devices according to aspects of the present disclosure offer increased cycle life, higher energy density, and/or increased discharge rate.

SUMMARY

Briefly, one aspect of the disclosure relates to a method for manufacturing a structure comprising an electrode assembly and first and second endplates, the electrode assembly comprising a porous electrically insulating material. The electrode assembly comprises a population of unit cells stacked in series in a stacking direction, opposing first and second longitudinal end surfaces separated along the stacking direction, and the first and second endplates are separated in the stacking direction and overlie the first and second longitudinal end surfaces, wherein (i) each unit cell comprises an electrode structure, a counter-electrode structure, and an electrically insulating separator between the electrode and counter-electrode structures, (ii) the electrode structures, counter-electrode structures and electrically insulating separators within each unit cell have opposing first and second vertical end surfaces separated in a vertical direction, and (iii) the vertical direction is orthogonal to the stacking direction. The method comprises providing a porous electrically insulating material to the electrode assembly using a stencil.

Still another aspect of the disclosure relates to a structure comprising an electrode assembly and first and second endplates, the electrode assembly comprising a porous electrically insulating material. The electrode assembly comprises: a population of unit cells stacked in series in a stacking direction, opposing first and second longitudinal end surfaces separated along the stacking direction, and the first and second endplates are separated in the stacking direction and overlie the first and second longitudinal end surfaces, wherein (i) each unit cell comprises an electrode structure, a counter-electrode structure, and an electrically insulating separator between the electrode and counter-electrode structures, (ii) the electrode structures, counter-electrode structures and electrically insulating separators within each unit cell have opposing first and second vertical end surfaces separated in a vertical direction, and (iii) the vertical direction is orthogonal to the stacking direction. According to one aspect, the first and second vertical end surfaces are at least partially covered with a porous electrically insulating material using a stencil.

Other aspects, features and embodiments of the present disclosure will be, in part, discussed and, in part, apparent in the following description and drawings.

BRIEF DESCRIPTION OF THE DRAWING

FIG. 11A is a cross-sectional view of an embodiment of an electrode assembly positioned between a set of bumpers:

FIGS. 11B and 11C are side views of embodiments of an endplate;

Figure 1A:
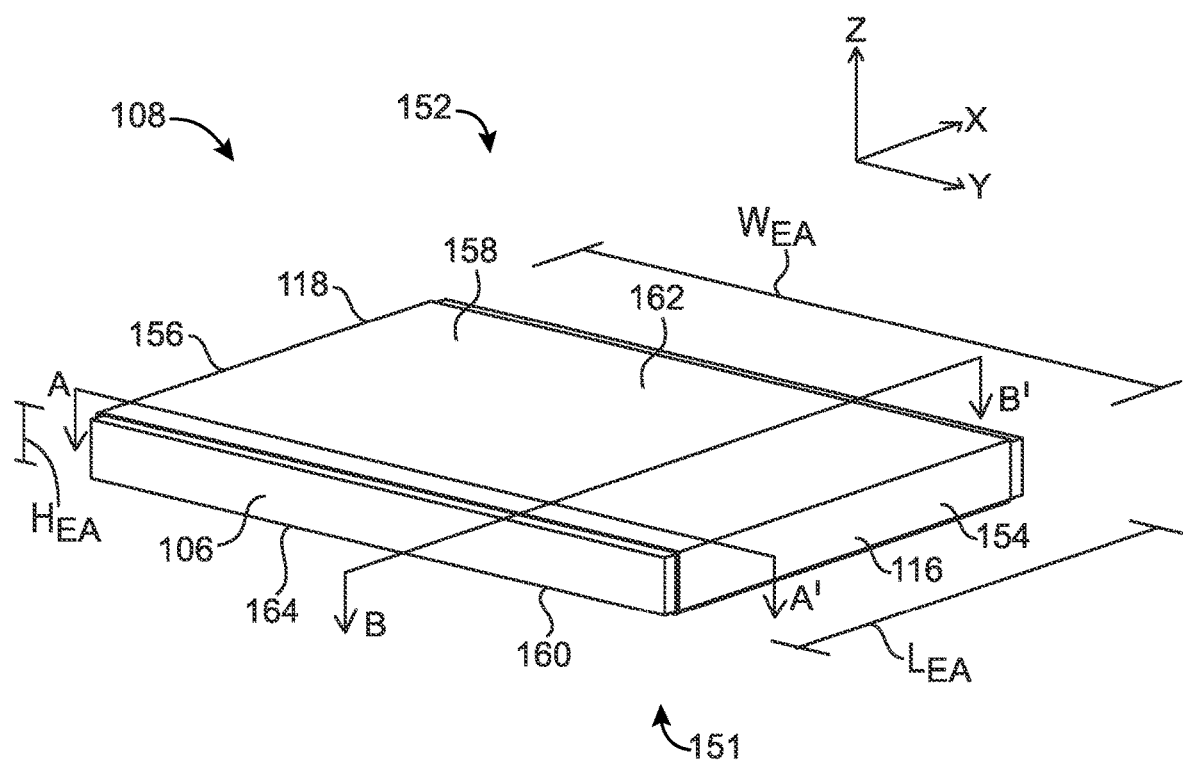
FIG. 1A is a perspective view of one embodiment of an electrode assembly with a set of electrode constraints.

Other aspects, embodiments and features of the inventive subject matter will become apparent from the following detailed description when considered in conjunction with the accompanying drawing. The accompanying figures are schematic and are not intended to be drawn to scale. For purposes of clarity, not every element or component is labeled in every figure, nor is every element or component of each embodiment of the inventive subject matter shown where illustration is not necessary to allow those of ordinary skill in the art to understand the inventive subject matter.

Definitions

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 µm would include 225 µm to 275 µm. By way of further example, in one instance, about 1,000 µm would include 900 µm to 1,100 µm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Charged state" as used herein in the context of the state of a secondary battery refers to a state where the secondary battery is charged to at least 75% of its rated capacity. For example, the battery may be charged to at least 80% of its rated capacity, at least 90% of its rated capacity, and even at least 95% of its rated capacity, such as 100% of its rated capacity.

"C-rate" as used herein refers to a measure of the rate at which a secondary battery is discharged, and is defined as the discharge current divided by the theoretical current draw under which the battery would deliver its nominal rated capacity in one hour. For example, a C-rate of 1 C indicates the discharge current that discharges the battery in one hour, a rate of 2 C indicates the discharge current that discharges the battery in ½ hours, a rate of C/2 indicates the discharge current that discharges the battery in 2 hours, etc.

"Discharged state" as used herein in the context of the state of a secondary battery refers to a state where the secondary battery is discharged to less than 25% of its rated capacity. For example, the battery may be discharged to less than 20% of its rated capacity, such as less than 10% of its rated capacity, and even less than 5% of its rated capacity, such as 0% of its rated capacity.

A "cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

For the term "electrode" as used in "electrode structure" or "electrode active material," it is to be understood that such structure and/or material may in certain embodiments correspond that of a "negative electrode," such as an "anode," as used for example in "negative electrode structure," "anode structure," "negative electrode active material," and "anodically active material." For the term "counter-electrode" as used in "counter-electrode structure" or "counter-electrode active material," it is to be understood that such structure and/or material may in certain embodiments correspond that of a "positive electrode," such as a "cathode," as used for example in "positive electrode structure," "cathode structure," "positive electrode active material," and "cathodically active material." That is, where suitable, any embodiments described for an electrode and/or counter-electrode may correspond to the same embodiments where the electrode and/or counter-electrode are specifically a negative electrode and/or positive electrode, including their corresponding structures and materials, respectively.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the inventive subject matter herein are not limited to the particular axis or axes used to describe three-dimensional orientations of the elements. Alternatively stated, the axes may be interchangeable when referring to three-dimensional aspects of the inventive subject matter.

"Longitudinal direction," "transverse direction," and "vertical direction," as used herein, refer to mutually perpendicular directions (i.e., each are orthogonal to one another). For example, the "longitudinal direction," "transverse direction," and the "vertical direction" as used herein may be generally parallel to the longitudinal axis, transverse axis and vertical axis, respectively, of a Cartesian coordinate system used to define three-dimensional aspects or orientations.

"Feret diameter" as referred to herein with respect to the electrode assembly is defined as the distance between two parallel planes restricting the electrode assembly measured in a direction perpendicular to the two planes. For example, a Feret diameter of the electrode assembly in the longitudinal direction is the distance as measured in the longitudinal direction between two parallel planes restricting the electrode assembly that are perpendicular to the longitudinal direction. As another example, a Feret diameter of the electrode assembly in the transverse direction is the distance as measured in the transverse direction between two parallel planes restricting the electrode assembly that are perpendicular to the transverse direction. As yet another example, a Feret diameter of the electrode assembly in the vertical direction is the distance as measured in the vertical direction between two parallel planes restricting the electrode assembly that are perpendicular to the vertical direction.

"Maximum vertical extent" as used herein with respect to the endplates is defined as the point on either vertical side of the endplate that extends the greatest distance along the vertical axis, in either vertical direction. For example, for an endplate having first and second vertical end surfaces that are separated in the vertical direction, the first maximum vertical extent may be that that point on the first vertical end surface that extends the greatest distance of any points on the first vertical end surface along the vertical axis in a first vertical direction, and the second maximum vertical extent may be that point on the second vertical end surface that extends the greatest distance of any points on the second vertical end surface along the vertical axis in a second vertical direction that is opposite the first vertical direction.

"Repeated cycling" as used herein in the context of cycling between charged and discharged states of the secondary battery refers to cycling more than once from a discharged state to a charged state, or from a charged state to a discharged state. For example, repeated cycling between charged and discharged states can including cycling at least 2 times from a discharged to a charged state, such as in charging from a discharged state to a charged state, discharging back to a discharged state, charging again to a charged state and finally discharging back to the discharged state. As yet another example, repeated cycling between charged and discharged states at least 2 times can include discharging from a charged state to a discharged state, charging back up to a charged state, discharging again to a discharged state and finally charging back up to the charged state By way of further example, repeated cycling between charged and discharged states can include cycling at least 5 times, and even cycling at least 10 times from a discharged to a charged state. By way of further example, the repeated cycling between charged and discharged states can include cycling at least 25, 50, 100, 300, 500 and even 1000 times from a discharged to a charged state.

"Rated capacity" as used herein in the context of a secondary battery refers to the capacity of the secondary battery to deliver a specified current over a period of time, as measured under standard temperature conditions (25° C.). For example, the rated capacity may be measured in units of Amp-hour, either by determining a current output for a specified time, or by determining for a specified current, the time the current can be output, and taking the product of the current and time. For example, for a battery rated 20 Amp·hr, if the current is specified at 2 amperes for the rating, then the battery can be understood to be one that will provide that current output for 10 hours, and conversely if the time is specified at 10 hours for the rating, then the battery can be understood to be one that will output 2 amperes during the 10 hours. In particular, the rated capacity for a secondary battery may be given as the rated capacity at a specified discharge current, such as the C-rate, where the C-rate is a measure of the rate at which the battery is discharged relative to its capacity. For example, a C-rate of 1 C indicates the discharge current that discharges the battery in one hour, 2 C indicates the discharge current that discharges the battery in ½ hours, C/2 indicates the discharge current that discharges the battery in 2 hours, etc. Thus, for example, a battery rated at 20 Amp·hr at a C-rate of 1C would give a discharge current of 20 Amp for 1 hour, whereas a battery rated at 20 Amp·hr at a C-rate of 2C would give a discharge current of 40 Amps for % hour, and a battery rated at 20 Amp·hr at a C-rate of C/2 would give a discharge current of 10 Amps over 2 hours.

"Maximum width" ($W_{EA}$) as used herein in the context of a dimension of an electrode assembly corresponds to the greatest width of the electrode assembly as measured from opposing points of longitudinal end surfaces of the electrode assembly in the longitudinal direction.

"Maximum length" ($L_{EA}$) as used herein in the context of a dimension of an electrode assembly corresponds to the greatest length of the electrode assembly as measured from opposing points of a lateral surface of the electrode assembly in the transverse direction.

"Maximum height" ($H_{EA}$) as used herein in the context of a dimension of an electrode assembly corresponds to the greatest height of the electrode assembly as measured from opposing points of the lateral surface of the electrode assembly in the transverse direction.

DETAILED DESCRIPTION

In general, the present disclosure is directed to an energy storage device 100, such as a secondary battery 102, as shown for example in FIGS. 1A-1D and 2, that cycles between a charged state and a discharged state. The secondary battery 102 includes a battery enclosure 104, an electrode assembly 106, carrier ions, and a non-aqueous liquid electrolyte within the battery enclosure. In certain embodiments, the secondary battery 102 also includes a set of electrode constraints 108 that restrain growth of the electrode assembly 106. The growth of the electrode assembly 106 that is being constrained may be a macroscopic increase in one or more dimensions of the electrode assembly 106.

Figure 3A:
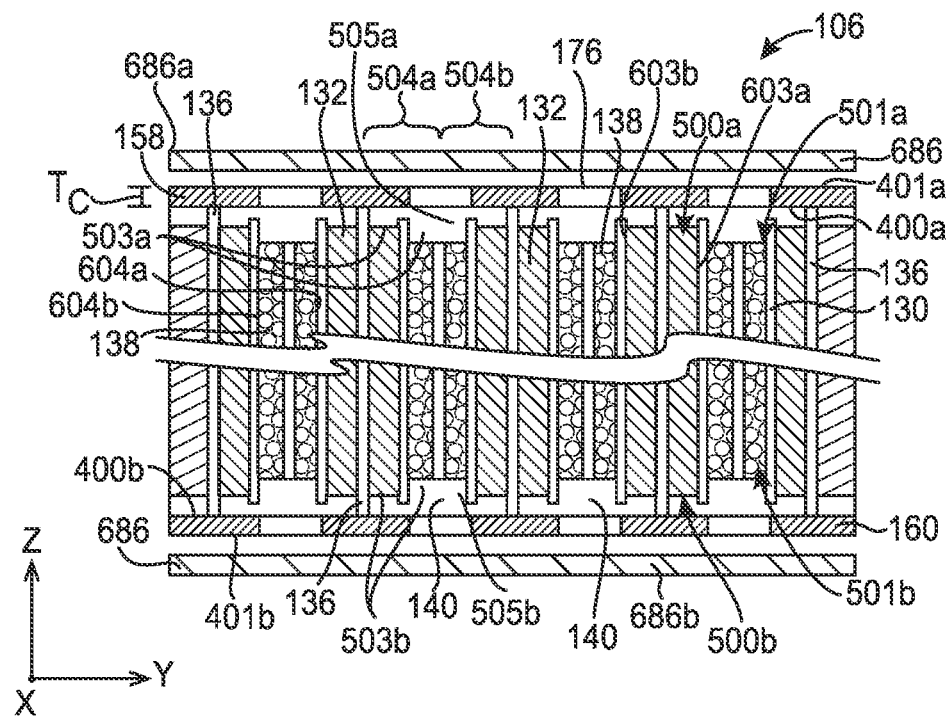
FIG. 3A illustrates a cross-section in a Z-Y plane, of an embodiment of an electrode assembly, with an auxiliary electrodes.

According to embodiments of the present disclosure, a method is provided for fabricating an electrode assembly in which the transfer of carrier ions from an auxiliary electrode 686 comprising a source of carrier ions to the electrode assembly 106 can be facilitated, as shown for example in FIG. 3A. As discussed in further detail herein, according to certain embodiments, the transfer of carrier ions is performed as a part of an initial formation process performed to activate a secondary battery comprising the electrode assembly. According to other embodiments, the transfer of carrier ions is performed as a part of a process to replenish carrier ions in the electrode assembly that are lost due to formation of a solid electrolyte interphase (SEI) during an initial formation process and/or during cycling between charged and discharged states. The method of fabricating the electrode assembly may, in certain embodiments, provide for the application of porous electrically insulating material to the electrode assembly that allows for the transit of carrier ions therethrough.

Referring again to FIGS. 1A-1D, in one embodiment, the electrode assembly 106 includes a population of unit cells 504 stacked in series in a stacking direction (i.e. stacking direction D in FIG. 1B). Each member of the unit cell population comprises an electrode structure 110, a counter-electrode structure 112, and an electrically insulating separator 130 between the electrode and counter-electrode structures, to electrically insulate the electrode and counter-electrode structures 110, 112 from one another. In one example, as shown in FIG. 1B, the electrode assembly 106 comprises a series of stacked unit cells 504 comprising the electrode structures 110 and counter-electrode structures 112 in an alternating arrangement. FIG. 1C is an inset showing the secondary battery 102 with electrode assembly 106 of FIG. 1B, and FIG. 1D is a cross-section of the secondary battery with electrode assembly 106 of FIG. 1B. Other arrangements of the stacked series of unit cells 504a, 504b, can also be provided.

In one embodiment, the electrode structures 110 comprise an electrode active material layer 132, and an electrode current collector 136, as shown for example in FIGS. 1A-1D. For example, the electrode structures 110 can comprise an electrode current collector 136 disposed between one or more electrode active material layers 132. According to one embodiment, the electrode active material layer 132 comprises an anode active material, and the electrode current collector 136 comprises an anode current collector. Similarly, in one embodiment, the counter-electrode structures 112 comprise a counter-electrode active material layer 138, and a counter-electrode current collector 140. For example, the counter-electrode structures 112 can comprise a counter-electrode current collector 140 disposed between one or more counter-electrode active material layers 138. According to one embodiment, the counter-electrode active material layer 138 comprises a cathode active material, and the counter-electrode current collector 140 comprises a cathode current collector. Furthermore, it should be understood that the electrode and counter-electrode structures 110, 112, respectively, are not limited to the specific embodiments and structures described herein, and other configurations, structures, and/or materials other than those specifically described herein can also be provided to form the electrode structures 110 and counter-electrode structures 112. According to certain embodiments, each unit cell 504a, 504b in the unit cell population comprises, in the stacked series, a unit cell portion of the electrode current collector 136, an electrode structure 110 comprising an electrode active material layer 132, an electrically insulating separator 130 between the electrode and counter-electrode active material layers, a counter-electrode structure 112 comprising a counter-electrode active material layer 138, and a unit cell portion of a counter-electrode current collector 140. In certain embodiments, the order of the unit cell portion of the electrode current collector, electrode active material layer, separator, counter-electrode active material layer, and the unit cell portion of the counter-electrode current collector will be reversed for unit cells that are adjacent to one another in the stacked series, with portions of the electrode current collector and/or counter-electrode current collector being shared between adjacent unit cells, as shown for example in FIG. 1C.

According to the embodiment as shown in FIGS. 1A-1D, the members of the electrode and counter-electrode structure populations 110, 112, respectively, are arranged in alternating sequence, with a direction of the alternating sequence corresponding to the stacking direction D. The electrode assembly 106 according to this embodiment further comprises mutually perpendicular longitudinal, transverse, and vertical axes, with the longitudinal axis $A_{EA}$ generally corresponding or parallel to the stacking direction D of the members of the electrode and counter-electrode structure populations. As shown in the embodiment in FIG. 1B, the longitudinal axis $A_{EA}$ is depicted as corresponding to the Y axis, the transverse axis is depicted as corresponding to the X axis, and the vertical axis is depicted as corresponding to the Z axis.

Figure 4:
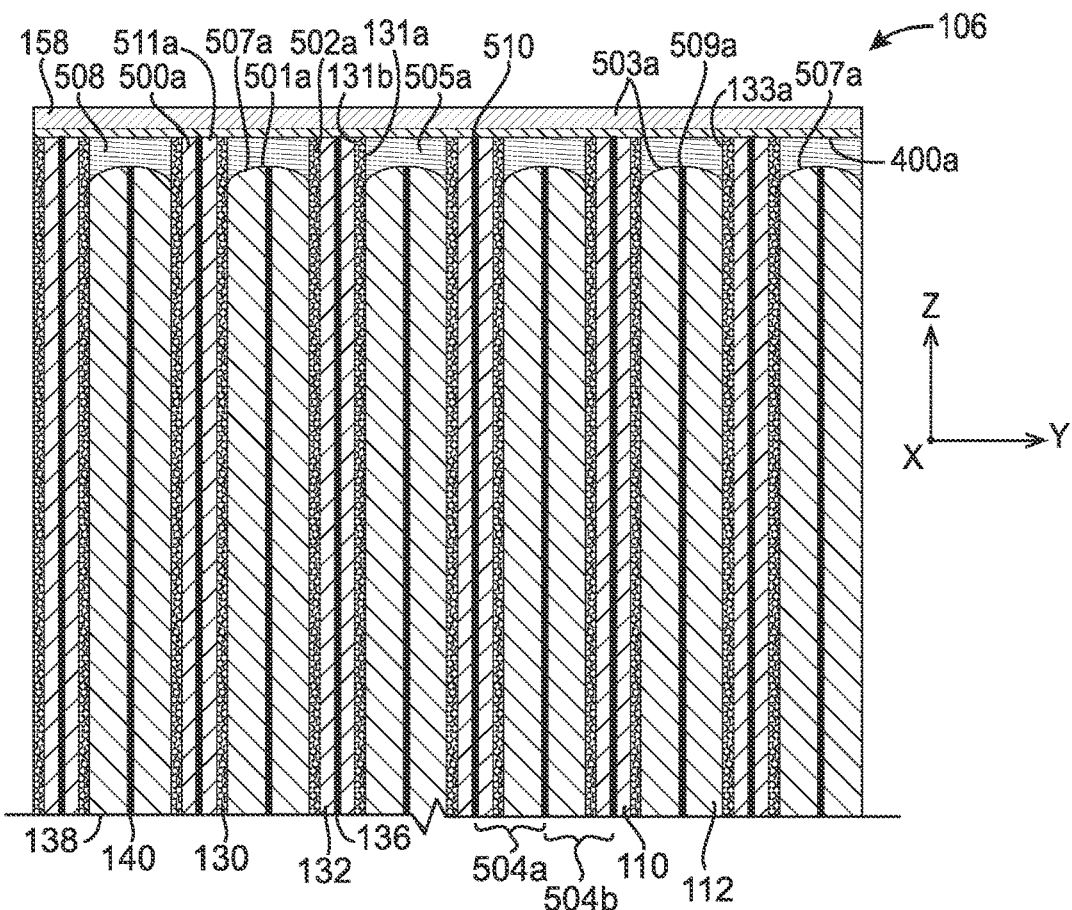
FIG. 4 is a cross-sectional view of an embodiment of an electrode assembly comprising a porous electrically insulating material.

According to embodiments of the disclosure herein, the electrode structures 110, counter-electrode structures 112 and electrically insulating separators 130 within each unit cell 504 of the unit cell population have opposing first and second vertical end surfaces separated in a vertical direction that is orthogonal to the stacking direction of the unit cell population. For example, referring to FIGS. 1C and 4, the electrode structures 110 in each member of the unit cell population can comprise opposing first and second vertical end surfaces 500a, 500b separated in the vertical direction, the counter-electrode structures 110 in each member of the unit cell population can comprise opposing first and second vertical end surfaces 501a, 501b separated in the vertical direction, and the electrically insulating separator 130 can comprise opposing first and second vertical end surfaces 502a, 502b separated in the vertical direction. According to yet another embodiment, members of the unit cell population have first and second vertical edge margins 503a, 503b that extend across and comprise the opposing first and second vertical end surfaces of the electrode structure 110, electrically insulating separator 130 and counter-electrode structure 112 within each unit cell member. Referring to FIGS. 3A and 4, according to yet another embodiment first vertical end surfaces 500a, 501a of the electrode and counter-electrode structures 110, 112 within a same unit cell population member are vertically offset from one another to form a first recess 505a, and second vertical end surfaces 500b, 501b of the electrode and counter-electrode structures 110, 112 within a same unit cell population member are vertically offset from one another to form a second recess 505b. For example, the counter-electrode first and second vertical end surfaces can be recessed and/or offset inwardly with respect to the respective electrode first and second vertical end surfaces within the same unit cell population member. Referring to FIG. 3A, in one embodiment, members of the unit cell population comprise a counter-electrode active material layer 138 that has first and second vertical end surfaces 501a, 501b that are recessed inwardly with respect to the first and second vertical end surfaces of the electrode active material layer 132 and/or the electrically insulating separator 130.

According to one embodiment, the electrode assembly 106 further comprises porous electrically insulating material 508 covering the first and/or second vertical end surface(s) 500a, 500b, 501a, 501b of the electrode and/or counter-electrode structure(s) 110, 112 of the members of the unit cell population 504. For example, as shown in FIGS. 3A and 4, the porous electrically insulating material 508 may be located within one or more of the first and second recesses 505a, 505b formed by the vertical offset of electrode and counter-electrode structures 110, 112 within the unit cell members. According to certain embodiments, the porous electrically insulating material has a porosity in the range of from 20% to 60% (percent of pore volume per total volume of porous electrically insulating material). The porous electrically insulating material 508 is, according to certain embodiments, capable of providing an ion conducting structure, and can provide a path for carrier ions provided by an auxiliary electrode to members of the unit cell population.

According to one embodiment of the present disclosure, a method is provided for manufacturing a structure 101 comprising an electrode assembly 106 and having a porous electrically insulating material 508, as shown for example in FIG. 4. As discussed in further detail herein, referring to FIGS. 11-12, according to certain embodiments, the electrode assembly 106 comprises a population of unit cells 504 stacked in series in a stacking direction, opposing first and second longitudinal end surfaces 116, 118 separated along the stacking direction. According to certain embodiments, the structure 101 further comprises first and second endplates 180, 182 separated in the stacking direction and overlying the first and second longitudinal end surfaces 116, 118. According to certain embodiments of the method and/or structure: (i) each unit cell 504 comprises an electrode structure 110, a counter-electrode structure 112, and an electrically insulating separator 130 between the electrode and counter-electrode structures 110, 112, (ii) the electrode structures 110, counter-electrode structures 112 and electrically insulating separators 130 within each unit cell 504 have opposing first and second vertical end surfaces (500a, 500b), (501a, 501b), (502a, 502b) separated in a vertical direction, and (iii) the vertical direction is orthogonal to the stacking direction. According to certain embodiments, the method comprises providing a porous electrically insulating material 508 to the electrode assembly 106 using a stencil 700.

Referring to FIGS. 11A-11C and 12, in one embodiment, the first and second endplates 180, 182 correspond to first and second primary growth constraints 154, 156 of a primary growth constraint system as described further herein. According to one embodiment, the first and second endplates 180, 182 each comprise a vertical thickness $t_{EP}$ of a cross-sectional area in a plane orthogonal to the stacking direction (e.g. the X-Z plane), wherein first vertical thicknesses $t_{EP1}$ of first cross-sectional areas 1803 of each of the first and second endplates in inner regions 1801 of the respective first and second endplates that are adjacent the stacked series of unit cells, are greater than second vertical thicknesses $t_{EP2}$ of second cross-sectional areas 1804 in second regions 1802 of the respective first and second endplates that are external to the respective first regions in the stacking direction. In another embodiment, each of the first and second endplates 180, 182 have respective maximum vertical thicknesses $t_{EPMAX}$ at cross-sectional areas in the plane orthogonal to the stacking direction having the greatest vertical thicknesses $t_{EP}$ for each endplate. In one embodiment, each of the first and second endplates 180, 182 also comprises respective first and second vertical end surface regions (1806a, 1806b), coinciding with the respective maximum vertical thicknesses $t_{EPMAX}$ on opposing first and second vertical sides (1850a, 1850b) of each of the first and second endplates 180, 182. In another embodiment, each of the first and second endplates each have first and second vertical end surface regions (1806a, 1806b) coinciding with respective first and second maximum vertical extents (1805a, 1805b) on opposing first and second vertical sides (1850a, 1850b) of the first and second endplates 180, 182. In certain embodiments, one or more of the first and second vertical end surface regions 1806a, 1806b of each endplate that coincides with the first and second maximum vertical extents for that endplate, may also simultaneously coincides with the maximum vertical thickness $t_{EPMAX}$ for that endplate.

Figure 10:
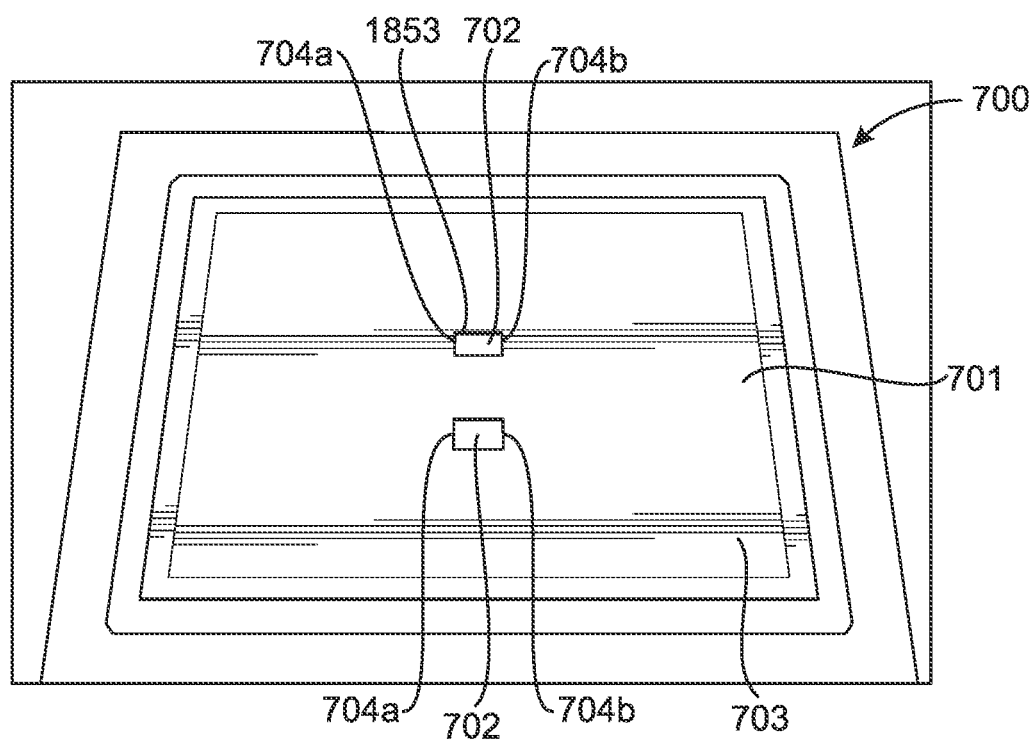
FIG. 10 is a perspective view of an embodiment of a stencil over an electrode assembly.
Figure 12:
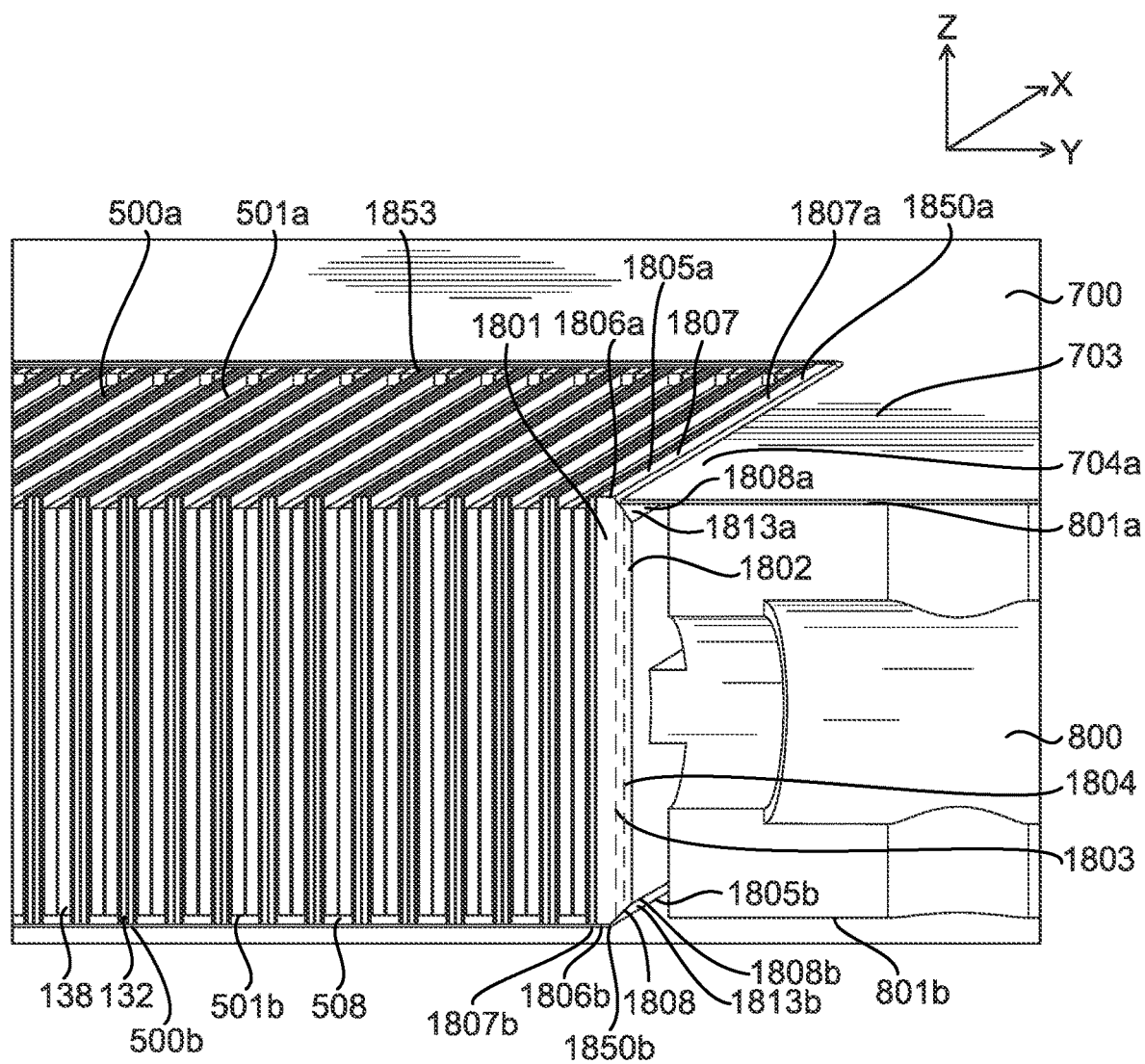
FIG. 12 is a cross-sectional view of an embodiment of a section of an electrode assembly with a stencil covering peripheral portions of the electrode assembly.

Referring to FIGS. 10-12, in one embodiment, the method comprises (a) positioning a stencil 700 comprising a stencil frame 701 defining a stencil aperture 702 over the first and second endplates 180, 182 such that the stencil frame 701 covers at least a portion of a periphery 1853 of the electrode assembly 106, and first vertical end surfaces 500a, 501a of the electrode and counter-electrode structures 110, 112 of the members of the unit cell 504 population are exposed through the stencil aperture 702. In another embodiment, the method comprises (a) positioning a stencil 700 comprising a stencil frame 701 defining a stencil aperture 702 over the first and second endplates 180, 182, wherein the stencil 700 is positioned over the first and second endplates 180, 182 such that a top surface 703 of the stencil frame 701 does not exceed first vertical end surface regions 1806a of each of the first and second endplates that coincide with the respective maximum vertical thicknesses $t_{EPMAX}$ of each of the respective first and second endplates 180, 182 in the vertical direction. In another embodiment, the method comprises (a) positioning a stencil 700 comprising a stencil frame 701 defining a stencil aperture 702 over the first and second endplates 180, 182, wherein the stencil is positioned over the first and second endplates such that a top surface 703 of the stencil frame does not exceed first vertical end surface regions 1806*a* of the first and second endplates that coincide with respective first maximum vertical extents 1805*a* of each of the respective first and second endplates that are on a same vertical side of the electrode assembly as the top surface of the stencil frame.

In one embodiment, the method further comprises (b) applying a porous electrically insulating material 508 through the stencil aperture 702 to at least partially, and even entirely cover the first vertical end surfaces 500*a*, 501*a* of the electrode or the counter-electrode structure(s) 110, 112 of the members of the unit cell population. In another embodiment, the method comprises (b) applying a porous electrically insulating material 508 through the stencil aperture 702 to at least partly and even entirely cover the first vertical end surfaces 501*a* of the counter-electrode structure(s) 112 of the members of the unit cell population. In some embodiments, each electrode structure 110 of members of the unit cell 504 population comprises a layer of an electrode active material 132, and each counter-electrode structure 112 of members of the unit cell population comprises a layer of a counter-electrode active material 138, and (b) comprises applying a porous electrically insulating material 508 through the stencil aperture 702 to cover first vertical end surfaces 507*a* of layers of the counter-electrode active material of the members of the unit cell population.

In one embodiment, the method further comprises (c) positioning the stencil 700 over the first and second endplates 180, 182 such that the second vertical end surfaces 500*b*, 501*b* of the electrode and counter-electrode structures 110, 112 of the members of the unit cell population are exposed through the stencil aperture 702. In one embodiment, the stencil 700 is positioned over the first and second endplates 180, 182 such that the top surface 703 of the stencil frame 701 does not exceed first vertical end surface regions 1806*a* of the first and second endplates that coincide with the respective second maximum vertical extents 1805*b* of each of the respective first and second endplates that are on a same vertical side 1850*a* of the electrode assembly 106 as the top surface 703 of the stencil frame 701. In one embodiment, the stencil 700 is positioned over the first and second endplates 180, 182 such that the top surface 703 of the stencil frame 701 does not exceed second vertical end surface regions 1806*b* of the first and second endplates 180, 182 that coincide with respective maximum vertical thicknesses $t_{EPMAX}$ of the first and second endplates.

In one embodiment, the method further comprises (d) applying the porous electrically insulating material 508 through the stencil aperture 702 to at least partially, and even completely, cover the second vertical end surfaces 500*b*, 501*b* of the electrode or the counter-electrode structure(s) 110, 112 of the members of the unit cell population. In another embodiment, the method comprises (d) applying the porous electrically insulating material 508 through the stencil aperture 702 to at least partly, and even completely, cover the second vertical end surfaces 501*b* of the counter-electrode structure(s) 110, 112 of the members of the unit cell population. In some embodiments, each electrode structure 110 of members of the unit cell 504 population comprises a layer of an electrode active material 132, and each counter-electrode structure 112 of members of the unit cell 504 population comprises a layer of a counter-electrode active material 138, and (d) comprises applying a porous electrically insulating material 508 through the stencil aperture 702 to cover second vertical end surfaces 507*b* of layers of the counter-electrode active material of the members of the unit cell population.

In one embodiment, the method further comprises rotating the electrode assembly 106 about an axis perpendicular to the vertical direction (e.g., the X or Z-axis), after an application of the porous electrically insulating material 508 to the electrode assembly 106. In some embodiments, the electrode assembly is rotated following application of the porous electrically insulating material to the first vertical end surfaces 500*a*, 501*a* of the electrode or counter-electrode structure(s), and wherein the method further comprises applying the porous electrically insulating material to second vertical end surfaces 500*b*, 501*b* of the electrode or counter-electrode structure(s) after the rotation. According to the methods disclosed herein, in one embodiment, the method comprises rotating the electrode assembly 106 about a longitudinal axis in the stacking direction or a transverse axis in a transverse direction that is orthogonal to the stacking direction and vertical direction, to reverse the positions of the first and second vertical end surfaces (500*a*, 500*b*), (501*a*, 501*b*) of the electrode and counter-electrode structures in the vertical direction.

According to the methods disclosed herein, in one embodiment, maximum vertical thicknesses of the electrode and counter-electrode structure(s) 110, 112 in a cross-sectional area orthogonal to the stacking direction do not exceed the respective maximum vertical thickness $t_{EPMAX}$ of each of the first and second endplates 180, 182 in the vertical direction. In another embodiment, maximum vertical thicknesses of the counter-electrode structure(s) 112 in a cross-sectional area orthogonal to the stacking direction do not exceed the respective maximum vertical thickness $t_{EPMAX}$ of each of the first and second endplates 180, 182 in the vertical direction. In one embodiment, maximum vertical thicknesses of layers 138 of counter-electrode active material of the counter-electrode structure(s) 112 in a cross-sectional area orthogonal to the stacking direction do not exceed the respective maximum vertical thickness $t_{EPMAX}$ of each of the first and second endplates in the vertical direction.

In one embodiment, the first vertical end surfaces 500*a*, 501*a* of the electrode and counter-electrode structure(s) 110, 112 do not exceed first vertical end surface regions 1806*a* of the first and second endplates 180, 182 that coincide with the first maximum vertical extents 1805*a* of the first and second endplates on a same vertical side 1850*a* of the electrode assembly as the first vertical end surfaces 500*a*, 501*a*. In one embodiment, first vertical end surfaces 501*a* of the counter-electrode structure(s) 112 do not exceed first vertical end surface regions 1806*a* of the first and second endplates that coincide with the first maximum vertical extents 1805*a* of the first and second endplates on a same vertical side 1850*a* of the electrode assembly as the first vertical end surfaces 501*a*. In another embodiment, first vertical end surfaces 507*a* of layers 138 of counter-electrode active material of the counter-electrode structure(s) 112 do not exceed first vertical end surface regions 1806*a* of the first and second endplates that coincide with the first maximum vertical extents 1805*a* of the first and second endplates on a same vertical side 1850*a* of the electrode assembly as the first vertical end surfaces 507*a*.

In one embodiment, the second end surfaces 500*b*, 501*b* of the electrode and counter-electrode structure(s) 110, 112 do not exceed second vertical end surface regions 1806*b* of the first and second endplates 180, 1182 that coincide with the second maximum vertical extents 1805*b* of the first and second endplates on a same vertical side 1850*b* of the electrode assembly as the second vertical end surfaces 500*b*, 501*b*. In another embodiment, the second vertical end surfaces 501*b* of the counter-electrode structure(s) 112 do not exceed second vertical end surface regions 1806b of the first and second endplates 180, 182 that coincide with the second maximum vertical extents 1805b of the first and second endplates on a same vertical side 1850b of the electrode assembly as the second vertical end surfaces 501b. In another embodiment, the second vertical end surfaces 507b of layers of counter-electrode active material of the counter-electrode structure(s) 112 do not exceed second vertical end surface regions 1806b of the first and second endplates that coincide with the second maximum vertical extents 1805b of the first and second endplates 180, 182 on a same vertical side 1850b of the electrode assembly as the second vertical end surfaces 507b.

In another embodiment, the first vertical end surfaces 500a, 501a of the electrode and counter-electrode structure(s) 110, 112 are recessed with respect to first vertical end surface regions 1806a of the first and second endplates 180, 182 that coincide with the first maximum vertical extents 1805a of the first and second endplates on a same vertical side 1850a of the electrode assembly as the first vertical end surfaces 500a, 501a. In yet another embodiment, the first vertical end surfaces 501a of the counter-electrode structure(s) 112 are recessed with respect to the first maximum vertical extents 1805a of the first and second endplates on a same vertical side 1850a of the electrode assembly as the first vertical end surfaces 501a. In some embodiments, each electrode structure 110 of members of the unit cell 504 population comprises a layer of an electrode active material 132, and each counter-electrode structure 112 of members of the unit cell 504 population comprises a layer of a counter-electrode active material 138, and wherein the first vertical end surfaces 507a of layers of counter-electrode active material of the counter-electrode structure(s) 112 are recessed with respect to the first maximum vertical extents 1805a of the first and second endplates on a same vertical side 1850a of the electrode assembly as the first vertical end surfaces 507a. In some other embodiments, each electrode structure 110 of members of the unit cell 504 population comprises a layer of an electrode active material 132, and each counter-electrode structure 112 of members of the unit cell population comprises a layer of a counter-electrode active material 138, and wherein maximum vertical thicknesses of the layers of counter-electrode active material of the counter-electrode structure(s) 112 in a plane orthogonal to the stacking direction do not exceed the respective maximum vertical thickness $t_{EPMAX}$ of each of the first and second endplates in the vertical direction.

In one embodiment, the second end surfaces 500b, 501b of the electrode and counter-electrode structure(s) 110, 112 are recessed with respect to the second maximum vertical extent 1805b of the first and second endplates on a same vertical side 1850b of the electrode assembly as the second vertical end surfaces 500b, 501b. In another embodiment, the second end surfaces 501b of the counter-electrode structure(s) 112 are recessed with respect to the second maximum vertical extent 1805b of the first and second endplates on a same vertical side 1850b of the electrode assembly as the second vertical end surfaces 501b. In some embodiments, each electrode structure 110 of members of the unit cell population comprises a layer of an electrode active material 132, and each counter-electrode structure 112 of members of the unit cell population comprises a layer of a counter-electrode active material 138, and wherein the second end surfaces 507b of layers of counter-electrode active material of the counter-electrode structure(s) 112 are recessed with respect to second surface regions 1806b of the first and second endplates coinciding with second maximum vertical extents 1805b of the first and second endplates on a same vertical side 1850b of the electrode assembly as the second end surfaces.

According to the methods disclosed herein, in one embodiment, in (a) the stencil 700 is positioned such that the top surface 703 of the stencil frame is spaced vertically above the first end surfaces 500a, 501a of the electrode or counter-electrode structure(s) 110, 112 in the electrode assembly 106. In another embodiment, in (a) the stencil 700 is positioned such that the top surface 703 of the stencil frame is spaced vertically above the first end surfaces 501a of the counter-electrode structure(s) 112 in the electrode assembly. In some embodiments, each electrode structure 110 of members of the unit cell population comprises a layer of an electrode active material 132, and each counter-electrode structure 112 of members of the unit cell population comprises a layer of a counter-electrode active material 138, and wherein in (a) the stencil 700 is positioned such that the top surface 703 of the stencil frame is spaced vertically above first end surfaces 507a of the layers of counter-electrode active material of the counter-electrode structure(s) 112 in the electrode assembly.

In one embodiment, in (c) the stencil 700 is positioned such that the top surface 703 of the stencil frame is spaced vertically above the second end surfaces 500b, 501b of the electrode or counter-electrode structure(s) 110, 112. In another embodiment, in (c) the stencil 700 is positioned such that the top surface 703 of the stencil frame is spaced vertically above the second end surfaces 501b of the counter-electrode structure(s) 112 in the electrode assembly 106. In some embodiments, each electrode structure 110 of members of the unit cell 504 population comprises a layer of an electrode active material 132, and each counter-electrode structure 112 of members of the unit cell 504 population comprises a layer of a counter-electrode active material 138, and wherein in (c) the stencil 700 is positioned such that the top surface 703 of the stencil frame is spaced vertically above second end surfaces 507b of the layers of counter-electrode active material of the counter-electrode structure(s) 112 in the electrode assembly.

According to the methods disclosed herein, in one embodiment, in (a) the stencil 700 is positioned such that the top surface 703 of the stencil frame does not exceed or is spaced vertically below the first end surfaces 500a, 501a of the electrode or counter-electrode structure(s) 110, 112 in the electrode assembly. In another embodiment, in (a) the stencil 700 is positioned such that the top surface 703 of the stencil frame does not exceed or is spaced vertically below the first end surfaces 501a of the counter-electrode structure(s) 112 in the electrode assembly. In some embodiments, each electrode structure 110 of members of the unit cell 504 population comprises a layer of an electrode active material 132, and each counter-electrode structure 112 of members of the unit cell 504 population comprises a layer of a counter-electrode active material 138, and wherein in (a) the stencil 700 is positioned such that the top surface 703 of the stencil frame does not exceed or is spaced vertically below first end surfaces 507a of layers of the counter-electrode active material of the counter-electrode structure(s) 112 in the electrode assembly.

In one embodiment, in (c) the stencil 700 is positioned such that the top surface 703 of the stencil frame does not exceed or is spaced vertically below the second end surfaces 500b, 501b of the electrode or counter-electrode structure(s) 110, 112 in the electrode assembly 106. In another embodiment, in (c) the stencil 700 is positioned such that the top surface 703 of the stencil frame does not exceed or is spaced vertically below the second end surfaces 501b of the counter-electrode structure(s) 112 in the electrode assembly. In some embodiments, each electrode structure 110 of members of the unit cell population comprises a layer of an electrode active material 132, and each counter-electrode structure 112 of members of the unit cell population comprises a layer of a counter-electrode active material 138, and wherein in (c) the stencil 700 is positioned such that the top surface 703 of the stencil frame does not exceed or is spaced vertically below second end surfaces 507b of layers of the counter-electrode active material of the counter-electrode structure(s) 112 in the electrode assembly. In one embodiment, in any of (a) or (c), the stencil 700 is positioned about a periphery of the first and second endplates 180, 182 in the stacking direction. In one embodiment, in one or more of (a) and (c), the stencil aperture is positioned such that first vertical end surface regions 1806a (in (a)) and/or second vertical end surface regions 1806b (in (c)) that coincide with one or more of maximum vertical extents or maximum thicknesses of the endplates, are exposed through the aperture. In certain embodiments, by accommodating at least a portion of the endplates 180, 182 within the stencil aperture, the endplates act as extensions of the stencil in the stacking direction.

According to the methods disclosed herein, in one embodiment, in (a) the stencil frame 701 is received on receiving surface regions 1813a of the outer regions 1802 of the first and second endplates, the outer regions 1802 having the second vertical thicknesses $t_{EP2}$ in the second cross-sectional areas 1804 orthogonal to the stacking direction that are smaller than the first vertical thickness $t_{EP1}$ in the first cross-sectional area 1803 orthogonal to the stacking direction in the inner regions 1801 adjacent the stacked series of unit cells 504. In another embodiment, in (c) the stencil frame 701 is received on receiving surface regions 1813b of the outer regions 1802 of the first and second endplates, the outer regions 1802 having second vertical thickness $t_{EP2}$ in the second cross-sectional areas 1804 orthogonal to the stacking direction that are smaller than first vertical thicknesses $t_{EP1}$ in first cross-sectional areas 1803 orthogonal to the stacking direction in the inner regions 1801 adjacent the stacked series of unit cells 504. In one embodiment, in (a), the stencil frame 701 is received on receiving surface regions 1813a of the outer regions 1802 of the first and second endplates that do not exceed or are less than first surface regions 1806a of the first and second endplates that coincide with the first maximum vertical extents 1805a of the respective first and second endplates in the vertical direction. In another embodiment, in (c) the stencil frame 701 is received on receiving surface regions 1813b of the outer regions 1802 of the first and second endplates that do not exceed or are less than second surface regions 1806b of the first and second endplates that coincide with the second maximum vertical extents 1805b of the respective first and second endplates in the vertical direction.

In some embodiments, the first and second endplates 180, 182 each comprise first and second endplate vertical end surfaces 1870a, 1870b on respective opposing first and second vertical sides 1850a, 1850b of the first and second endplates, at least one of the first and second vertical end surfaces comprising an inner surface region 1807 in the inner region adjacent the stacked series of unit cells, and an outer surface region 1808 in the outer region that is external to the inner surface region in the stacking direction, the outer surface region 1808 being offset inwardly in the vertical direction from the inner surface region 1807.

In some embodiments, each of the first and second endplate vertical end surfaces 1870a, 1870b comprise opposing inner surface regions 1807a, 1807b separated in the vertical direction in the inner regions 1801 adjacent the stacked series of unit cells, and opposing outer surface regions 1808a, 1808b separated in the vertical direction in the outer regions 1802 that are external to the inner regions 1801 in the stacking direction, the opposing outer surface regions 1808a, 1808b of each of the first and second endplate vertical end surfaces being offset inwardly in the vertical direction from the opposing inner surface regions 1807a, 1807b.

In one embodiment, the stencil frame 701 comprises first and second opposing ledges 704a, 704b, and in either of (a) or (c) the stencil 700 is positioned over the electrode assembly 106 such that the first and second opposing ledges 704a, 704b of the stencil frame 701 are received by the inwardly offset outer surface regions 1808a, 1808b of the first and second endplates 180, 182 that are on a same vertical side 1850a, 1850b of the electrode assembly as the stencil frame. In another embodiment, the stencil frame 701 comprises first and second opposing ledges 704a, 704b, and in any of (a) and (c), the upper frame surfaces 703 of the first and second opposing frame regions 704a, 704b are positioned such that they do not extend exceed, or are recessed with respect to, first surface regions 1806a of the first and second endplates 180, 182 that coincide with the respective maximum vertical thicknesses $t_{EPMAX}$ in the vertical direction. In some embodiments, the stencil frame 701 comprises first and second opposing ledges 704a, 704b, and wherein in (a) the upper frame surfaces 703 of the first and second opposing frame regions 704a, 704b are positioned such that they do not extend exceed, or are recessed with respect to, first surface regions 1806a of the first and second endplates that coincide with first maximum vertical extents 1805a of the first and second endplates that are on a same vertical side 1850a of the electrode assembly as the upper surfaces 703 of the first and second opposing frame regions. In some embodiments, the stencil frame 701 comprises first and second opposing ledges 704a, 704b, and wherein in (c) the upper frame surfaces 703 of the first and second opposing frame regions 704a, 704b are positioned such that they do not extend exceed, or are recessed with respect to, second surface regions 1806b of the first and second endplates that coincide with the second maximum vertical extent 1805b of the first and second endplates that are on a same vertical side 1850b of the electrode assembly as the upper surfaces 703 of the first and second opposing frame regions.

Figure 13:
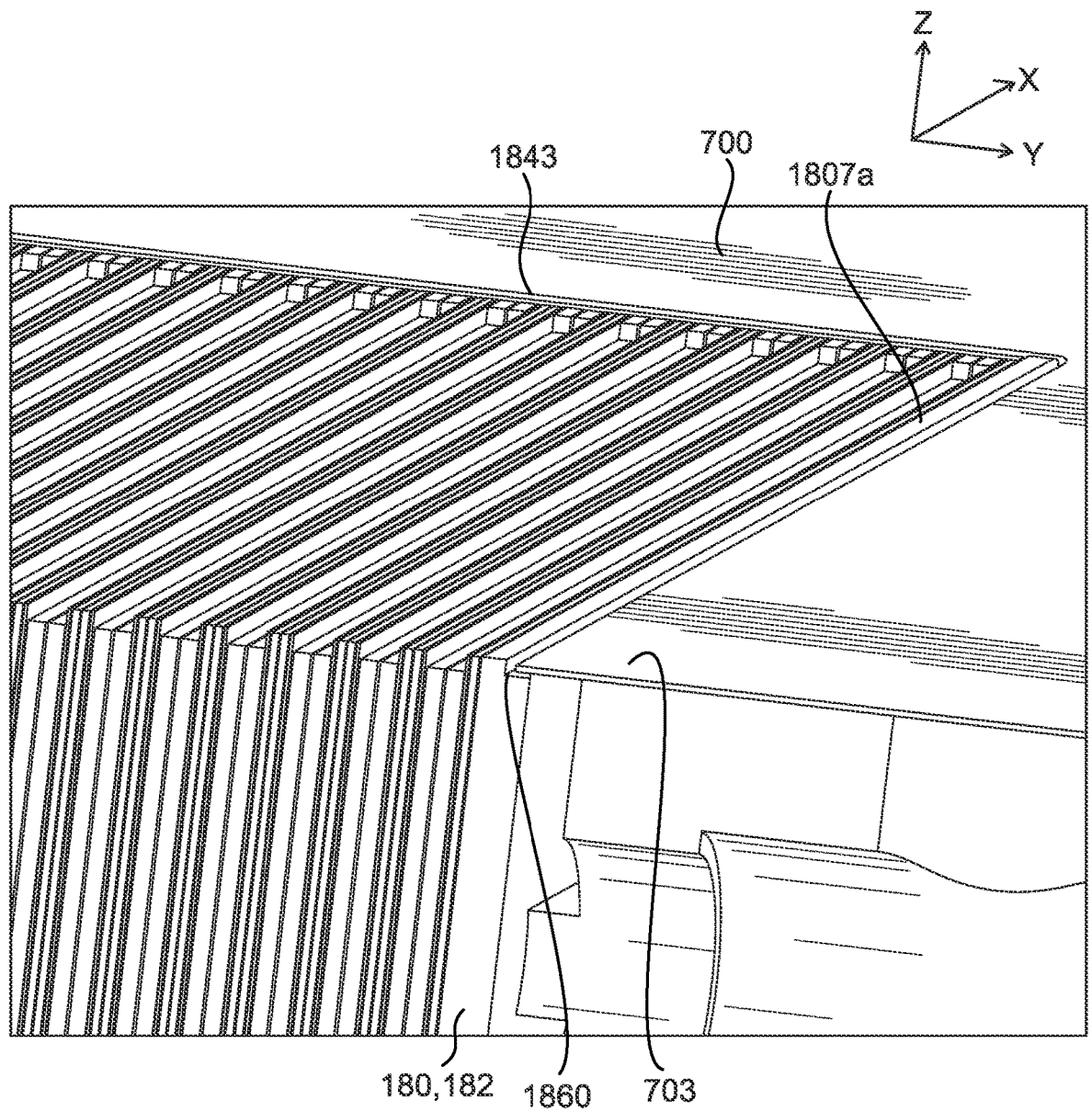
FIG. 13 is a cross-sectional view of another embodiment of a section of an electrode assembly with a stencil covering peripheral portions of the electrode assembly.

Referring to FIGS. 11A-11C and 12-13, according to the methods disclosed herein, in one embodiment, the electrode assembly 106 comprises a longitudinal axis in the stacking direction (e.g., Y-axis), and a vertical axis in the vertical direction (e.g. Z-axis), and wherein the first and second endplates 180, 182 each comprise first and second opposing vertical end surfaces 1870a, 1870b having a cross-sectional profile in a plane of the vertical and longitudinal axis that is chamfered, sloped, stepped, or any combination thereof. In one embodiment, as shown in FIG. 12, the cross-sectional profile of each of the first and second endplates 180, 182 in the plane of the vertical and longitudinal axis decreases monotonically from the inner region 1801 to the outer region 1802. In one embodiment, as shown in FIG. 13, the cross-sectional profile of each of the first and second endplates 180, 182 in the plane of the vertical and longitudinal axis decreases step-wise from the inner region 1801 to the outer region 1802 in each of the respective first and second end plates. In one embodiment, outer regions 1802 of the respective first and second end plates comprise stepped features 1860 adapted to receive a stencil frame 701.

According to the methods disclosed herein, in one embodiment, (b) comprises using a blade 705 to apply a slurry of the porous electrically insulating material 508 through the stencil aperture 702 to at least partly and even entirely cover the first vertical end surfaces 500*a*, 501*a* of the electrode or the counter-electrode structure(s) 110, 112 of the members of the unit cell population 504. In another embodiment, (b) comprises using a blade to apply a slurry of the porous electrically insulating material 508 through the stencil aperture 702 to at least partly and even entirely cover the first vertical end surfaces 501*a* of the counter-electrode structure(s) 112 of the members of the unit cell population 504. In some embodiments, each electrode structure 110 of members of the unit cell 504 population comprises a layer of an electrode active material 132, and each counter-electrode structure 112 of members of the unit cell 504 population comprises a layer of a counter-electrode active material 138, and wherein (b) comprises using a blade to apply a slurry of the porous electrically insulating material 508 through the stencil aperture 702 to at least partly and even entirely cover first vertical end surfaces 507*a* of layers of counter-electrode active material of the counter-electrode structure(s) 112 of the members of the unit cell population 504.

According to the methods disclosed herein, in one embodiment, (d) comprises using a blade 705 to apply a slurry of the porous electrically insulating material 508 through the stencil aperture 702 to at least partly and even entirely cover the second vertical end surfaces 500*b*, 501*b* of the electrode or the counter-electrode structure(s) 110, 112 of the members of the unit cell population 504. In another embodiment, (d) comprises using a blade to apply a slurry of the porous electrically insulating material 508 through the stencil aperture 702 to at least partly and even entirely cover the second vertical end surfaces 501*b* of the counter-electrode structure(s) 112 of the members of the unit cell population 504. In some embodiments, each electrode structure 110 of members of the unit cell 504 population comprises a layer of an electrode active material 132, and each counter-electrode structure 112 of members of the unit cell 504 population comprises a layer of a counter-electrode active material 138, and wherein (d) comprises using a blade to apply a slurry of the porous electrically insulating material 508 through the stencil aperture 702 to at least partly and even entirely cover second vertical end surfaces 507*b* of layers of counter-electrode active material of the counter-electrode structure(s) 112 of the members of the unit cell population 504.

According to the methods disclosed herein, in one embodiment, (b) comprises running a blade along the first vertical end surfaces 1870*a* of the first and second endplates in a transverse direction that is orthogonal to the vertical and stacking directions to apply the porous electrically insulating material 508 through the stencil aperture 702 to the first vertical end surfaces 500*a*, 501*a* of the electrode or counter-electrode structure(s) 110, 112. In another embodiment, the blade is run across first vertical end surfaces 1870*a* at first surface regions 1806*a* of the first and second endplates that coincide with the respective maximum vertical thicknesses $t_{EPMAX}$ in the vertical direction. In certain embodiments, the blade is run across first vertical end surfaces 1870*a* at first surface regions 1806*a* of the first and second endplates that coincide with the respective first maximum extents 1805*a* of the first and second endplates in the vertical direction. In yet another embodiment, (b) comprises running a blade in a transverse direction that is orthogonal to the stacking direction and the vertical direction, across the first vertical end surfaces 1870*a* of the first and second endplates. In some embodiments, in (b) a length of the blade extends across the electrode assembly 106 from the first endplate 180 to the second endplate 182 in the stacking direction. In some embodiments, in (b), the porous electrically insulating material 508 is applied to any of the blade or a surface of the electrode assembly 106, and the blade is run along the first vertical end surfaces 1870*a* of the first and second endplate in the transverse direction. In one embodiment, the blade is contacted with one or more of the first vertical end surfaces as it is run and/or swept across the first and second endplates.

According to the methods disclosed herein, in one embodiment, (d) comprises running a blade along the second vertical end surfaces 1870*b* of the first and second endplates 180, 182 in a transverse direction that is orthogonal to the vertical and stacking directions to apply the porous electrically insulating material 508 through the stencil aperture 702 to the second end surfaces 500*b*, 501*b* of the electrode or counter-electrode structure(s) 110, 112. In one embodiment, the blade is run across second vertical end surfaces 1870*b* of the first and second endplates at second surface regions 1806*b* of the first and second endplates that coincide with the respective maximum vertical thicknesses $t_{EPMAX}$ in the vertical direction. In certain embodiments, the blade is run across second vertical end surfaces 1870*b* at second surfaces 1806*b* of the first and second endplates that coincide with the respective second maximum extents 1805*b* of the first and second endplates in the vertical direction. In another embodiment, the blade is run in a transverse direction that is orthogonal to the stacking direction and the vertical direction, across the second vertical end surfaces 1870*b* of the first and second endplates 180, 182. In some embodiments, in (b) a length of the blade extends across the electrode assembly 106 from the first endplate 180 to the second endplate 182 in the stacking direction. In yet another embodiment, (d) comprises running a blade along the second vertical end surfaces 1870*b* of the first and second endplates in a transverse direction that is orthogonal to the vertical and stacking directions to apply the porous electrically insulating material 508 through the stencil aperture 702 to the second end surfaces 500*b*, 501*b* of the electrode or counter-electrode structure(s) 110, 112. In some embodiment, (d) comprises applying the porous electrically insulating material 508 to any of the blade or a surface of the electrode assembly 106, and running the blade along the second vertical end surfaces 1870*b* of the first and second endplate in the transverse direction. In one embodiment, the blade is contacted with one or more of the second vertical end surfaces as it is run and/or swept across the first and second endplates.

According to the methods disclosed herein, in one embodiment, (a) comprises positioning the stencil 700 such that at least a portion of first vertical end surfaces 1870*a* of the first and second endplates 180, 182 that is adjacent the stacked series of unit cells 504 is exposed through the stencil aperture 702. In another embodiment, (c) comprises positioning the stencil 700 such that at least a portion of the second vertical end surfaces 1870*b* of the first and second endplates 180, 182 that is adjacent the stacked series of unit cells 504 is exposed through the stencil aperture 702. For example, in certain embodiments, the inner surface regions 1807*a*, 1807*b* located in the inner regions 1801 of the first and second endplates that are adjacent the stacked series of unit cells can be exposed through the stencil aperture in any of (a) and (c)

According to the methods disclosed herein, in one embodiment, (a) comprises positioning the stencil 700 such that the first surface regions 1806a on the first vertical sides 1850a of the first and second endplates coinciding with respective maximum vertical thicknesses $t_{EPMAX}$ in the vertical direction are exposed through the stencil aperture 702. In another embodiment, (a) comprises positioning the stencil 700 such that the first surface regions 1806a on the first vertical sides 1850a of the first and second endplates having the first maximum vertical extents 1805a are exposed through the stencil aperture 702.

According to the methods disclosed herein, in one embodiment, (c) comprises positioning the stencil 700 such that the second surface regions 1806b on the second vertical sides 1850b of the first and second endplates coinciding with the respective maximum vertical thicknesses $t_{EPMAX}$ in the vertical direction are exposed through the stencil aperture 702. In another embodiment, (c) comprises positioning the stencil 700 such that the second surface regions 1806b on the second vertical sides 1850b of the first and second endplates coinciding with the second maximum vertical extents 1805b are exposed through the stencil aperture 702.

According to the methods disclosed herein, in one embodiment, in any of (a) and (c), the stencil 700 is positioned such that the stencil frame 701 at least partly covers a periphery 1853 of the electrode assembly 106 in the transverse direction that is orthogonal to both the stacking direction and the vertical direction.

Figure 14:
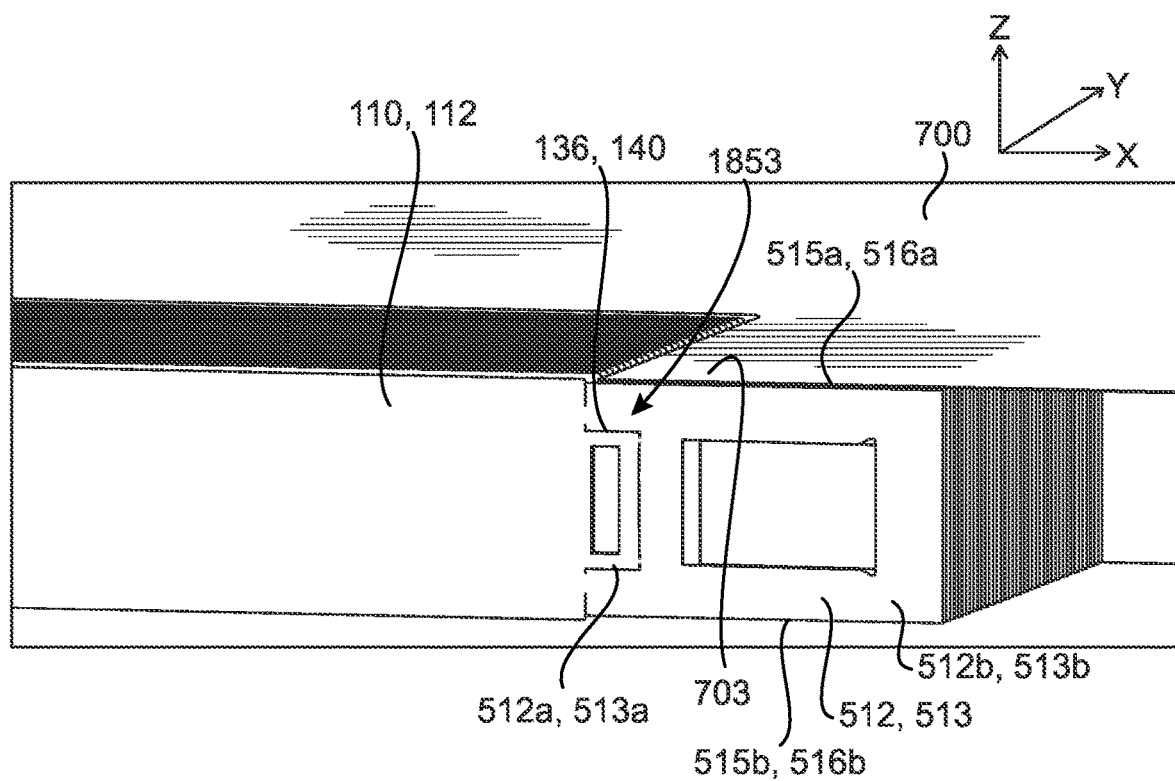
FIG. 14 is a cross-sectional view of another embodiment of a section of an electrode assembly with a stencil covering peripheral portions of the electrode assembly.

According to the methods disclosed herein, and referring to FIG. 14 in one embodiment, each unit cell 504 comprises an electrode current collector end section 512 and a counter-electrode current collector end section 513 extending from the respective electrode structure 110 and counter-electrode structure 112 in opposing transverse directions that are orthogonal to both the stacking direction and the vertical direction. In some embodiments, the end sections of the electrode and counter-electrode current collectors 136, 140 are recessed in the vertical direction with respect to the first and second vertical end surfaces (500a, 500b), (501a, 501b) of the electrode and counter-electrode structures 110, 112. In some embodiments, in any of (a) and (c), the stencil 700 is positioned such that the stencil frame 701 at least partly cover the end sections 512, 513 of the electrode and counter-electrode current collectors 136, 140 at the periphery of the electrode assembly 106 in the transverse direction that is orthogonal to the stacking and vertical directions. In some embodiments, in any of (a) and (c), the stencil 700 is positioned such that the end sections 512, 513 of the electrode and counter-electrode current collectors 136, 140 are recessed with respect to the stencil frame 701. In some embodiments, in any of (a) and (c), the stencil 700 is positioned such that opposing transverse ledges 704a, 704b of the stencil frame 701 are positioned over the end sections 512, 513 of the electrode and counter-electrode current collectors 136, 140. In one embodiment, the end sections 512, 513 can comprise both current collector connecting regions 512a, 513a that are configured to be connected to a busbar, and can further comprise removable regions 512b, 513b that are external to the current collector connecting regions in the transverse direction, and that are configured to be removed during assembly of the structure 101 to expose the current collector connecting regions 512a, 513a for connection to respective busbars. In the embodiment as shown in FIG. 14, the end sections 512, 513 comprising the removable regions 512b, 513b at the transverse ends of the end sections, and the stencil 700 is provided over both the current collector connecting regions 512a, 513a and removable regions 512b, 513b, to inhibit application of the porous electrically insulating material to these regions.

According to the methods disclosed herein, in one embodiment, first and second vertical end surfaces (515a, 515b), (516a, 516b) of the end sections 512, 513 of the electrode and counter-electrode current collectors 136, 140 are recessed at least 0.010 mm with respect to any of (i) the first and second vertical end surfaces 500a, 500b of the electrode structures 110, (ii) first and second vertical surface regions 1806a, 1806b of the first and second endplates that coincide with the first and second maximum vertical extents (1805a, 1805b), of the first and second endplates 180, 182, and (iii) first and second vertical surface regions 1806a, 1806b of the first and second endplates that coincide with respective maximum vertical thicknesses of the first and second endplates $t_{EPMAX}$ in the vertical direction. In some embodiments, first and second vertical end surfaces (515a, 515b), (516a, 516b) of the end sections 512, 513 of the electrode and counter-electrode current collectors 136, 140 are recessed at least 0.025 mm with respect to any of (i) the first and second vertical end surfaces 500a, 500b of the electrode structures, (ii) first and second surface regions 1806a, 1806b of the first and second endplates that coincide with the first and second maximum vertical extents 1805a, 1805b of the first and second endplates 180, 182, and (iii) first and second surface regions 1806a, 1806b of the first and second endplates that coincide with respective maximum vertical thicknesses of the first and second endplates $t_{EPMAX}$ in the vertical direction. In some embodiments, first and second vertical end surfaces (515a, 515b), (516a, 516b) of the end sections 512, 513 of the electrode and counter-electrode current collectors 136, 140 are recessed at least 0.050 mm with respect to any of (i) the first and second vertical end surfaces 500a, 500b of the electrode structures, (ii) first and second surface regions 1806a, 1806b of the first and second endplates that coincide with the first and second maximum vertical extents (1805a, 1805b) of the first and second endplates 180, 182, and (iii) first and second surface regions 1806a, 1806b of the first and second endplates that coincide with respective maximum vertical thicknesses of the first and second endplates $t_{EPMAX}$ in the vertical direction. In some embodiments, the first and second vertical end surfaces (515a, 515b), (516a, 516b) of the end sections 512, 513 of the electrode and counter-electrode current collectors 136, 140 are recessed to accommodate the stencil frame 701 in a vertical distance between the first and second vertical end surfaces (515a, 515b), (516a, 516b) of the end sections 512, 513 of the electrode and counter-electrode current collectors 136, 140, and the first and second vertical end surfaces (500a, 500b), (501a, 501b) of the electrode or counter-electrode structures.

According to the methods disclosed herein, in one embodiment, the method further comprises placing the electrode assembly 106 between a set of opposing bumpers 800 in the stacking direction, and applying a pressure via the bumpers to the first and second endplates 180, 182 in the stacking direction. In one embodiment, the set of opposing bumpers 800 presses against, and exerts a compressive pressure against first and second longitudinal end surfaces 1890a, 1890b of the endplates 180, 182. In one embodiment, the electrode assembly 106 is placed between the bumpers 800 such that first surface regions 1806a of the first and second endplates that coincide with first maximum vertical extents 1805a of the first and second endplates extends past first and second vertical end surfaces 801a, 801b of the bumpers in the vertical direction. In some embodiments, the electrode assembly 106 is placed between the bumpers 800 such that first surface regions 1806*a* of the first and second endplates 180, 182 that coincide with respective maximum vertical thicknesses $t_{EPMAX}$ of the first and second endplates in the vertical direction extend past first and second vertical end surfaces 801*a*, 801*b* of the bumpers in the vertical direction.

In some embodiments, the method further comprises resting at least a portion of the stencil frame 701 on the set of opposing bumpers 800. In some embodiments, the first and second surface regions 1806*a*, 1806*b* of the first and second endplates coinciding with the first and second maximum vertical extents 1805*a*, 1805*b* of the first and second endplates extend at least 0.010 mm past the first and second vertical end surfaces 801*a*, 801*b* of the set of bumpers. In some embodiments, the first and second surface regions 1806*a*, 1806*b* of the first and second endplates coinciding with the respective maximum vertical thicknesses $t_{EPMAX}$ of the first and second endplates in the vertical direction extend at least 0.010 mm past the first and second vertical end surfaces 801*a*, 801*b* of the set of bumpers. In some embodiments, the first and second surface regions 1806*a*, 1806*b* of the first and second endplates coinciding with the first and second maximum vertical extents 1805*a*, 1805*b* of the first and second endplates extend at least 0.025 mm past the first and second vertical end surfaces 801*a*, 801*b* of the set of bumpers. In some embodiments, the first and second surface regions 1806*a*, 1806*b* of the first and second endplates coinciding with the respective maximum vertical thicknesses $t_{EPMAX}$ of the first and second endplates in the vertical direction extend at least 0.025 mm past the first and second vertical end surfaces 801*a*, 801*b* of the set of bumpers. In some embodiments, the first and second surface regions 1806*a*, 1806*b* of the first and second endplates coinciding with the first and second maximum vertical extents (1805*a*, 1805*b*) of the first and second endplates extends at least 0.050 mm past the first and second vertical end surfaces 801*a*, 801*b* of the set of bumpers. In some embodiments, the first and second surface regions 1806*a*, 1806*b* of the first and second endplates coinciding with the respective maximum vertical thicknesses $t_{EPMAX}$ of the first and second endplates in the vertical direction extends at least 0.050 mm past the first and second vertical end surfaces 801*a*, 801*b* of the set of bumpers.

According to embodiments disclosed herein, in one embodiment, the cross-sectional thickness $t_{EP}$ of each of the first and second endplates 180, 182 decreases in the stacking direction from the inner region 1801 of the respective first and second endplates that is adjacent the stacked series of unit cells, to the outer region 1802 of the respective first and second endplates that is external to the first region in the stacking direction.

Figure 3B:
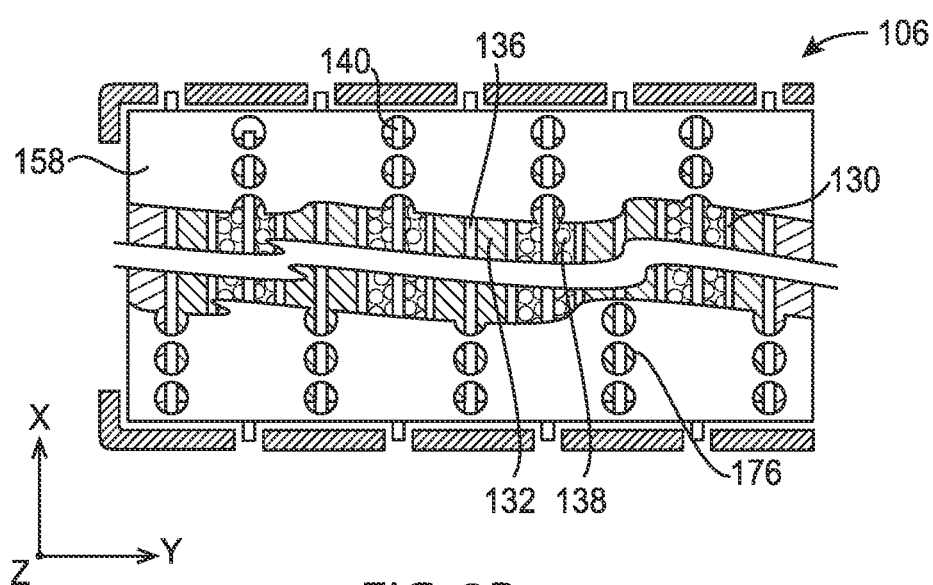
FIG. 3B illustrates a top view in the X-Y plane, of an embodiment of an electrode assembly, with a set of electrode constraints having apertures therein.

Referring to FIGS. 3A-3B, according to certain embodiments, a method of transferring carrier ions from the auxiliary electrode 686 to the members of the unit cell population 504, through the porous electrically insulating material 508, is provided. As discussed above, the carrier ions may be transferred to provide carrier ions to the electrode structures 110 of the unit cell members to compensate for a loss of carrier ions resulting from formation of a solid electrolyte interphase (SEI) layer that can form during an initial formation process, or a subsequent charging cycle of a secondary battery 102 having the electrode assembly 106. In certain embodiments, a portion of the carrier ions introduced into the unit cell from the counter-electrode structure is irreversibly bound in this SEI layer and thus removed from cyclic operation, i.e., from the capacity available to the user. As a result, during the initial discharge, less carrier ion is returned to the counter-electrode structure from the electrode structure than was initially provided by the cathode during the initial charging operation, leading to irreversible capacity loss. During each subsequent charge and discharge cycle of the secondary battery, the capacity losses resulting from mechanical and/or electrical degradation to the electrode structure and/or the counter-electrode structure tend to be much less per cycle, but even the relatively small carrier ion losses per cycle contribute significantly to reductions in energy density and cycle life as the battery ages. In addition, chemical and electrochemical degradation may also occur on the electrode and counter-electrode structures and cause capacity losses. Accordingly, embodiments of the disclosure herein provide for methods of activating the electrode assembly and/or secondary battery, such as via an initial formation process that provides added carrier ions from the auxiliary electrode to the unit cell members, and/or during replenishment processes performed to replenish a content of carrier ions lost during subsequent charge and/or discharge cycles of the secondary battery having the electrode assembly. According to certain embodiments, the carrier ions are transferred to compensate for a loss of carrier ions during an initial or subsequent charging cycle of the electrode assembly.

According to one embodiment, the auxiliary electrode 686 comprises a source of carrier ions such as any of lithium, sodium, potassium, calcium, magnesium and aluminum ions. In the embodiment as shown in FIG. 3A, the auxiliary electrode 686 is positioned over the vertical end surfaces of the electrode structures, counter-electrode structures and electrically insulating separators of the unit cell members, such as over the apertures 176 in the first and/or second secondary growth constraints 158, 160. In one version, one or more auxiliary electrodes 686 are positioned over both first and second vertical end surfaces, and/or alternatively the auxiliary electrode 686 can be positioned over just one of the first and second vertical end surfaces. For example, in one embodiment, a first auxiliary electrode 686*a* is positioned over the first vertical end surface(s) of the electrode and/or counter-electrode structures 110, 112, and a second auxiliary electrode 686*b* is positioned over the second vertical end surface(s) of the electrode and/or counter-electrode structures. The auxiliary electrode 686 may be selectively electrically connected or coupled to one or more of the electrode structures 110 and/or the counter-electrode structures 112 of the unit cell members, e.g., by a switch and/or a control unit (not shown). According to certain embodiments, the auxiliary electrode is electrolytically or otherwise coupled to the counter-electrode structure and/or the electrode structure (e.g. through the separator) of members of the unit cell population, to provide a flow of carrier ions from the auxiliary electrode to the electrode and/or counter-electrode structures. By electrolytically coupled, it is meant that the carrier ions can be transferred through electrolyte, such as from the auxiliary electrode to the electrode and/or counter-electrode structures 110, 112, as well as between electrode and counter-electrode structures 110, 112. The auxiliary electrode 686 is also electrically coupled directly or indirectly to the electrode and/or counter-electrode structures, such by a series of wires or other electrical connection.

In one embodiment, the carrier ions are transferred to achieve and/or restore a predetermined counter-electrode structure end of discharge voltage $V_{ces\ eod}$, and a predetermined electrode structure end of discharge voltage $V_{es,eod}$, where for a unit cell of the population, the discharge voltage for the unit cell $V_{cell,eod} = V_{es,eod} - V_{ces,eod}$. For example, in one embodiment, the electrode structure end of discharge voltage $V_{es,eod}$ is less than 0.9 V (vs. Li) and greater than 0.4 V (vs. Li) when the unit cell members and/or secondary battery containing the unit cell members reaches the cell end of discharge voltage $V_{cell,eod}$ during a discharge cycle of the secondary battery (after the initial charge and discharge cycle when SEI is formed). Thus, for example, in one such embodiment the electrode end of discharge voltage $V_{es,eod}$ may be in the range of about 0.5 V (vs. Li) to about 0.8 V (vs. Li) when the secondary battery reaches the cell end of discharge voltage $V_{cell,eod}$ during a discharge cycle of the secondary battery (i.e., when the cell is under a discharge load). By way of further example, in one such embodiment the electrode structure end of discharge voltage $V_{es,eod}$ may be in the range of about 0.6 V (vs. Li) to about 0.8 V (vs. Li) when the secondary battery reaches the cell end of discharge voltage $V_{cell,eod}$ during a discharge cycle of the secondary battery (i.e., when the cell is under a discharge load). In one such embodiment the electrode structure end of discharge voltage $V_{es,eod}$ may be in the range of about 0.6 V (vs. Li) to about 0.7 V (vs. Li) when the secondary battery reaches the cell end of discharge voltage $V_{cell,eod}$ during a discharge cycle of the secondary battery (i.e., when the cell is under a discharge load).

According to yet another embodiment, the predetermined counter-electrode structure $V_{ces,eod}$ value corresponds to a voltage at which the state of charge of the counter-electrode structure is at least 95% of its reversible coulombic capacity and $V_{ces,eod}$ is at least 0.4 V (vs Li) but less than 0.9 V (vs Li). For example, in one such embodiment, when $V_{cell,eod}$ is reached, the counter-electrode structure has a $V_{ces,eod}$ value that corresponds to a voltage at which the state of charge of the counter-electrode structure is at least 96% of its reversible coulombic capacity and $V_{es,eod}$ is at least 0.4 V (vs Li) but less than 0.9 V (vs Li). By way of further example, in one such embodiment when $V_{cell,eod}$ is reached, the counter-electrode structure has a $V_{ces,eod}$ value that corresponds to a voltage at which the state of charge of the counter-electrode structure is at least 97% of its reversible coulombic capacity and $V_{es,eod}$ is at least 0.4 V (vs Li) but less than 0.9 V (vs Li). By way of further example, in one such embodiment when $V_{cell,eod}$ is reached, the counter-electrode structure has a $V_{ces,eod}$ value that corresponds to a voltage at which the state of charge of the counter-electrode structure is at least 98% of its reversible coulombic capacity and $V_{es,eod}$ is at least 0.4 V (vs Li) but less than 0.9 V (vs Li). By way of further example, in one such embodiment when $V_{cell,eod}$ is reached, the counter-electrode structure has a $V_{ces,eod}$ value that corresponds to a voltage at which the state of charge of the counter-electrode structure is at least 99% of its reversible coulombic capacity and $V_{es,eod}$ is at least 0.4 V (vs Li) but less than 0.9 V (vs Li).

According to one embodiment, the method comprises (i) transferring carrier ions from counter-electrode structures to electrode structures in the unit cell population during an initial or subsequent charging cycle to at least partially charge the electrode assembly, and (ii) transferring carrier ions from the auxiliary electrode, to counter-electrode structures and/or electrode structures, through the porous electrically insulating material, the auxiliary electrode being electrolytically coupled to the counter-electrode structure and/or electrode structure of members of the unit cell population, through the separator, to provide the electrode assembly with the predetermined counter-electrode structure end of discharge voltage $V_{cos,eod}$, and the predetermined electrode structure end of discharge voltage $V_{es,eod}$. According to one embodiment, the method further comprises (iii) transferring, after (ii), carrier ions from the counter-electrode structure to the electrode structure of members of the unit cell population to charge the electrode assembly. For example, the carrier ions transferred from the auxiliary electrode during (ii) to the counter-electrode structures can be subsequently transferred from the counter-electrode structures to the electrode structures in (iii). According to yet another embodiment, (ii) is performed simultaneously with (i). According to certain embodiments, in (ii), a bias voltage is applied between the auxiliary electrode and the electrode structure and/or counter-electrode structure of members of the unit cell population to provide a flow of carrier ions through the porous electrically insulating material members to the electrode and/or counter-electrode structures. Similarly, in (i) and (iii) a bias voltage can be applied between the electrode structure and counter-electrode structure of members of the unit cell population, to provide a flow of carrier ions from the counter-electrode structure to the electrode structure of the members.

Referring again to FIG. 4, according to one embodiment, the porous electrically insulating material 508 substantially fills the first and second recesses 505a, 505b of members of the unit cell population 504. According to yet another embodiment, the porous electrically insulating material 508 is disposed such that at least a portion of the porous electrically insulating material 508 covering the first and/or second vertical end surfaces 500a, 500b, 501a, 501b of the electrode structure 110 and/or the counter-electrode structure 112 in a unit cell member is adjacent the electrically insulating separator 130 of that unit cell. For example, in one embodiment, the porous electrically insulating material substantially fills regions of the first and second recesses 505a, 505b that are inwardly disposed with respect to the first and second vertical end surfaces 500a, 500b of the electrode structures 110 in members of the unit cell population, and that are abutting a first side 131a of the electrically insulating separator 130 facing the counter-electrode structure 110. According to certain embodiments, the porous electrically insulating material fills at least a portion of the first and/or second recesses 505a,505b that are recessed inwardly from the first and second vertical end surfaces 502a, 502b of the electrically insulating separator 130, to provide structural support to the electrically insulating separator 130. For example, the porous electrically insulating material can, in certain embodiments, provide a rigid material abutting the first and second vertical ends 133a, 133b of the electrically insulating separator 130, to maintain an upright position of the vertical ends with respect to the first and second vertical end surfaces of the counter-electrode structures 112. Maintaining the position of the vertical ends 133a, 133b of the electrically insulating separator 130 can, in certain embodiments, reduce the likelihood of electrical shorting between the electrode and counter-electrode structures, and other undesirable effects. The porous electrically insulating material can also, in certain embodiments, reduce undesirable electrical edge effects at portions of the first and second vertical end surfaces of the cathode structures.

According to one embodiment, the electrode structures 110 of the members of the unit cell population comprise electrode active material layers 132 and electrode current collector layers 136, and the counter-electrode structures 112 of members of the unit cell population comprise counter-electrode active material layers 138 and counter-electrode current collector layers 140, and the porous electrically insulating material 508 covers first and second vertical end surfaces 507a, 507b the counter-electrode active material layers of the members of the unit cell population. In the embodiment as shown in FIGS. 3A and 4, the porous electrically insulating material extends in the stacking direction across, and covers, the first and second vertical end surfaces 501a, 501b of the counter-electrode structures 112, including across one or more of the first and second vertical end surfaces 507a, 507b of counter-electrode active material layers 138 in adjacent unit cells 504a, 504b, and in certain embodiments across the first and second vertical end surfaces 509a, 509b of the counter-electrode current collector 140 shared by the adjacent unit cells 504. The porous electrically insulating material extending across portions of adjacent unit cells in this embodiment can abut and provide structural support for the vertical ends 133a, 133b of electrically insulating separators 130 in adjacent unit cells. In yet further embodiments, the porous electrically insulating material 508 can be provided on first and second vertical end surfaces of the electrode structures 110, such as on first and second vertical end surfaces 511a, 511b of electrode active material layers 132 in adjacent unit cells 504a, 504b, and across the first and second vertical end surfaces 510a. 510b of the electrode current collector 136 shared by the adjacent unit cells 504.

According to yet further embodiments, the porous electrically insulating material 508 is provided on those portions of the first and second vertical end surfaces of the electrode and counter-electrode structures where a path is provided for flow of carrier ions from the auxiliary electrode to the members of the unit cell population. For example, in embodiments where a flow of carrier ions is provided from the auxiliary electrode 686 to the counter-electrode structures 112, the porous electrically insulating material 508 is disposed on first and second vertical end surfaces of the counter-electrode structures, to provide a path for carrier ions to the counter-electrode structures. As another example, in embodiments where a flow of carrier ions is provided from the auxiliary electrode to the electrode structures 110, the porous electrically insulating material 508 is disposed on first and second vertical end surfaces of the electrode structures, to provide a path for carrier ions to the electrode structures.

According to certain embodiments, a porosity of the electrically insulating material can be selected to provide a predetermined conductivity of carrier ions through the material. In certain embodiments, the porous electrically insulating material comprises a porosity of at least 25%, at least 30%, at least 35%, at least 40%, at least 45%, at least 50%, and/or at least 55%. Furthermore, in certain embodiments, the porous electrically insulating material comprises a porosity of no more than 55%, no more than 50%, no more than 45%, no more than 40%, and/or no more than 35%. According to yet another embodiment, the porous electrically insulating material 508 comprises a ratio of porosity with respect to a porosity of the electrically insulating separators 130 between electrode and counter-electrode structures within members of the unit cell population that is in a range of from 1:0.75 to 1:1.5.

In one embodiment, the porous electrically insulating material 508 comprises particulate material dispersed in a binder material. For example, the particular material can comprise a stable metal oxide and/or ceramic, such as one or more of alumina, boron nitride, titanic, silica, zirconia, magnesium oxide and calcium oxide. In another embodiment, the particulate material comprises particles having a d50 particle size (median particle size) of at least 0.35 microns, at least 0.45 microns, at least 0.5 microns, and/or at least 0.75 microns. In yet another embodiment, the particulate material comprises particles having a d50 particle size (median particle size) of no more than 40 microns, no more than 35 microns, no more than 25 microns and/or no more than 20 microns. In one embodiment, at least 80%, at least 85%, at least 90%, and/or at least 95% by weight of the particles have a particle size of at least 0.35 microns, at least 0.45 microns, at least 0.5 microns, and/or at least 0.75 microns, and no more than 40 microns, no more than 35 microns, no more than 25 microns and/or no more than 20 microns. Furthermore, in one embodiment, the particulate material comprises at least 70 wt %, at least 75 wt %, at least 80 wt %, and/or at least 85 wt %, of the porous electrically insulating material. In a further embodiment, the particulate material comprises no more than 99.5 wt %, no more than 97 wt %, no more than 95 wt %, and/or no more than 90 wt % of the porous electrically insulating material. In one embodiment, the binder material comprises a polymeric material selected from any of the group consisting of polyvinylidene fluoride (PVDF), polyethylene, polypropylene, ethylene acrylic acid (EAA), ethylene methacrylic acid (EMAA), and copolymers thereof.

Referring to FIGS. 1A-1D, according to one embodiment, the electrode assembly 106 has mutually perpendicular transverse, longitudinal and vertical axes corresponding to the x, y and z axes, respectively, of an imaginary three-dimensional Cartesian coordinate system, a first longitudinal end surface 116 and a second longitudinal end surface 118 separated from each other in the longitudinal direction, and a lateral surface 142 surrounding an electrode assembly longitudinal axis $A_{EA}$ and connecting the first and second longitudinal end surfaces 116, 118. The lateral surface 142 comprises first and second regions on opposite sides of the longitudinal axis and separated in a first direction that is orthogonal to the longitudinal axis. For example, the lateral surface 142 can comprise opposing surface regions 144, 146 in the X direction (i.e., the side surfaces of the rectangular prism) and opposing surface regions 148, 150 in the Z direction. In yet another embodiment, the lateral surface can comprise a cylindrical shape. The electrode assembly 106 can further comprise a maximum width $W_{EA}$ measured in the longitudinal direction, a maximum length $L_{EA}$ bounded by the lateral surface and measured in the transverse direction, and a maximum height $H_{EA}$ bounded by the lateral surface and measured in the vertical direction. In one embodiment, a ratio of the maximum length $L_{EA}$ to the maximum height $H_{EA}$ may be at least 2:1. By way of further example, in one embodiment a ratio of the maximum length $L_{EA}$ to the maximum height $H_{EA}$ may be at least 5:1. By way of further example, in one embodiment, the ratio of the maximum length $L_{EA}$ to the maximum height $H_{EA}$ may be at least 10:1. By way of further example, in one embodiment, the ratio of the maximum length $L_{EA}$ to the maximum height $H_{EA}$ may be at least 15:1. By way of further example, in one embodiment, the ratio of the maximum length $L_{EA}$ to the maximum height $H_{EA}$ may be at least 20:1. The ratios of the different dimensions may allow for optimal configurations within an energy storage device to maximize the amount of active materials, thereby increasing energy density.

In some embodiments, the maximum width $W_{EA}$ may be selected to provide a width of the electrode assembly 106 that is greater than the maximum height $H_{EA}$. For example, in one embodiment, a ratio of the maximum width $W_{EA}$ to the maximum height $H_{EA}$ may be at least 2:1. By way of further example, in one embodiment, the ratio of the maximum width $W_{EA}$ to the maximum height $H_{EA}$ may be at least 5:1. By way of further example, in one embodiment, the ratio of the maximum width $W_{EA}$ to the maximum height $H_{EA}$ may be at least 10:1. By way of further example, in one embodiment, the ratio of the maximum width $W_{EA}$ to the maximum height $H_{EA}$ may be at least 15:1. By way of further example, in one embodiment, the ratio of the maximum width $W_{EA}$ to the maximum height $H_{EA}$ may be at least 20:1.

According to one embodiment, a ratio of the maximum width $W_{EA}$ to the maximum length $L_{EA}$ may be selected to be within a predetermined range that provides for an optimal configuration. For example, in one embodiment, a ratio of the maximum width $W_{EA}$ to the maximum length $L_{EA}$ may be in the range of from 1:5 to 5:1. By way of further example, in one embodiment a ratio of the maximum width $W_{EA}$ to the maximum length $L_{EA}$ may be in the range of from 1:3 to 3:1. By way of yet a further example, in one embodiment a ratio of the maximum width $W_{EA}$ to the maximum length $L_{EA}$ may be in the range of from 1:2 to 2:1.

According to embodiments of the present disclosure, each electrode structure 110 of members of the unit cell population comprise a length $L_E$ as measured in the transverse direction between first and second opposing transverse end surfaces 601a, 601b of the electrode structure 110, and a height $H_E$ as measured in the vertical direction between first and second opposing vertical end surfaces 500a, 500b of the electrode structure, and a width $W_E$ as measured in the longitudinal direction between first and second opposing surfaces 603a, 603b of the electrode structure, and each counter-electrode structure of members of the unit cell population comprises a length $L_{CE}$ as measured in the transverse direction between first and second opposing transverse end surfaces 602a, 602b of the counter-electrode structure, a height HOE as measured in the vertical direction between first and second opposing vertical end surfaces 501a, 501b of the counter-electrode structure, and a width WOE as measured in the longitudinal direction between first and second opposing surfaces 604a, 604b of the counter-electrode structure.

According to one embodiment, a ratio of $L_E$ to each of $W_E$ and $H_E$ is at least 5:1, respectively, and a ratio of $H_E$ to $W_E$ is in the range of about 2:1 to about 100:1, for electrode structures 110 of members of the unit cell population, and the ratio of $L_{CE}$ to each of $W_{CE}$ and $H_{CE}$ is at least 5:1, respectively, and a ratio of $H_{CE}$ to $W_{CE}$ is in the range of about 2:1 to about 100:1, for counter-electrode structures 112 of members of the unit cell population. By way of further example, in one embodiment the ratio of $L_E$ to each of $W_E$ and $H_E$ is at least 10:1, and the ratio of $L_{CE}$ to each of $W_{CE}$ and $H_{CE}$ is at least 10:1. By way of further example, in one embodiment, the ratio of $L_E$ to each of $W_E$ and $H_E$ is at least 15:1, and the ratio of $L_{CE}$ to each of $W_{CE}$ and $H_{CE}$ is at least 15:1. By way of further example, in one embodiment, the ratio of $L_E$ to each of $W_E$ and $H_E$ is at least 20:1, and the ratio of $L_{CE}$ to each of $W_{CE}$ and $H_{CE}$ is at least 20:1.

In one embodiment, the ratio of the height ($H_E$) to the width ($W_E$) of the electrode structures 110 is at least 0.4:1, respectively. For example, in one embodiment, the ratio of $H_E$ to $W_E$ will be at least 2:1, respectively, for each electrode structure 110 of members of the unit cell population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each electrode structure of members of the unit cell population.

In one embodiment, the ratio of the height ($H_{CE}$) to the width ($W_{CE}$) of the counter-electrode structures 112 is at least 0.4:1, respectively. For example, in one embodiment, the ratio of $H_{CE}$ to $W_{CE}$ will be at least 2:1, respectively, for each counter-electrode structure 112 of members of the unit cell population. By way of further example, in one embodiment the ratio of $H_{CE}$ to $W_{CE}$ will be at least 10:1, respectively. By way of further example, in one embodiment the ratio of $H_{CE}$ to $W_{CE}$ will be at least 20:1, respectively. Typically, however, the ratio of $H_{CE}$ to $W_{CE}$ will generally be less than 1,000:1, respectively. For example, in one embodiment the ratio of $H_{CE}$ to $W_{CE}$ will be less than 500:1, respectively. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each counter-electrode structure of members of the unit cell population.

In one embodiment, the unit cell populations can comprise alternating sequence of electrode and counter-electrode structures 110, 112, and, may include any number of members, depending on the energy storage device 100 and the intended use thereof. By way of further example, in one embodiment, and stated more generally, the population of electrode structures 110 and the population of counter-electrode structures 112 each have N members, each of N–1 electrode structure members 110 is between two counter-electrode structure members 112, each of N–1 counter-electrode structure members 112 is between two electrode structure members 110, and N is at least 2. By way of further example, in one embodiment, N is at least 4. By way of further example, in one embodiment, N is at least 5. By way of further example, in one embodiment, N is at least 10. By way of further example, in one embodiment, N is at least 25. By way of further example, in one embodiment, N is at least 50. By way of further example, in one embodiment, N is at least 100 or more.

Figure 5:
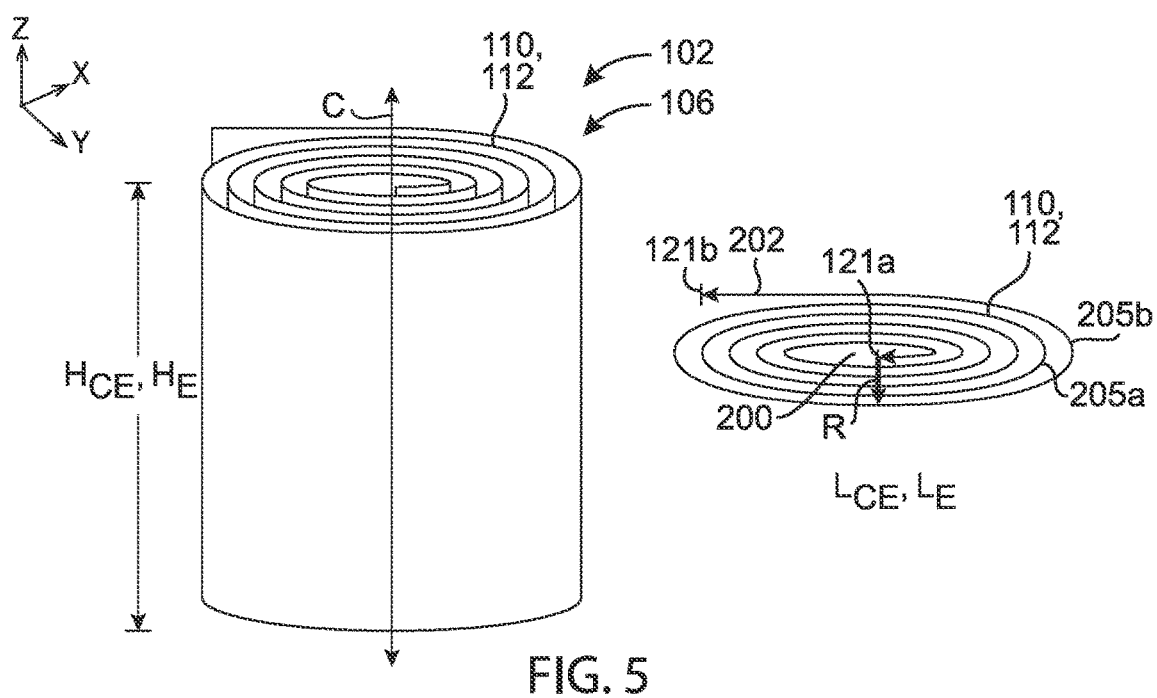
FIG. 5 is a perspective and cross-sectional views of embodiments of secondary batteries comprising wound electrode assemblies.

Referring to FIG. 5, in one embodiment the electrode assembly 106 comprises a wound electrode assembly having a plurality of winds 205a, 205b of electrode and counter-electrode structures 110, 112 of members of the unit cell population about a central axis C of the wound electrode assembly, and wherein the vertical direction of the wound electrode assembly is parallel to the central axis (z direction), and further wherein the electrode and counter-electrode structures of members of the unit cell population comprise a length $L_E$ and $L_{CE}$, respectively, defined as extending from a first end 121a of the counter-electrode structure at a central region 200 of the wound electrode assembly, and along each wind to a second end 121b of the counter-electrode structure at an exterior region 202 of the electrode assembly. In the embodiment as shown, the wound electrode assembly comprises a generally cylindrical shape.

Figure 6A:
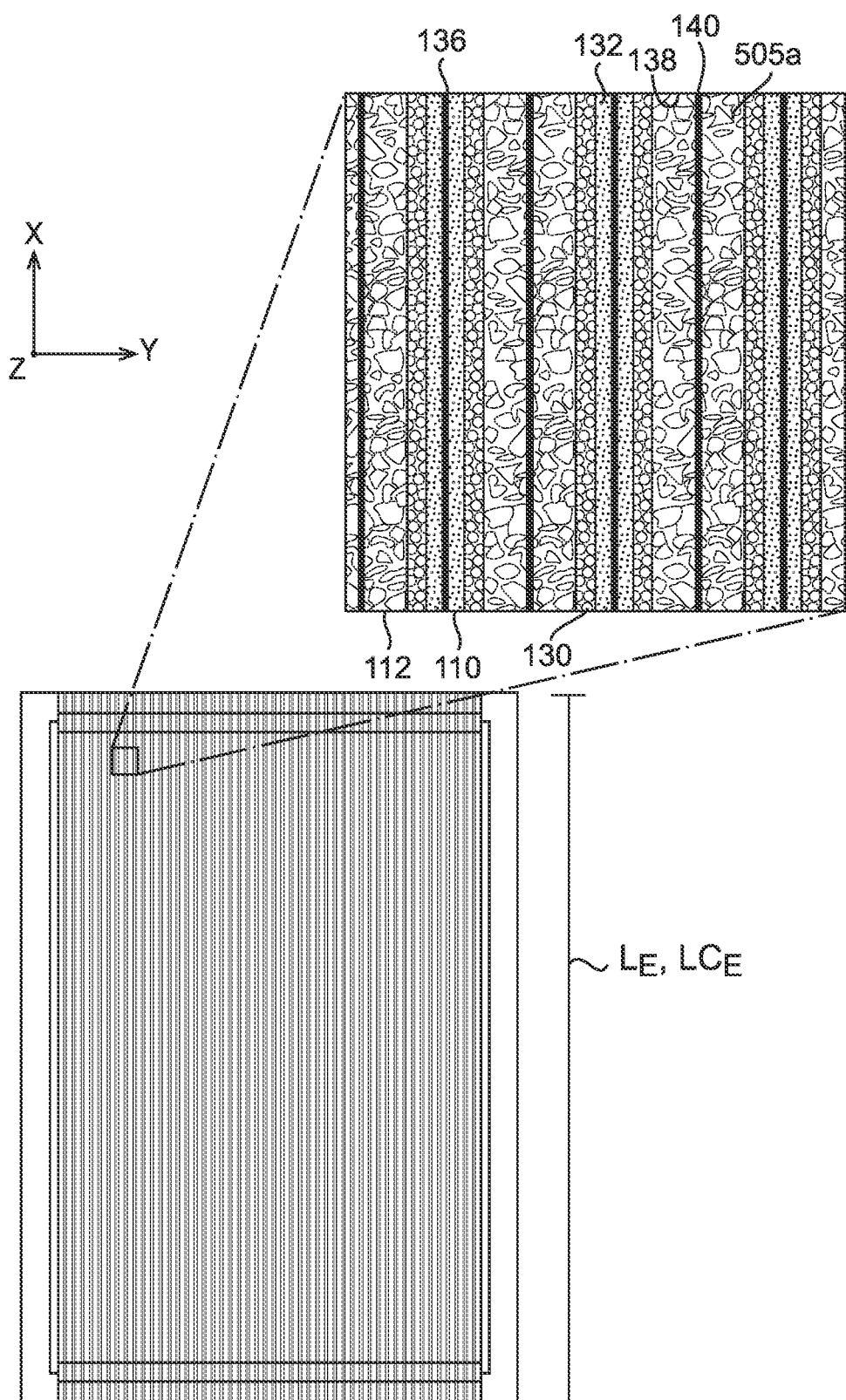
FIGS. 6A and 6B are top views with inset views of an embodiment of an electrode assembly before (6A) and after (6B) providing a porous electrically insulating material to first and/or second vertical end surfaces of electrodes and/or counter-electrodes of the electrode assembly.
Figure 6B:
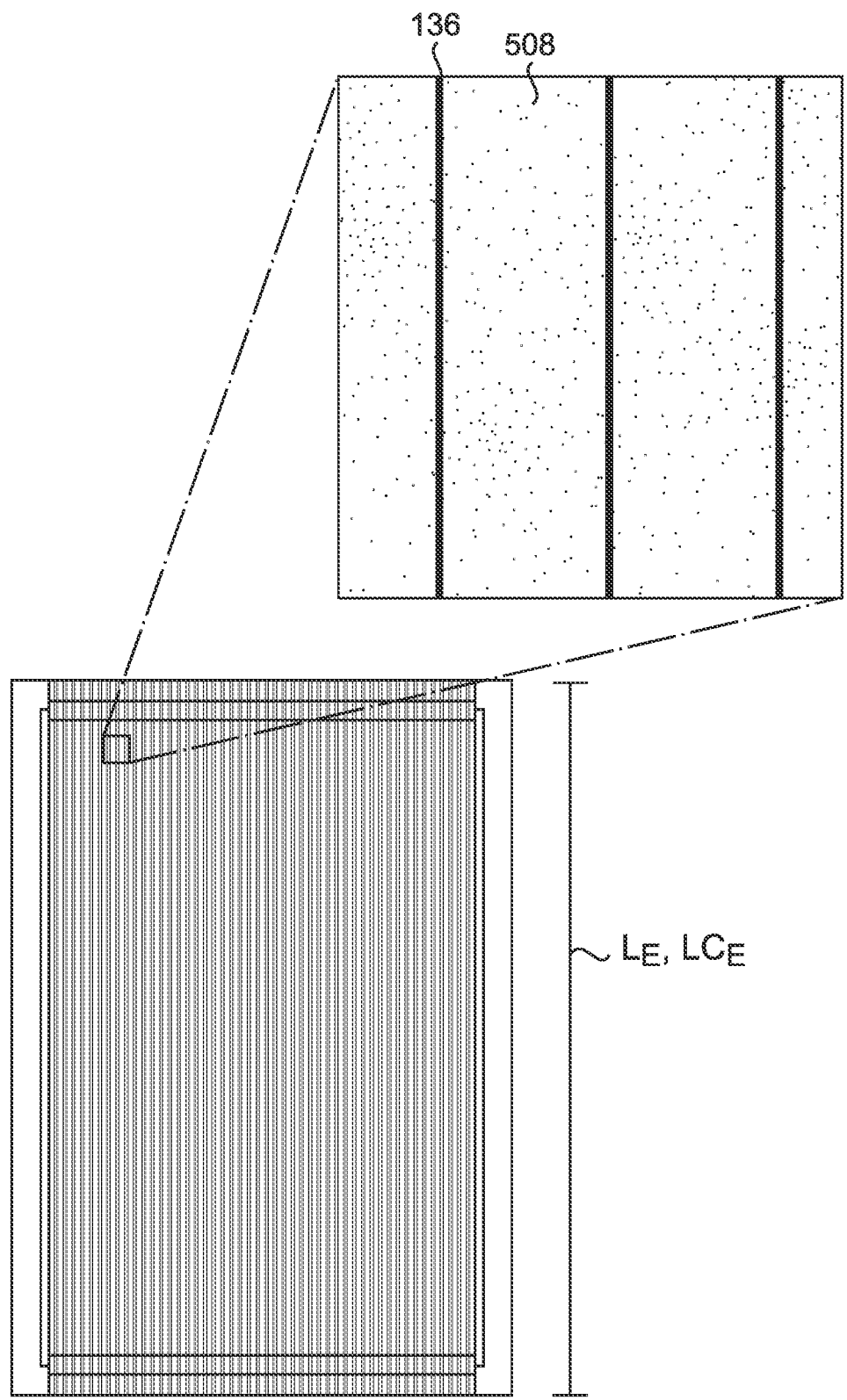

According to one embodiment, the porous electrically insulating material extends at least 50%, at least 60%, at least 75%, at least 85%, and/or at least 90% of the length $L_{CE}$ of the counter-electrode structure of members of the unit cell population, and/or extends at least 50%, at least 60%, at least 75%, at least 85%, and/or at least 90% of the length $L_E$ of the electrode structure of members of the unit cell population. Referring to FIGS. 6A-6B, embodiments are shown of a top view of the electrode assembly without the porous electrically insulating material 508 (FIG. 6A), and the electrode assembly with the porous electrically insulating material 508 being provided to fill recesses 505a, 505b that are in the shape of trenches extending along the length $L_{CE}$ of the counter-electrode structures (FIG. 6B). In the embodiment shown in FIG. 6B, the porous electrically insulating material 508 covers the counter-electrode active material layers 138 and counter-electrode current collectors 140. In addition to covering the first and second vertical end surfaces 501a, 501b of the cathode structures, the embodiment as shown in FIG. 6B further comprises porous electrically insulating material covering the length of electrode active material layers 132 of the electrode structures 110, such that only the electrode current collectors 136 remain exposed.

Figure 1B:
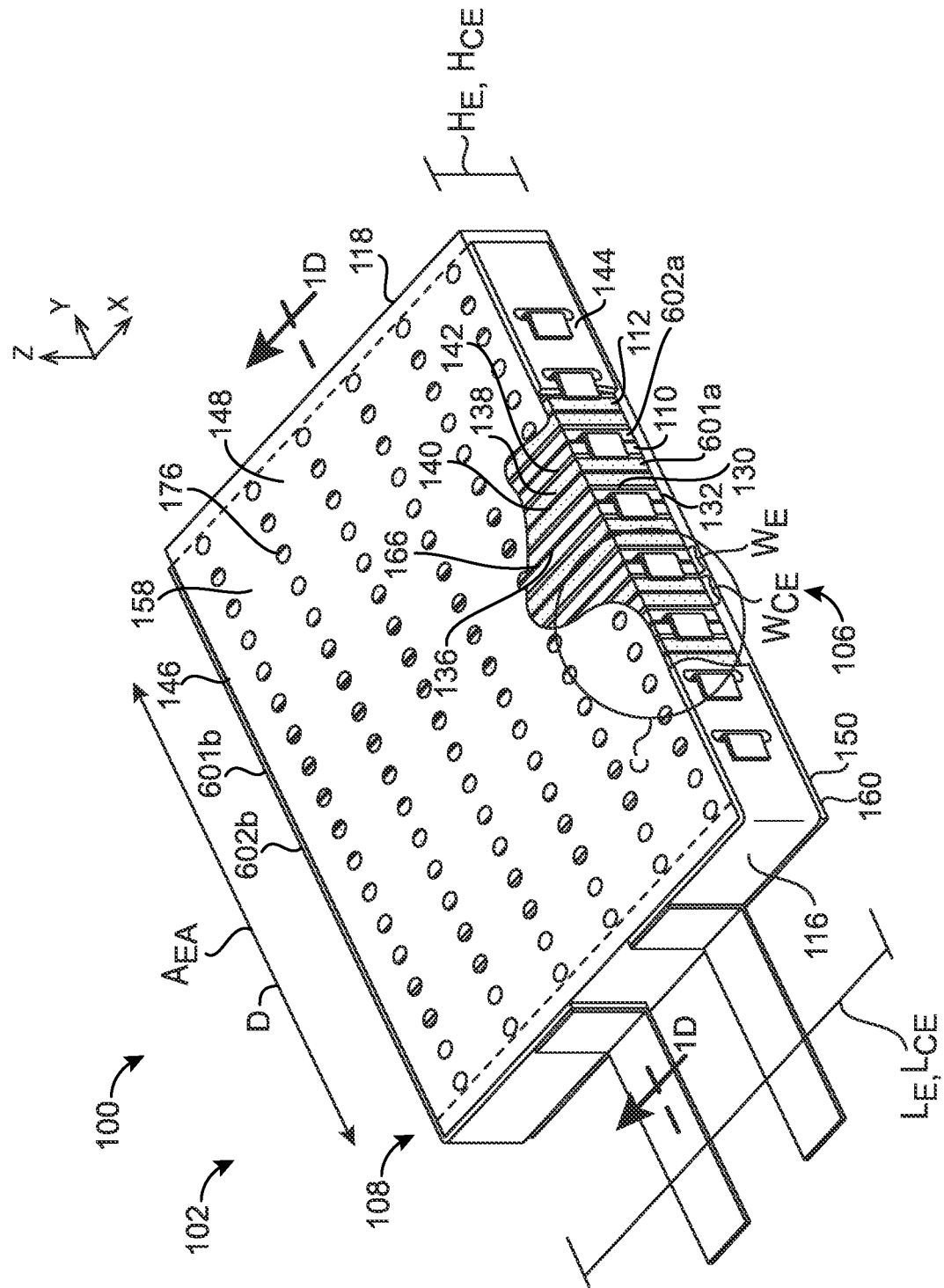
FIG. 1B is a schematic of one embodiment of a three-dimensional electrode assembly for a secondary battery.
Figure 1C:
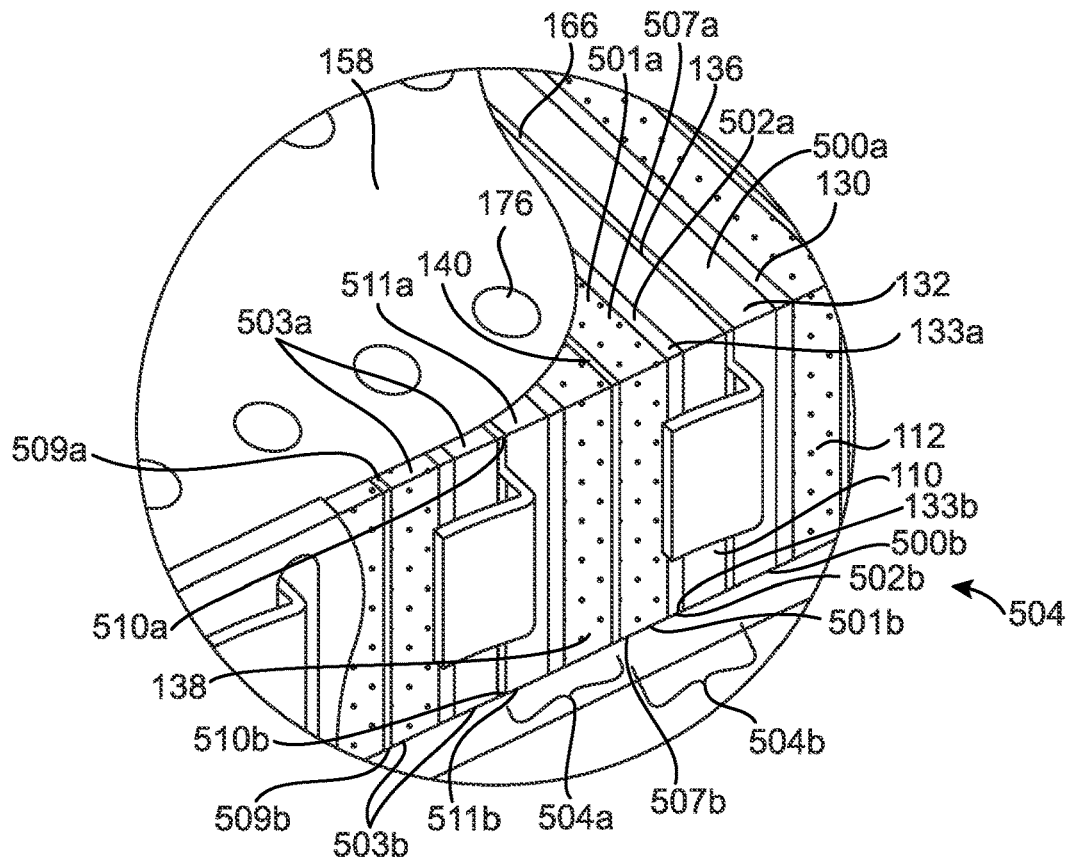
FIG. 1C is an inset cross-sectional view of the electrode assembly of FIG. 1B.
Figure 1D:
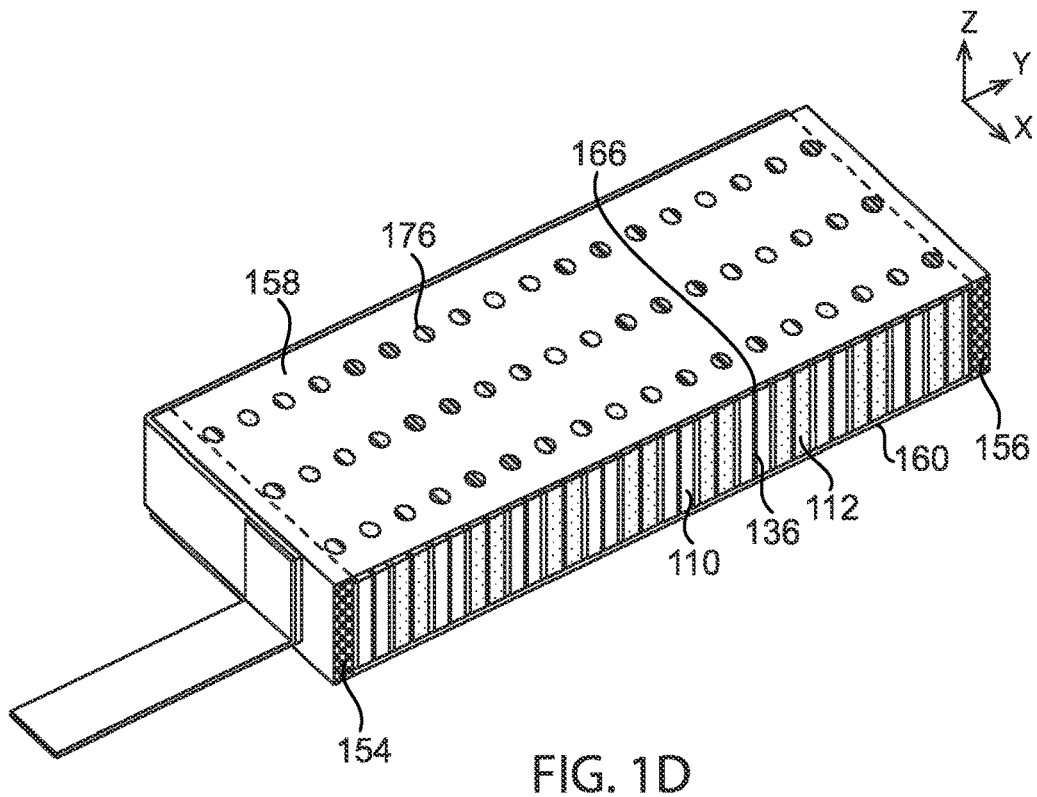
FIG. 1D is a cross-sectional view of the electrode assembly of FIG. 1B, taken along line D in FIG. 1B.

In one embodiment, the electrode assembly 106 is enclosed within a volume V defined by the set of electrode constraints 108 that restrain overall macroscopic growth of the electrode assembly 106, as illustrated for example in FIG. 1A. The set of electrode constraints 108 may be capable of restraining growth of the electrode assembly 106 along one or more dimensions, such as to reduce swelling and deformation of the electrode assembly 106, and thereby improve the reliability and cycling lifetime of an energy storage device 100 having the set of electrode constraints 108. Without being limited to any one particular theory, it is believed that carrier ions traveling between the electrode structures 110 and counter-electrode structures 112 during charging and/or discharging of a secondary battery 102 and/or electrode assembly can become inserted into electrode active material, causing the electrode active material and/or the electrode structure 110 to expand. This expansion of the electrode structure 110 can cause the electrodes and/or electrode assembly 106 to deform and swell, thereby compromising the structural integrity of the electrode assembly 106, and/or increasing the likelihood of electrical shorting or other failures. In one example, excessive swelling and/or expansion and contraction of the electrode active material layer 132 during cycling of an energy storage device 100 can cause fragments of electrode active material to break away and/or delaminate from the electrode active material layer 132, thereby compromising the efficiency and cycling lifetime of the energy storage device 100. In yet another example, excessive swelling and/or expansion and contraction of the electrode active material layer 132 can cause electrode active material to breach the electrically insulating microporous separator 130, thereby causing electrical shorting and other failures of the electrode assembly 106. Accordingly, the set of electrode constraints 108 inhibit this swelling or growth that can otherwise occur with cycling between charged and discharged states to improve the reliability, efficiency, and/or cycling lifetime of the energy storage device 100.

In one embodiment, a set of electrode constraints 108 comprising a primary growth constraint system 151 is provided to mitigate and/or reduce at least one of growth, expansion, and/or swelling of the electrode assembly 106 in the longitudinal direction (i.e., in a direction that parallels the Y axis), as shown for example in FIG. 1A. For example, the primary growth constraint system 151 can include structures configured to constrain growth by opposing expansion at longitudinal end surfaces 116, 118 of the electrode assembly 106. In one embodiment, the primary growth constraint system 151 comprises first and second primary growth constraints 154, 156, that are separated from each other in the longitudinal direction (stacking direction), and that can operate in conjunction with at least one primary connecting member 162 that connects the first and second primary growth constraints 154, 156 together to restrain growth in the electrode assembly 106 in the stacking direction. For example, the first and second primary growth constraints 154, 156 may at least partially cover first and second longitudinal end surfaces 116, 118 of the electrode assembly 106, and may operate in conjunction with connecting members 162, 164 connecting the primary growth constraints 154, 156 to one another to oppose and restrain any growth in the electrode assembly 106 that occurs during repeated cycles of charging and/or discharging.

In addition, repeated cycling through charge and discharge processes in a secondary battery 102 can induce growth and strain not only in a longitudinal direction of the electrode assembly 106 (e.g., Y-axis in FIG. 1A), but can also induce growth and strain in directions orthogonal to the longitudinal direction, as discussed above, such as the transverse and vertical directions (e.g., X and Z axes, respectively, in FIG. 1A). Furthermore, in certain embodiments, the incorporation of a primary growth constraint system 151 to inhibit growth in one direction can even exacerbate growth and/or swelling in one or more other directions. For example, in a case where the primary growth constraint system 151 is provided to restrain growth of the electrode assembly 106 in the longitudinal direction, the intercalation of carrier ions during cycles of charging and discharging and the resulting swelling of electrode structures can induce strain in one or more other directions. In particular, in one embodiment, the strain generated by the combination of electrode growth/swelling and longitudinal growth constraints can result in buckling or other failure(s) of the electrode assembly 106 in the vertical direction (e.g., the Z axis as shown in FIG. 1A), or even in the transverse direction (e.g., the X axis as shown in FIG. 1A). Accordingly, in one embodiment of the present disclosure, a secondary growth constraint system 152 is provided that may operate in conjunction with the primary growth constraint system 151 to restrain growth of the electrode assembly 106 along multiple axes of the electrode assembly 106. For example, in one embodiment, the secondary growth constraint system 152 may be configured to interlock with, or otherwise synergistically operate with, the primary growth constraint system 151, such that overall growth of the electrode assembly 106 can be restrained to impart improved performance and reduced incidence of failure of the secondary battery having the electrode assembly 106 and primary and secondary growth constraint systems 151, 152, respectively.

Figure 7A:
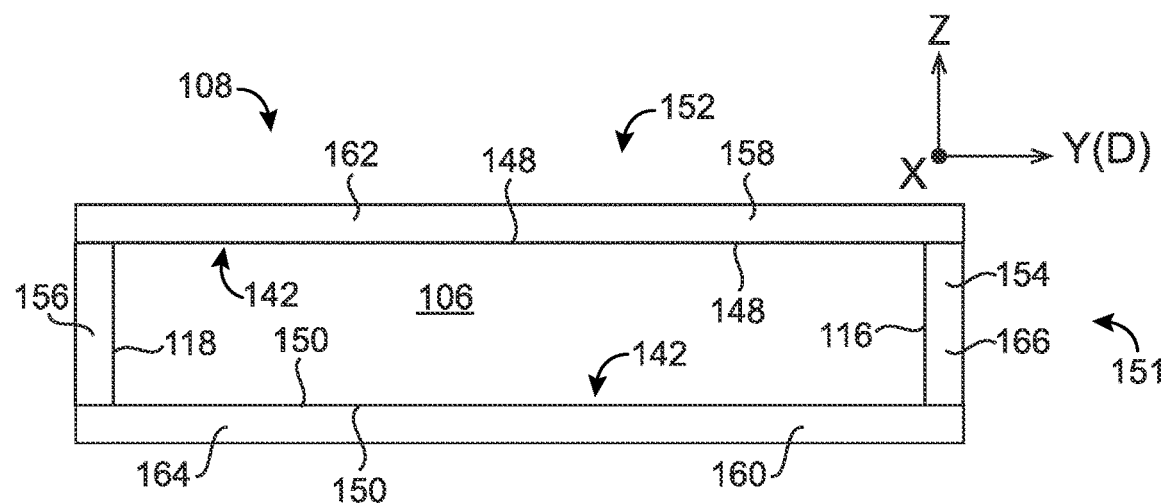
FIG. 7A illustrates a cross-section of an embodiment of the electrode assembly taken along the line A-A' as shown in FIG. 1A, and illustrates elements of embodiments of primary and secondary growth constraint systems.
Figure 7B:
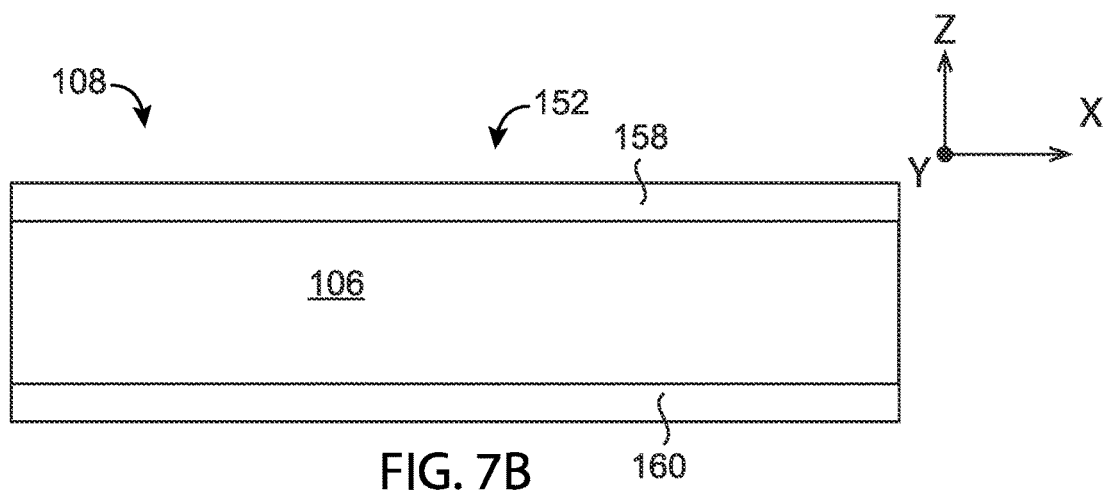
FIG. 7B illustrates a cross-section of an embodiment of the electrode assembly taken along the line B-B' as shown in FIG. 1A, and illustrates elements of embodiments of primary and secondary growth constraint systems.
Figure 7C:
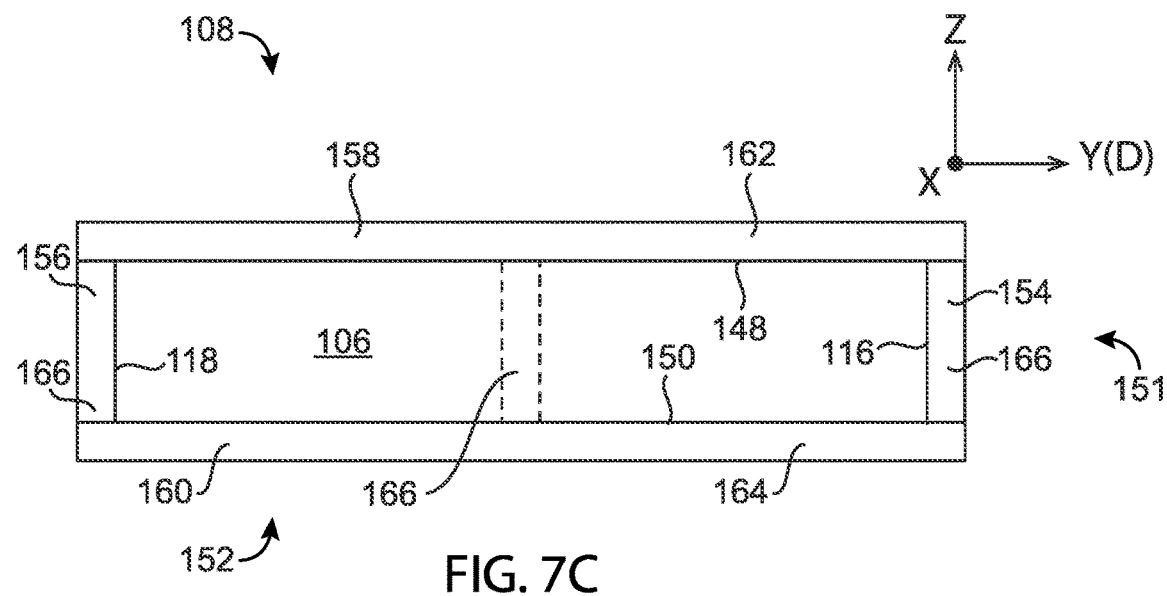
FIG. 7C illustrates a cross section of an embodiment of the electrode assembly taken along the line A-A' as shown in FIG. 1A, and illustrates further elements of embodiments of primary and secondary growth constraint systems.

Referring to FIGS. 7A-7C, an embodiment of a set of electrode constraints 108 is shown having the primary growth constraint system 151 and the secondary growth constraint system 152 for an electrode assembly 106. FIG. 7A shows a cross-section of the electrode assembly 106 in FIG. 1A taken along the longitudinal axis (Y axis), such that the resulting 2-D cross-section is illustrated with the vertical axis (Z axis) and longitudinal axis (Y axis). FIG. 7B shows a cross-section of the electrode assembly 106 in FIG. 1A taken along the transverse axis (X axis), such that the resulting 2-D cross-section is illustrated with the vertical axis (Z axis) and transverse axis (X axis). As shown in FIG. 7A, the primary growth constraint system 151 can generally comprise first and second primary growth constraints 154, 156, respectively, that are separated from one another along the longitudinal direction (Y axis). For example, in one embodiment, the first and second primary growth constraints 154, 156, respectively, comprise a first primary growth constraint 154 that at least partially or even entirely covers a first longitudinal end surface 116 of the electrode assembly 106, and a second primary growth constraint 156 that at least partially or even entirely covers a second longitudinal end surface 118 of the electrode assembly 106. In yet another version, one or more of the first and second primary growth constraints 154, 156 may be interior to the longitudinal end surfaces 116, 118 of the electrode assembly 106, such as when one or more of the primary growth constraints comprise an internal structure of the electrode assembly 106. The primary growth constraint system 151 can further comprise at least one primary connecting member 162 that connects the first and second primary growth constraints 154, 156, and that may have a principal axis that is parallel to the longitudinal direction. For example, the primary growth constraint system 151 can comprise first and second primary connecting members 162, 164, respectively, that are separated from each other along an axis that is orthogonal to the longitudinal axis, such as along the vertical axis (Z axis) as depicted in the embodiment. The first and second primary connecting members 162, 164, respectively, can serve to connect the first and second primary growth constraints 154, 156, respectively, to one another, and to maintain the first and second primary growth constraints 154, 156, respectively, in tension with one another, so as to restrain growth along the longitudinal axis of the electrode assembly 106.

Further shown in FIGS. 7A-7C, the set of electrode constraints 108 can further comprise the secondary growth constraint system 152, that can generally comprise first and second secondary growth constraints 158, 160, respectively, that are separated from one another along a second direction orthogonal to the longitudinal direction, such as along the vertical axis (Z axis) in the embodiment as shown. For example, in one embodiment, the first secondary growth constraint 158 at least partially extends across a first region 148 of the lateral surface 142 of the electrode assembly 106, and the second secondary growth constraint 160 at least partially extends across a second region 150 of the lateral surface 142 of the electrode assembly 106 that opposes the first region 148. In yet another version, one or more of the first and second secondary growth constraints 158, 160 may be interior to the lateral surface 142 of the electrode assembly 106, such as when one or more of the secondary growth constraints comprise an internal structure of the electrode assembly 106. In one embodiment, the first and second secondary growth constraints 158, 160, respectively, are connected by at least one secondary connecting member 166, which may have a principal axis that is parallel to the second direction, such as the vertical axis. The secondary connecting member 166 may serve to connect and hold the first and second secondary growth constraints 158, 160, respectively, in tension with one another, so as to restrain growth of the electrode assembly 106 along a direction orthogonal to the longitudinal direction, such as for example to restrain growth in the vertical direction (e.g., along the Z axis). In the embodiment depicted in FIG. 7A, the at least one secondary connecting member 166 can correspond to at least one of the first and second primary growth constraints 154, 156. However, the secondary connecting member 166 is not limited thereto, and can alternatively and/or in addition comprise other structures and/or configurations.

According to one embodiment, the primary and secondary growth constraint systems 151, 152, respectively are configured to cooperatively operate such that portions of the primary growth constraint system 151 cooperatively act as a part of the secondary growth constraint system 152, and/or portions of the secondary growth constraint system 152 cooperatively act as a part of the primary growth constraint system 151. For example, in the embodiment shown in in FIGS. 7A and 7B, the first and second primary connecting members 162, 164, respectively, of the primary growth constraint system 151 can serve as at least a portion of, or even the entire structure of, the first and second secondary growth constraints 158, 160 that constrain growth in the second direction orthogonal to the longitudinal direction. In yet another embodiment, as mentioned above, one or more of the first and second primary growth constraints 154, 156, respectively, can serve as one or more secondary connecting members 166 to connect the first and second secondary growth constrains 158, 160, respectively. Conversely, at least a portion of the first and second secondary growth constraints 158, 160, respectively, can act as first and second primary connecting members 162, 164, respectively, of the primary growth constraint system 151, and the at least one secondary connecting member 166 of the secondary growth constraint system 152 can, in one embodiment, act as one or more of the first and second primary growth constraints 154, 156, respectively. Accordingly, the primary and secondary growth constraint systems 151, 152, respectively, can share components and/or structures to exert restraint on the growth of the electrode assembly 106.

In one embodiment, the set of electrode constraints 108 can comprise structures such as the primary and secondary growth constraints, and primary and secondary connecting members, that are structures that are external to and/or internal to the battery enclosure 104, or may be a part of the battery enclosure 104 itself. In certain embodiments, the battery enclosure 104 may be a sealed enclosure, for example to seal liquid electrolyte therein, and/or to seal the electrode assembly 106 from the external environment. In one embodiment, the set of electrode constraints 108 can comprise a combination of structures that includes the battery enclosure 104 as well as other structural components. In one such embodiment, the battery enclosure 104 may be a component of the primary growth constraint system 151 and/or the secondary growth constraint system 152; stated differently, in one embodiment, the battery enclosure 104, alone or in combination with one or more other structures (within and/or outside the battery enclosure 104, for example, the primary growth constraint system 151 and/or a secondary growth constraint system 152) restrains growth of the electrode assembly 106 in the electrode stacking direction D and/or in the second direction orthogonal to the stacking direction, D. In one embodiment, one or more of the primary growth constraints 154, 156 and secondary growth constraints 158, 160 can comprise a structure that is internal to the electrode assembly. In another embodiment, the primary growth constraint system 151 and/or secondary growth constraint system 152 do not form any part of the battery enclosure 104, and instead one or more discrete structures (within and/or outside the battery enclosure 104) other than the battery enclosure 104 restrains growth of the electrode assembly 106 in the electrode stacking direction, D, and/or in the second direction orthogonal to the stacking direction, D. In another embodiment, the primary and secondary growth constraint systems 151, 152 are within the battery enclosure 104, which may be a sealed battery enclosure, such as a hermetically sealed battery enclosure. The electrode assembly 106 may be restrained by the set of electrode constraints 108 at a pressure that is greater than the pressure exerted by growth and/or swelling of the electrode assembly 106 during repeated cycling of an energy storage device 100 or a secondary battery 102 having the electrode assembly 106.

In one exemplary embodiment, the primary growth constraint system 151 includes one or more discrete structure(s) within the battery enclosure 104 that restrains growth of the electrode structure 110 in the stacking direction D by exerting a pressure that exceeds the pressure generated by the electrode structure 110 in the stacking direction D upon repeated cycling of a secondary battery 102 having the electrode structure 110 as a part of the electrode assembly 106. In another exemplary embodiment, the primary growth constraint system 151 includes one or more discrete structures within the battery enclosure 104 that restrains growth of the counter-electrode structure 112 in the stacking direction D by exerting a pressure in the stacking direction D that exceeds the pressure generated by the counter-electrode structure 112 in the stacking direction D upon repeated cycling of a secondary battery 102 having the counter-electrode structure 112 as a part of the electrode assembly 106. The secondary growth constraint system 152 can similarly include one or more discrete structures within the battery enclosure 104 that restrain growth of at least one of the electrode structures 110 and counter-electrode structures 112 in the second direction orthogonal to the stacking direction D, such as along the vertical axis (Z axis), by exerting a pressure in the second direction that exceeds the pressure generated by the electrode or counter-electrode structure 110, 112, respectively, in the second direction upon repeated cycling of a secondary battery 102 having the electrode or counter-electrode structures 110, 112, respectively.

In yet another embodiment, the first and second primary growth constraints 154, 156, respectively, of the primary growth constraint system 151 restrain growth of the electrode assembly 106 by exerting a pressure on the first and second longitudinal end surfaces 116, 118 of the electrode assembly 106, meaning, in a longitudinal direction, that exceeds a pressure exerted by the first and second primary growth constraints 154, 156 on other surfaces of the electrode assembly 106 that would be in a direction orthogonal to the longitudinal direction, such as opposing first and second regions of the lateral surface 142 of the electrode assembly 106 along the transverse axis and/or vertical axis. That is, the first and second primary growth constraints 154, 156 may exert a pressure in a longitudinal direction (Y axis) that exceeds a pressure generated thereby in directions orthogonal thereto, such as the transverse (X axis) and vertical (Z axis) directions. For example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D. In another embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D, by a factor of at least 2. For example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D, by a factor of at least 3. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 by the primary growth constraint system 151 in at least one, or even both, of the two directions that are perpendicular to the stacking direction D by a factor of at least 4. By way of further example, in one such embodiment, the primary growth constraint system 151 restrains growth of the electrode assembly 106 with a pressure on first and second longitudinal end surfaces 116, 118 (i.e., in the stacking direction D) that exceeds the pressure maintained on the electrode assembly 106 in at least one, or even both, of the two directions that are perpendicular to the stacking direction D, by a factor of at least 5.

Referring now to FIG. 7C, an embodiment of an electrode assembly 106 with a set of electrode constraints 108 is shown, with a cross-section taken along the line A-A' as shown in FIG. 1A. In the embodiment shown in FIG. 7C, the primary growth constraint system 151 can comprise first and second primary growth constraints 154, 156, respectively, at the longitudinal end surfaces 116, 118 of the electrode assembly 106, and the secondary growth constraint system 152 comprises first and second secondary growth constraints 158, 160 at the opposing first and second surface regions 148, 150 of the lateral surface 142 of the electrode assembly 106. According to this embodiment, the first and second primary growth constraints 154, 156 can serve as the at least one secondary connecting member 166 to connect the first and second secondary growth constrains 158, 160 and maintain the growth constraints in tension with one another in the second direction (e.g., vertical direction) that is orthogonal to the longitudinal direction. However, additionally and/or alternatively, the secondary growth constraint system 152 can comprise at least one secondary connecting member 166 that is located at a region other than the longitudinal end surfaces 116, 118 of the electrode assembly 106. Also, the at least one secondary connecting member 166 can be understood to act as at least one of a first and second primary growth constraint 154, 156 that is internal to the longitudinal ends 116, 118 of the electrode assembly, and that can act in conjunction with either another internal primary growth restraint and/or a primary growth restraint at a longitudinal end 116, 118 of the electrode assembly 106 to restrain growth. Referring to the embodiment shown in FIG. 7C, a secondary connecting member 166 can be provided that is spaced apart along the longitudinal axis away from the first and second longitudinal end surfaces 116, 118, respectively, of the electrode assembly 106, such as toward a central region of the electrode assembly 106. The secondary connecting member 166 can connect the first and second secondary growth constraints 158, 160, respectively, at an interior position from the electrode assembly end surfaces 116, 118, and may be under tension between the secondary growth constraints 158, 160 at that position. In one embodiment, the secondary connecting member 166 that connects the secondary growth constraints 158, 160 at an interior position from the end surfaces 116, 118 is provided in addition to one or more secondary connecting members 166 provided at the electrode assembly end surfaces 116, 118, such as the secondary connecting members 166 that also serve as primary growth constraints 154, 156 at the longitudinal end surfaces 116, 118. In another embodiment, the secondary growth constraint system 152 comprises one or more secondary connecting members 166 that connect with first and second secondary growth constraints 158, 160, respectively, at interior positions that are spaced apart from the longitudinal end surfaces 116, 118, with or without secondary connecting members 166 at the longitudinal end surfaces 116, 118. The interior secondary connecting members 166 can also be understood to act as first and second primary growth constraints 154, 156, according to one embodiment. For example, in one embodiment, at least one of the interior secondary connecting members 166 can comprise at least a portion of an electrode or counter-electrode structure 110, 112, as described in further detail below.

More specifically, with respect to the embodiment shown in FIG. 7C, the secondary growth constraint system 152 may include a first secondary growth constraint 158 that overlies a first region 148 of the lateral surface 142 of electrode assembly 106, and an opposing second secondary growth constraint 160 that overlies a second region 150 of the lateral surface 142 of electrode assembly 106, the first and second secondary growth constraints 158, 160 being separated from each other in the vertical direction (i.e., along the Z-axis). Additionally, secondary growth constraint system 152 may further include at least one interior secondary connecting member 166 that is spaced apart from the longitudinal end surfaces 116, 118 of the electrode assembly 106. The interior secondary connecting member 166 may be aligned parallel to the Z axis and connects the first and second secondary growth constraints 158, 160, respectively, to maintain the growth constraints in tension with one another, and to form at least a portion of the secondary growth constraint system 152. In one embodiment, the at least one interior secondary connecting member 166, either alone or with secondary connecting members 166 located at the longitudinal end surfaces 116, 118 of the electrode assembly 106, may be under tension between the first and secondary growth constraints 158, 160 in the vertical direction (i.e., along the Z axis), during repeated charge and/or discharge of an energy storage device 100 and/or a secondary battery 102 having the electrode assembly 106, to reduce growth of the electrode assembly 106 in the vertical direction. Furthermore, in the embodiment as shown in FIG. 7C, the set of electrode constraints 108 further comprises a primary growth constraint system 151 having first and second primary growth constraints 154, 156, respectively, at the longitudinal ends 116, 118 of the electrode assembly 106, that are connected by first and second primary connecting members 162, 164, respectively, at the first and second lateral surface regions 148, 150, respectively, of the electrode assembly 106. In one embodiment, the secondary interior connecting member 166 can itself be understood as acting in concert with one or more of the first and second primary growth constraints 154, 156, respectively, to exert a constraining pressure on each portion of the electrode assembly 106 lying in the longitudinal direction between the secondary interior connecting member 166 and the longitudinal ends 116, 118 of the electrode assembly 106 where the first and second primary growth constraints 154, 156, respectively, can be located.

According to one embodiment, the first and second secondary growth constraints 158, 160, respectively, are connected to a secondary connecting member 166 that comprises at least a portion of an electrode 110 or counter-electrode 112 structure, or other interior structure of the electrode assembly 106. The first and second secondary growth constraints 158, 160, respectively, in one embodiment, can be connected to the first and/or second vertical end surfaces of the counter-electrode structures 112 and/or electrode structures 110, or other interior structures forming the secondary connecting member 166. In one embodiment, the first secondary growth constraint 158 is connected to the first vertical end surface(s) 500a, 501a of the electrode and/or counter-electrode structures 110, 112 of members of the unit cell population 504. In another embodiment, the second secondary growth constraint 160 is connected to the second vertical end surface(s) 500b, 501b of the electrode or counter-electrode structures 110, 112 of members of the unit cell population 504. The unit cell members that are connected at the first vertical end surface(s) may be the same as the unit cell members that are connected at the second vertical end surface(s), or may be different. The first and/or second secondary growth constraints may be connected to first and/or second vertical end surfaces off electrode and/or counter-electrodes structures including one or more of the electrode current collector, electrode active material layer, counter-electrode current collector and counter-electrode active material layer, in members of the unit cell population. In another example, the first and second secondary growth constraints can be connected to first and/or second vertical end surfaces of the electrically insulating separator. Accordingly, the secondary connecting member 166 can comprise, in certain embodiments, one or more of the structures of the electrode and/or counter-electrodes structures including one or more of the electrode current collector, electrode active material layer, counter-electrode current collector and counter-electrode active material layer, in members of the unit cell population. Referring to FIGS. 3A-3B, embodiments are shown in which the first and second secondary growth constraints 158, 160 are connected to secondary connecting members 166 comprising the electrode current collectors 136 in members of the unit cell population. In FIG. 4, the first and second secondary growth constraints 158, 160 are connected to secondary connecting members 166 comprising electrode structures 110 including the electrode current collectors 136. Furthermore, in one embodiment, the first primary connecting member is the first secondary growth constraint, the second primary connecting member is the second secondary growth constraint, and the first primary growth constraint or the second primary growth constraint is the first secondary connecting member.

Figure 15:
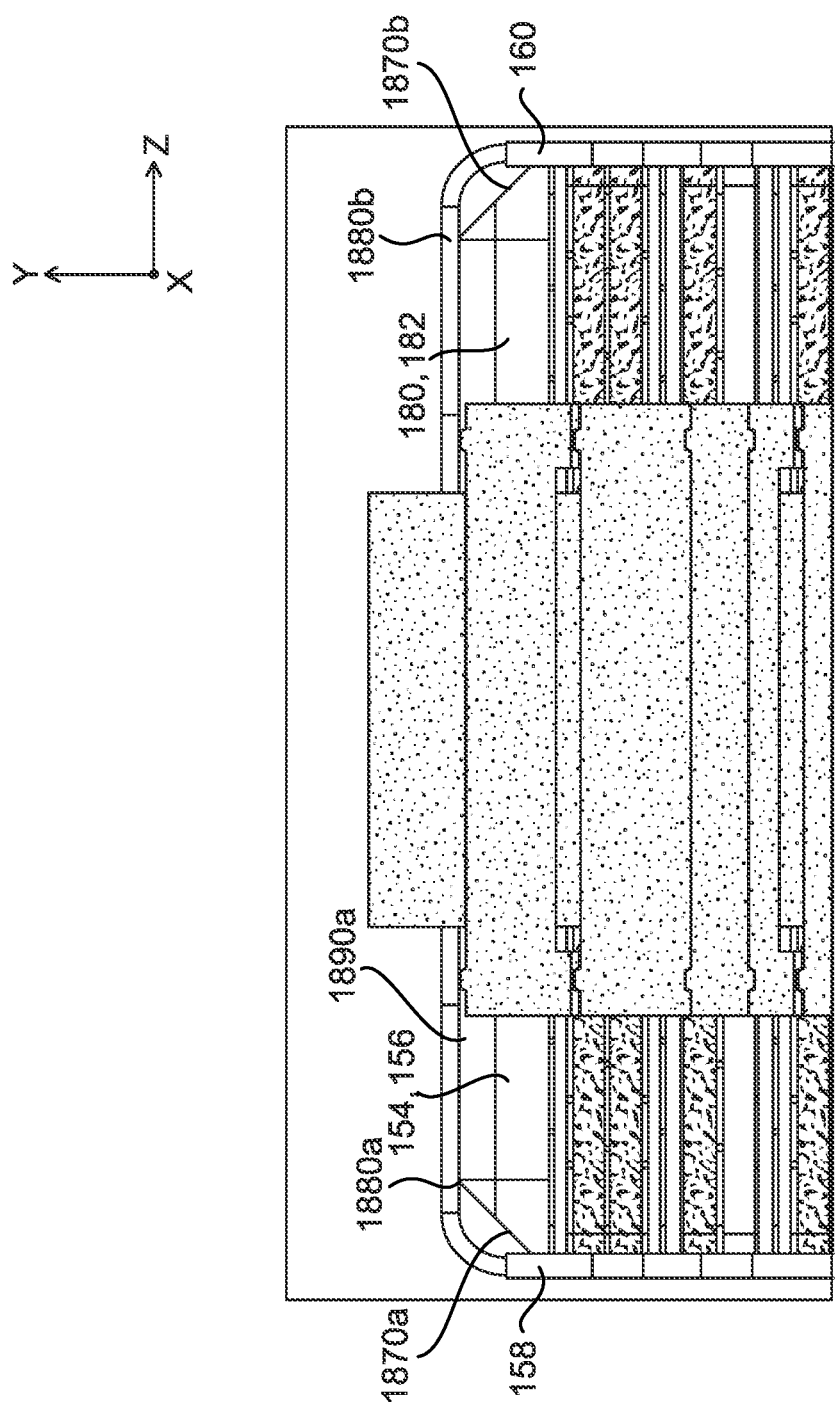
FIG. 15 is a side view of an embodiment of a section of an electrode assembly with endplates having a curved profile.
Figure 16:
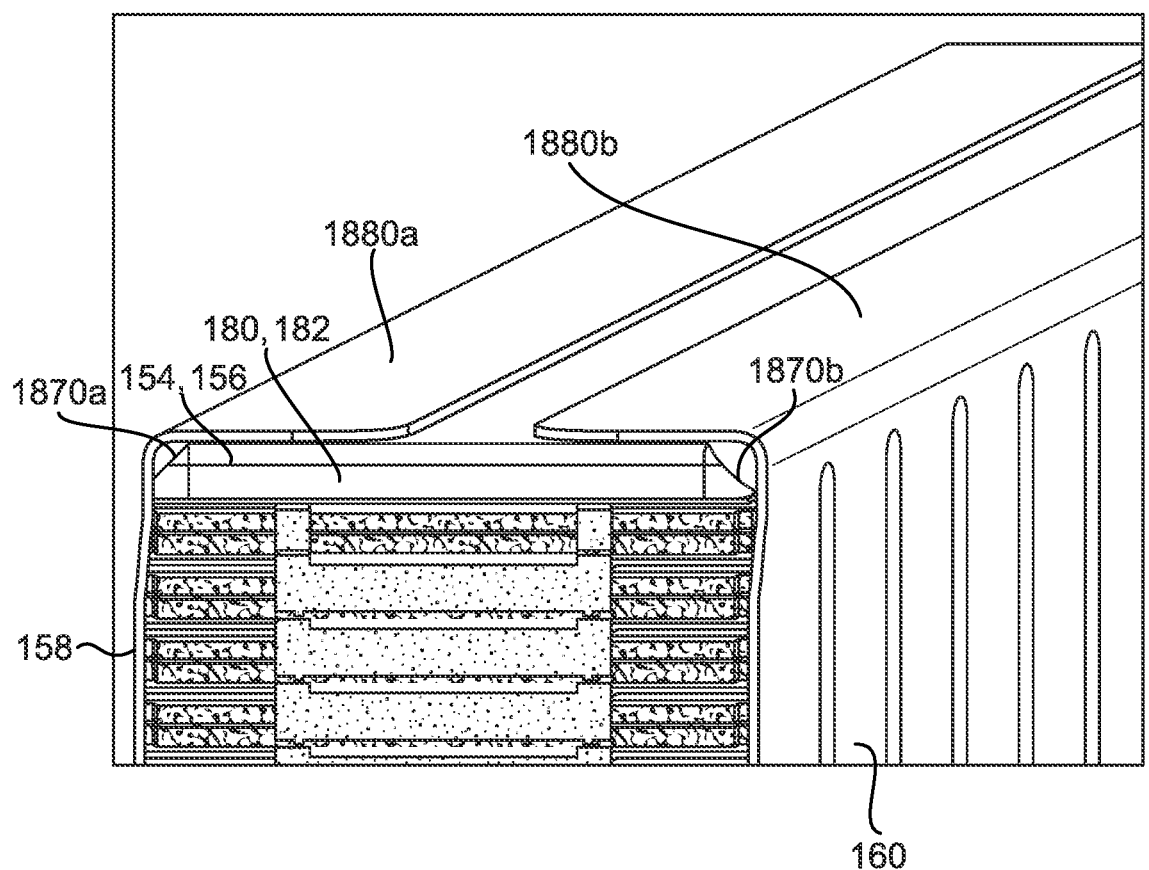
FIG. 16 is another side view of an embodiment of a section of an electrode assembly with endplates having a curved profile.

Referring to FIGS. 15-16, in one embodiment, the first and second secondary growth constraints 158, 160 are connected to the first and second endplates 180, 182 corresponding to the first and second primary growth constraints 154, 156. In one embodiment, end segments 1880 of the first and secondary growth constraints 158, 160 at opposing longitudinal ends of the first and second secondary growth constraints 158, 160 wrap about at least a portion of the first and second vertical end surfaces 1870a, 1870b of each of the first and second endplates. In one embodiment, end segments 1880 of the first and second secondary growth constraints 158, 160 wrap about at least a portion of the first and second vertical end surfaces 1870a, 1870b of each of the first and second endplates 180, 182, to connect to exterior longitudinal end surfaces of the first and second endplates. According to some embodiments, the end segments of the first and second secondary growth constraints are connected to exterior longitudinal end surfaces of the first and second endplates by any one or more of adhering, gluing, welding, bonding, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying. According to one embodiment, the end segments of the first and second secondary growth constraints wrap about at least a portion of the first and second vertical end surfaces of each of the first and second endplates, to provide a curved profile of the end segments in a plane formed by the vertical axis and a longitudinal axis that is parallel to the stacking direction. In one embodiment, the end segments of the first and second growth constraints are curved about the first and second vertical end surfaces of the first and second endplates.

According to embodiments herein, the primary growth constraint system 151 restrains growth of the electrode assembly 106 in the longitudinal direction such that any increase in the Feret diameter of the electrode assembly 106 in the longitudinal direction over 20 consecutive cycles (cycles between charged and discharges states) of the secondary battery 102 is less than 20%, or over 10 consecutive cycles of the secondary battery is less than 10%, or over 5 consecutive cycles is less than 10%, or is less than 1% per cycle of the battery. In one embodiment, any increase in the Feret diameter of the electrode assembly in the stacking direction over 20 consecutive cycles and/or 50 consecutive cycles of the secondary battery is less than 3% and/or less than 2%. According to further embodiments herein the secondary growth constraint system 152 comprising the first and second connecting member 158, 160 restrains growth of the electrode assembly 106 in the vertical direction, such that any increase in the Feret diameter of the electrode assembly in the vertical direction over 20 consecutive cycles of the secondary battery is less than 20%, or over 10 consecutive cycles of the secondary battery is less than 10%, or over 5 consecutive cycles is less than 10%, or is less than 1% per cycle of the battery. In one embodiment, any increase in the Feret diameter of the electrode assembly in the vertical direction over 20 consecutive cycles and/or 50 consecutive cycles of the secondary battery is less than 3% and/or less than 2%.

In one embodiment, the first and second primary growth constraints 154, 156, respectively, comprise a first primary growth constraint 154 that at least partially or even entirely covers a first longitudinal end surface 116 of the electrode assembly 106, and a second primary growth constraint 156 that at least partially or even entirely covers a second longitudinal end surface 118 of the electrode assembly 106. In one embodiment, the electrode assembly 106 is configured such that a surface area of a projection of the electrode assembly 106 in a plane orthogonal to the stacking direction (i.e., the longitudinal direction), is smaller than the surface areas of projections of the electrode assembly 106 onto other orthogonal planes. For example, referring to the electrode assembly 106 embodiment shown in FIG. 1 (e.g., a rectangular prism), it can be seen that surface area of a projection of the electrode assembly 106 into a plane orthogonal to the stacking direction (i.e., the X-Z plane) corresponds to $L_{EA} \times H_{EA}$. Similarly, a projection of the electrode assembly 106 into the Z-Y plane corresponds to $W_{EA} \times H_{EA}$, and a projection of the electrode assembly 106 into the X-Y plane corresponds to $L_{EA} \times W_{EA}$. Accordingly, the electrode assembly 106 is configured such that the stacking direction intersects the plane in which the projection having the smallest surface area lies. Accordingly, in the embodiment in FIG. 2A, the electrode assembly 106 is positioned such that the stacking direction intersects the X-Z plane in which the smallest surface area projection corresponding to $H_{EA} \times L_{EA}$ lies. That is, the electrode assembly is positioned such that the projection having the smallest surface area (e.g., $H_{EA} \times L_{EA}$) is orthogonal to the stacking direction (e.g. at the longitudinal end surfaces).

In one embodiment, the surface area of the first and second longitudinal end surfaces 116, 118 is less than 33% of the surface area of the electrode assembly 106. For example, in one such embodiment, the sum of the surface areas of the first and second longitudinal end surfaces 116, 118, respectively, is less than 25% of the surface area of the total surface of the electrode assembly 106. By way of further example, in one embodiment, the sum of the surface areas of the first and second longitudinal end surfaces 116, 118, respectively, is less than 20% of the surface area of the total surface of the electrode assembly. By way of further example, in one embodiment, the sum of the surface areas of the first and second longitudinal end surfaces 116, 118, respectively, is less than 15% of the surface area of the total surface of the electrode assembly. By way of further example, in one embodiment, the sum of the surface areas of the first and second longitudinal end surfaces 116, 118, respectively, is less than 10% of the surface area of the total surface of the electrode assembly.

In one embodiment, each of the first and second longitudinal end surfaces of the electrode assembly are under a compressive load of at least 100 psi. For example, in one embodiment, each of the first and second longitudinal end surfaces are under a compressive load of at least 200 psi. By way of further example, in one embodiment each of the first and second longitudinal end surfaces are under a compressive load of at least 300 psi. By way of further example, in one embodiment each of the first and second longitudinal end surfaces are under a compressive load of at least 400 psi. By way of yet a further example, in one embodiment each of the first and second longitudinal end surfaces are under a compressive load of at least 500 psi. By way of further example, in one embodiment each of the first and second longitudinal end surfaces are under a compressive load of at least 600 psi. By way of yet another example, in one embodiment, each of the first and second longitudinal end surfaces are under a compressive load of at least 700 psi. By way of yet another example, in one embodiment, each of the first and second longitudinal end surfaces are under a compressive load of at least 800 psi. By way of further example, in one embodiment each of the first and second longitudinal end surfaces are under a compressive load of at least 900 psi. In yet another example, each of the first and second longitudinal end surfaces are under a compressive load of at least 1000 psi. In one embodiment, the first and second secondary growth constraints are connected to the at least one secondary connecting member by any one or more of adhering, gluing, welding, bonding, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

In one embodiment, the regions of the longitudinal end surfaces 122, 124 of the electrode assembly that are coincident with a projection of the members of the electrode and counter-electrode populations onto the longitudinal end surfaces 162, 164 (i.e., the "projected surface regions"), respectively, will be under a significant compressive load imposed by constraint 130. For example, in one embodiment the regions of the longitudinal end surfaces of the electrode assembly that are coincident with the projection of the members of the electrode and counter-electrode populations onto the longitudinal end surfaces will each be under a compressive load of at least 0.7 MPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 1.75 MPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 2.8 MPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 3.5 MPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 5.25 MPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 7 MPa (averaged over the surface area of each of the first and second projected surface regions, respectively). By way of further example, in one such embodiment the regions of the longitudinal end surfaces of the electrode assembly that are coincident with the projection of the members of the electrode and counter-electrode populations onto the longitudinal end surfaces will each be under a compressive load of at least 8.75 MPa (averaged over the surface area of each of the first and second projected surface regions, respectively). In general, however, the regions of the longitudinal end surfaces of the electrode assembly that are coincident with the projection of the members of the electrode and counter-electrode populations onto the longitudinal end surfaces will each be under a compressive load of no more than about 10 MPa (averaged over the surface area of each of the first and second projected surface regions, respectively). In each of the foregoing exemplary embodiments, the longitudinal end surfaces of a secondary battery of the present disclosure will experience such compressive loads when the battery is charged to at least about 80% of its rated capacity.

Figure 8:
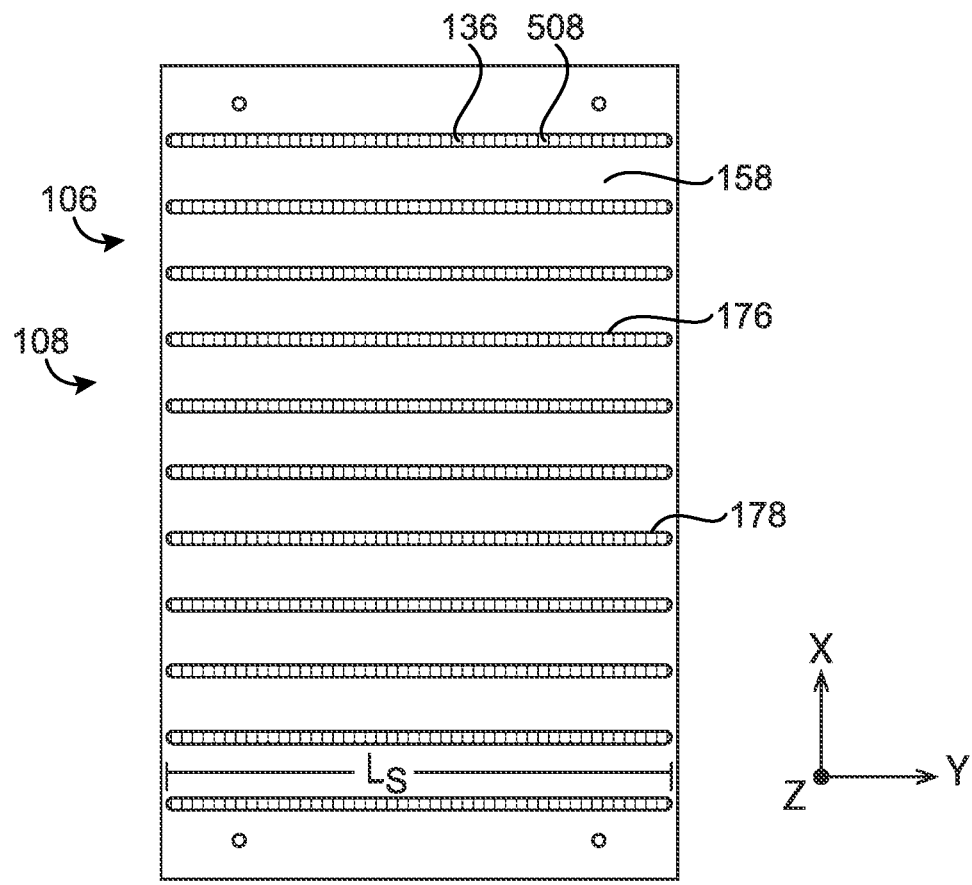
FIG. 8 is a top view of an embodiment of an electrode assembly with a secondary growth constraint system, and having a porous electrically insulating material over first and/or second vertical end surfaces of electrodes and/or counter-electrodes of the electrode assembly.

Referring to FIGS. 3A-3B, in one embodiment, the first and/or second secondary growth constraints 158, 160 comprise apertures 176 formed through respective vertical thicknesses $T_C$ thereof. According to embodiments herein, the apertures 176 can provide passages for the flow of carrier ions from the auxiliary electrode 686 through the first and/or second secondary growth constraints 158, 160 and to members of the unit cell population. For example, for an auxiliary electrode 686 located outside the volume V enclosed by the set of electrode constraints 108, e.g. positioned externally to the first and/or second secondary growth constraints 158, 160, the carrier ions provided from the auxiliary electrode 686 can access the unit cell member of the electrode assembly inside the constraints, via passage through the apertures 176. In the embodiment shown in FIG. 8, which depicts a top view of electrode assembly 106 showing the first secondary growth constraint 158, the apertures 176 comprise a slot-shape with the elongated dimension oriented in the longitudinal and/or stacking direction (Y-direction), and which extends across a plurality of unit cell members. Other shapes and/or configurations of the apertures 176 may also be provided. According to certain embodiments, at least a portion of the apertures 176 is aligned over the porous electrically insulating material 508 in the vertical direction, such that carrier ions entering the electrode assembly 106 through the apertures 176 pass through the porous electrically insulating material 508 to the members of the unit cell population. Processes to transfer carrier ions from the auxiliary electrode 686 to the unit cell members can comprise, according to certain embodiments, transferring carrier ions from the auxiliary electrode 686 via the apertures 176 and through the porous electrically insulating material 508 to one or more of the electrode and counter-electrode structures 110, 112. In the embodiment as shown in FIG. 8, the porous electrically insulating material 508 extends over the first and second vertical end surfaces of the electrode and counter-electrode structures, within the confines of the first and second secondary growth constraints, with the first and second vertical end surfaces of the electrode current collectors 136 remaining exposed.

Figure 9:
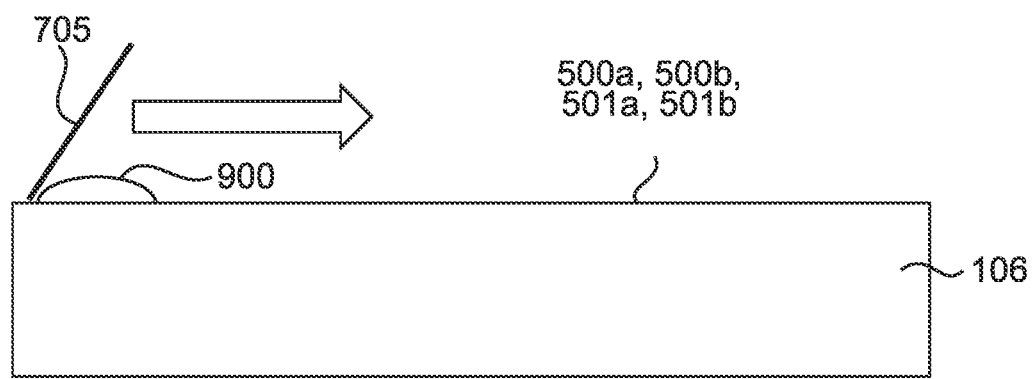
FIG. 9 is a schematic depicting a part of a process for providing a porous electrically insulating material to first and/or second vertical end surfaces of electrodes and/or counter-electrodes of the electrode assembly.

According to a further embodiment of the present disclosure, a method of manufacture of the electrode assembly and/or secondary battery is provided. According to one embodiment, the method of manufacture comprises providing the population of unit cells stacked in series in a stacking direction, wherein (i) each unit cell comprises the electrode structure, the counter-electrode structure, and the electrically insulating separator between the electrode and counter-electrode structures, (ii) the electrode structures, counter-electrode structures and electrically insulating separators within each unit cell have opposing first and second vertical end surfaces separated in the vertical direction, and (iii) the vertical direction is orthogonal to the stacking direction. The manufacturing method further comprises providing porous electrically insulating material covering the first and/or second vertical end surface(s) of the electrode or the counter-electrode structure(s) of the members of the unit cell population, the porous electrically insulating material having a porosity in the range of from 20% to 60%, According to one embodiment, the porous electrically insulating material is provided by coating the first and/or second vertical end surfaces with a slurry or paste comprising particulate material binder material in a solvent, and evaporating the solvent to leave particulate material dispersed in the binder material on the first and/or second vertical end surfaces. For example, in the embodiment as shown in FIG. 9, the slurry and/or paste 900 is applied to the first and/or second vertical end surfaces 500a, 500b, 501a, 501b of the electrode and/or counter-electrode structures 110, 112.

In one embodiment, the binder material is soluble in the solvent, and the solvent is evaporated by heating and/or drying of the solvent by gas flow. For example, the solvent can comprise any of N-methyl-2-pyrrolidone (NMP), heptane, octane, toluene, xylene, or mixed hydrocarbon solvents. Furthermore, according to certain embodiments, the slurry and/or paste comprises at least 50 wt %, at least 55 wt %, at last 60 wt %, at least wt %, at least 70 wt %, at least 75 wt %, and/or at least 80 wt % of particulate material, and no more than 90%, no more than 85 wt %, no more than 80 wt %, and/or no more than 75 wt % of particulate material. According to one embodiment, a density of porous electrically insulating material provided to first and second vertical end surfaces of the counter-electrode structures, per surface area of the counter-electrode first and second vertical end surfaces is in a range of from 15 mg/cm$^2$ to 25 mg/cm$^2$.

According to one embodiment, the method of manufacture further comprises connecting the first and second secondary growth constraints separated in the vertical direction to the electrode current collectors of members of the electrode structures, the first and second secondary growth constraints comprising the apertures formed through respective vertical thicknesses thereof, wherein the secondary growth constraint system at least partially restrains growth of the electrode assembly in the vertical direction upon cycling of the electrode assembly. For example, the growth constraints can be connected to the exposed first and second vertical end surfaces of the electrode current collectors, as shown in FIG. 8, after the porous electrically insulating material has been applied to the first and/or second vertical end surfaces of the electrode and/or counter-electrode structures 110, 112.

In yet another embodiment, the method of manufacture of the electrode assembly and/or secondary battery comprises (1) providing the auxiliary electrode comprising a source of carrier ions external to porous electrically insulating material, and (2) applying a bias voltage between the auxiliary electrode and the members of the electrode population or members of the counter-electrode population to provide a flow of carrier ions through the apertures in the first and second secondary growth constraints and through the porous electrically insulating material to the electrode population and/or counter-electrode structures of members of the unit cell population. For example, the method of manufacture can comprise processes for the formation of a secondary battery, including initial charging processes to charge the secondary battery and/or charge up the electrode structures, and processes to replenish carrier lost in an initial charging processes. According to certain embodiments, the method of manufacture of the electrode assembly and/or secondary battery can comprise any of the methods of providing carrier ions to the members of the unit cell population described herein. According to further embodiments, the method for transferring carrier ions from the auxiliary electrode comprising the source of carrier ions to the electrode assembly can be performed during an initial or subsequent charging cycle of the secondary battery and/or electrode assembly.

In one embodiment, a method for preparing an electrode assembly 106 comprising a set of electrode constraints 108 is provided, where the electrode assembly 106 may be used as a part of a secondary battery that is configured to cycle between a charged and a discharged state. The method can generally comprise forming a sheet structure, cutting the sheet structure into pieces (and/or pieces), stacking the pieces, and applying a set of constraints. By strip, it is understood that a piece other than one being in the shape of a strip could be used. The pieces comprise an electrode active material layer, an electrode current collector, a counter-electrode active material layer, a counter-electrode current collector, and a separator, and may be stacked so as to provide an alternating arrangement of electrode active material and/or counter-electrode active material. The sheets can comprise, for example, at least one of a unit cell 504 and/or a component of a unit cell 504. For example, the sheets can comprise a population of unit cells, which can be cut to a predetermined size (such as a size suitable for a 3D battery), and then the sheets of unit cells can be stacked to form the electrode assembly 106. In another example, the sheets can comprise one or more components of a unit cell, such as for example at least one of an electrode current collector 136, an electrode active material layer 132, a separator 130, a counter-electrode active material layer 138, and a counter-electrode current collector 140. The sheets of components can be cut to predetermined sizes to form the pieces (such as sizes suitable for a 3D battery), and then stacked to form an alternating arrangement of the electrode and counter-electrode active material layer components.

In yet another embodiment, the set of electrode constraints 108 that are applied may correspond to any of those described herein, such as for example a set of constraints comprising a primary growth constraint system comprising first and second primary growth constraints and at least one primary connecting member, the first and second primary growth constraints separated from each other in the longitudinal direction, and the at least one primary connecting member connecting the first and second primary growth constraints. Furthermore, the set of electrode constraints can comprise a secondary growth constraint system comprising first and second secondary growth constraints separated in a direction orthogonal to the longitudinal direction (such as the vertical or transverse direction) and connected by at least one secondary connecting member, wherein the secondary growth constraint system at least partially restrains growth of the electrode assembly in the vertical direction upon cycling of the secondary battery. At least one of the primary connecting member, or first and/or second primary growth constraints of the primary growth constraint system, and the secondary connecting member, or first and/or second secondary growth constraints of the secondary growth constraint system, can be one or more of the assembly components that make up the pieces, such as for example at least one of the electrode active material layer, electrode current collector, counter-electrode active material layer, counter-electrode current collector, and separator. For example, in one embodiment, the primary connecting member of the primary growth constraint system can be one or more of the assembly components that make up the pieces, such as for example at least one of the electrode active material layer, electrode current collector, counter-electrode active material layer, counter-electrode current collector, and separator. That is, the application of the constraints may involve applying the first and second primary growth constraints to a primary member connecting member that is one of the structures in the stack of pieces.

Figure 2:
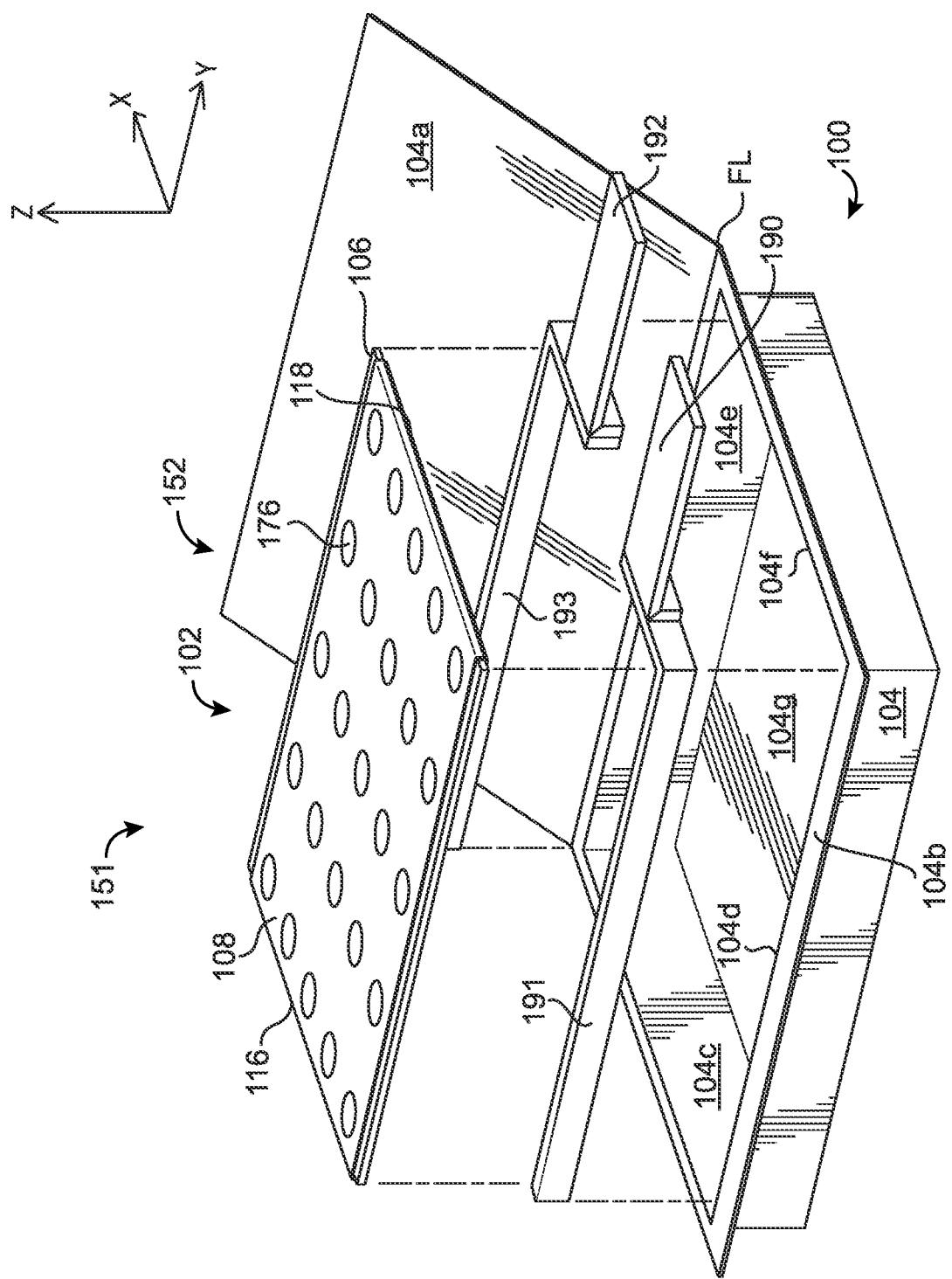
FIG. 2 illustrates an exploded view of an embodiment of an energy storage device or a secondary battery comprising an electrode assembly and a set of electrode constraints.

Referring now to FIG. 2, illustrated is an exploded view of one embodiment of a secondary battery 102 having a set of electrode constraints 108 of the present disclosure. The secondary battery 102 includes battery enclosure 104 and an electrode assembly within the battery enclosure 104, the electrode assembly 106 having a first longitudinal end surface 116, an opposing second longitudinal end surface 118 (i.e., separated from first longitudinal end surface 116 along the Y axis the Cartesian coordinate system shown), as described above. Alternatively, the secondary battery 102 may comprise a plurality of electrode assemblies 106 with a set of electrode constraints 108 provided within the enclosure. The electrode assembly 106 includes a population of electrode structures 110 and a population of counter-electrode structures 112, stacked relative to each other within each of the electrode assemblies 106 in a stacking direction D; stated differently, the populations of electrode 110 and counter-electrode 112 structures are arranged in an alternating series of electrode structures 110 and counter-electrode structures 112 with the series progressing in the stacking direction D between first and second longitudinal end surfaces 116, 118, respectively.

According to the embodiment shown in FIG. 2, tabs 190, 192 project out of the battery enclosure 104 and provide an electrical connection between the electrode assembly 106 and an energy supply or consumer (not shown). More specifically, in this embodiment tab 190 is electrically connected to tab extension 191 (e.g., using an electrically conductive glue), and tab extension 191 is electrically connected to the electrode structures 110 comprised by the electrode assembly 106. Similarly, tab 192 is electrically connected to tab extension 193 (e.g., using an electrically conductive glue), and tab extension 193 is electrically connected to the counter-electrode structures 112 comprised by of the electrode assembly 106. The tab extensions 191, 193 may also serve as bus bars that pool current from each of the respective electrode and counter-electrode structures to which they are electrically connected.

The electrode assembly 106 in the embodiment illustrated in FIG. 2 has an associated primary growth constraint system 151 to restrain growth in the longitudinal direction (i.e., stacking direction D). Alternatively, in one embodiment, a plurality of electrode assemblies 106 may share at least a portion of the primary growth constraint system 151. In the embodiment as shown, each primary growth constraint system 151 includes first and second primary growth constraints 154, 156, respectively, that may overlie first and second longitudinal end surfaces 116, 118, respectively, as described above; and first and second opposing primary connecting members 162, 164, respectively, that may overlie the lateral surface 142, as described above. First and second opposing primary connecting members 162, 164, respectively, may pull first and second primary growth constraints 154, 156, respectively, towards each other, or alternatively stated, assist in restraining growth of the electrode assembly 106 in the longitudinal direction, and primary growth constraints 154, 156 may apply a compressive or restraint force to the opposing first and second longitudinal end surfaces 116, 118, respectively. As a result, expansion of the electrode assembly 106 in the longitudinal direction is inhibited during formation and/or cycling of the battery 102 between charged and discharged states. Additionally, primary growth constraint system 151 exerts a pressure on the electrode assembly 106 in the longitudinal direction (i.e., stacking direction D) that exceeds the pressure maintained on the electrode assembly 106 in either of the two directions that are mutually perpendicular to each other and are perpendicular to the longitudinal direction (e.g., as illustrated, the longitudinal direction corresponds to the direction of the Y axis, and the two directions that are mutually perpendicular to each other and to the longitudinal direction correspond to the directions of the X axis and the Z axis, respectively, of the illustrated Cartesian coordinate system).

Further, the electrode assembly 106 in the embodiment illustrated in FIG. 2 has an associated secondary growth constraint system 152 to restrain growth in the vertical direction (i.e., expansion of the electrode assembly 106, electrode structures 110, and/or counter-electrode structures 112 in the vertical direction (i.e., along the Z axis of the Cartesian coordinate system)). Alternatively, in one embodiment, a plurality of electrode assemblies 106 share at least a portion of the secondary growth constraint system 152. Each secondary growth constraint system 152 includes first and second secondary growth constraints 158, 160, respectively, that may overlie the lateral surface 142, and at least one secondary connecting member 166, each as described in more detail above. Secondary connecting members 166 may pull first and second secondary growth constraints 158, 160, respectively, towards each other, or alternatively stated, assist in restraining growth of the electrode assembly 106 in the vertical direction, and first and second secondary growth constraints 158, 160, respectively, may apply a compressive or restraint force to the lateral surfaces 142), each as described above in more detail. As a result, expansion of the electrode assembly 106 in the vertical direction is inhibited during formation and/or cycling of the battery 102 between charged and discharged states. Additionally, the secondary growth constraint system 152 exerts a pressure on the electrode assembly 106 in the vertical direction (i.e., parallel to the Z axis of the Cartesian coordinate system) that exceeds the pressure maintained on the electrode assembly 106 in either of the two directions that are mutually perpendicular to each other and are perpendicular to the vertical direction (e.g., as illustrated, the vertical direction corresponds to the direction of the Z axis, and the two directions that are mutually perpendicular to each other and to the vertical direction correspond to the directions of the X axis and the Y axis, respectively, of the illustrated Cartesian coordinate system).

According to certain embodiments, to complete the assembly of the secondary battery 102, the battery enclosure 104 can be filled with a non-aqueous electrolyte (not shown) and lid 104a is folded over (along fold line, FL) and sealed to upper surface 104b. When fully assembled, the sealed secondary battery 102 occupies a volume bounded by its exterior surfaces (i.e., the displacement volume), the secondary battery enclosure 104 occupies a volume corresponding to the displacement volume of the battery (including lid 104a) less its interior volume (i.e., the prismatic volume bounded by interior surfaces 104c, 104d, 104e, 104f, 104g and lid 104a) and each of the primary and secondary growth constraint systems 151, 152 of set 106a occupies a volume corresponding to its respective displacement volume. In combination, therefore, the battery enclosure 104 and the primary and secondary growth constraint systems 151, 152 occupy no more than 75% of the volume bounded by the outer surface of the battery enclosure 104 (i.e., the displacement volume of the battery). For example, in one such embodiment, the primary and secondary growth constraint systems 151, 152 and battery enclosure 104, in combination, occupy no more than 60% of the volume bounded by the outer surface of the battery enclosure 104. By way of further example, in one such embodiment, the primary and secondary growth constraint systems 151, 152 and battery enclosure 104, in combination, occupy no more than 45% of the volume bounded by the outer surface of the battery enclosure 104. By way of further example, in one such embodiment, the primary and secondary growth constraint systems 151, 152 and battery enclosure 104, in combination, occupy no more than 30% of the volume bounded by the outer surface of the battery enclosure 104. By way of further example, in one such embodiment, the primary and secondary growth constraint systems 151, 152 and battery enclosure 104, in combination, occupy no more than 20% of the volume bounded by the outer surface of the battery enclosure.

In general, the primary growth constraint system 151 and/or secondary growth constraint system 152 will typically comprise a material that has an ultimate tensile strength of at least 10,000 psi (>70 MPa), that is compatible with the battery electrolyte, does not significantly corrode at the floating or anode potential for the battery 102, and does not significantly react or lose mechanical strength at 45° C., and even up to 70° C. In one embodiment, at least one of the first primary growth constraint, the second primary growth constraint, the first secondary growth constraint, and the second secondary growth constraint, comprises a material having an ultimate tensile strength of at least 10,000 psi (>70 MPa). For example, the primary growth constraint system 151 and/or secondary growth constraint system 152 may comprise any of a wide range of metals, alloys, ceramics, glass, plastics, or a combination thereof (i.e., a composite). In one exemplary embodiment, primary growth constraint system 151 and/or secondary growth constraint system 152 comprises a metal such as stainless steel (e.g., SS 316, 440C or 440C hard), aluminum (e.g., aluminum 7075-T6, hard H18), titanium (e.g., 6Al-4V), beryllium, beryllium copper (hard), copper ($O_2$ free, hard), nickel; in general, however, when the primary growth constraint system 151 and/or secondary growth constraint system 152 comprises metal it is generally preferred that it be incorporated in a manner that limits corrosion and limits creating an electrical short between the electrode structures 110 and counter-electrode structures 112. In another exemplary embodiment, the primary growth constraint system 151 and/or secondary growth constraint system 152 comprises a ceramic such as alumina (e.g., sintered or Coorstek AD96), zirconia (e.g., Coorstek YZTP), yttria-stabilized zirconia (e.g., ENrG E-Strate®). In another exemplary embodiment, the primary growth constraint system 151 comprises a glass such as Schott D263 tempered glass. In another exemplary embodiment, the primary growth constraint system 151 and/or secondary growth constraint system 152 comprises a plastic such as polyetheretherketone (PEEK) (e.g., Aptiv 1102), PEEK with carbon (e.g., Victrex 90HMF40 or Xycomp 1000-04), polyphenylene sulfide (PPS) with carbon (e.g., Tepex Dynalite 207), polyetheretherketone (PEEK) with 30% glass, (e.g., Victrex 90HMF40 or Xycomp 1000-04), polyimide (e.g., Kapton®). In another exemplary embodiment, the primary growth constraint system 151 and/or secondary growth constraint system 152 comprises a composite such as E Glass Std Fabric/Epoxy, 0 deg, E Glass UD/Epoxy, 0 deg, Kevlar Std Fabric/Epoxy, 0 deg, Kevlar UD/Epoxy, 0 deg, Carbon Std Fabric/Epoxy, 0 deg, Carbon UD/Epoxy, 0 deg, Toyobo Zylon® HM Fiber/Epoxy. In another exemplary embodiment, the primary growth constraint system 151 and/or secondary growth constraint system 152 comprises fibers such as Kevlar 49 Aramid Fiber, S Glass Fibers, Carbon Fibers, Vectran UM LCP Fibers, Dyneema, Zylon. In one embodiment, at least one of the primary and secondary growth constraint systems 151, 152 comprises a sheet of material having a thickness in the range of about 10 to about 100 micrometers. In another embodiment, at least one of the primary and secondary growth constraint systems 151, 152 comprises a sheet of material having a thickness in the range of about to about 75 micrometers.

Members of the electrode structure 110 and counter-electrode structure 112 populations can include an electroactive material capable of absorbing and releasing a carrier ion such as lithium, sodium, potassium, calcium, magnesium or aluminum ions. In some embodiments, members of the electrode structure 110 population include an anodically active electroactive material (sometimes referred to as a negative electrode) and members of the counter-electrode structure 112 population include a cathodically active electroactive material (sometimes referred to as a positive electrode). In other embodiments, members of the electrode structure 110 population include a cathodically active electroactive material and members of the counter-electrode structure 112 population comprise an anodically active electroactive material. In each of the embodiments and examples recited in this paragraph, negative electrode active material may be, for example, a particulate agglomerate electrode, an electrode active material formed from a particulate material, such as by forming a slurry of the particulate material and casting into a layer shape, or a monolithic electrode.

According to one embodiment, an electrode active material used in an electrode structure 110 corresponding to an anode of the electrode assembly 106 comprises a material that expands upon insertion of carrier ions into the electrode active material during charge of the secondary battery 102 and/or electrode assembly 106. For example, the electrode active materials may comprise anodically active materials that accept carrier ions during charging of the secondary battery, such as by intercalating with or alloying with the carrier ions, in an amount that is sufficient to generate an increase in the volume of the electrode active material. For example, in one embodiment the electrode active material may comprise a material that has the capacity to accept more than one mole of carrier ion per mole of electrode active material, when the secondary battery 102 is charged from a discharged to a charged state. By way of further example, the electrode active material may comprise a material that has the capacity to accept 1.5 or more moles of carrier ion per mole of electrode active material, such as 2.0 or more moles of carrier ion per mole of electrode active material, and even 2.5 or more moles of carrier ion per mole of electrode active material, such as 3.5 moles or more of carrier ion per mole of electrode active material. The carrier ion accepted by the electrode active material may be at least one of lithium, potassium, sodium, calcium, and magnesium. Examples of electrode active materials that expand to provide such a volume change include one or more of silicon (e.g., SiO), aluminum, tin, zinc, silver, antimony, bismuth, gold, platinum, germanium, palladium, and alloys and compounds thereof. For example, in one embodiment, the electrode active material can comprise a silicon-containing material in particulate form, such as one or more of particulate silicon, particulate silicon oxide, and mixtures thereof. In another embodiment, the electrode active material consists of silicon or silicon oxide. In yet another embodiment, the electrode active material can comprise a material that exhibits a smaller or even negligible volume change. For example, in one embodiment the electrode active material can comprise a carbon-containing material, such as graphite. In yet another embodiment, the electrode structure comprises a layer of lithium metal, such as for example an electrode structure comprising an electrode current collector, on which a layer of lithium metal deposits during a charging process as a result of transfer of carrier ions from the counter-electrode structure to the electrode structure.

Furthermore, according to certain embodiments, exemplary anodically active electroactive materials include carbon materials such as graphite and soft or hard carbons, or any of a range of metals, semi-metals, alloys, oxides and compounds capable of forming an alloy with lithium. Specific examples of the metals or semi-metals capable of constituting the anode material include graphite, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon, silicon oxide, or an alloy thereof.

In yet a further embodiment, anodically active material can comprise lithium metals, lithium alloys, carbon, petroleum cokes, activated carbon, graphite, silicon compounds, tin compounds, and alloys thereof. In one embodiment, the anodically active material comprises carbon such as non-graphitizable carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 < x \leq 1$, $1 \leq y \leq 3$; $1 \leq z \leq 8$), etc.; a lithium metal; a lithium alloy; a silicon-based alloy; a tin-based alloy; a metal oxide such as SnO, $SnO_2$, $Pb_0$, $PbO_2$, $Pb_2O_3$, $Pb_3O_4$, $Sb_2O_3$, $Sb_2O_4$, $Sb_2O_3$, GeO, $GeO_2$, $Bi_2O_3$, $Bi_2O_4$, $Bi_2O_5$, etc.; a conductive polymer such as polyacetylene, etc.; Li—Co—Ni-based material, etc. In one embodiment, the anodically active material can comprise carbon-based active material include crystalline graphite such as natural graphite, synthetic graphite and the like, and amorphous carbon such as soft carbon, hard carbon and the like. Other examples of carbon material suitable for anodically active material can comprise graphite, Kish graphite, pyrolytic carbon, mesophase pitch-based carbon fibers, meso-carbon microbeads, mesophase pitches, graphitized carbon fiber, and high-temperature sintered carbon such as petroleum or coal tar pitch derived cokes. In one embodiment, the negative electrode active material may comprise tin oxide, titanium nitrate and silicon. In another embodiment, the negative electrode can comprise lithium metal, such as a lithium metal film, or lithium alloy, such as an alloy of lithium and one or more types of metals selected from the group consisting of Na, K, Rb, Cs, Fr, Be, Mg, Ca, Sr, Ba, Ra, Al and Sn. In yet another embodiment, the anodically active material can comprise a metal compound capable of alloying and/or intercalating with lithium, such as Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Si alloy, a Sn alloy, an Al alloy or the like; a metal oxide capable of doping and dedoping lithium ions such as $SiO_v$ ($0 < v < 2$), $SnO_2$, vanadium oxide or lithium vanadium oxide; and a composite including the metal compound and the carbon material such as a Si—C composite or a Sn—C composite. For example, in one embodiment, the material capable of alloying/intercalating with lithium may be a metal, such as lithium, indium, tin, aluminum, or silicon, or an alloy thereof; a transition metal oxide, such as $Li_4/3Ti_5/3O_4$ or SnO; and a carbonaceous material, such as artificial graphite, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite. In yet another embodiment, the negative electrode active material can comprise a composition suitable for a carrier ion such as sodium or magnesium. For example, in one embodiment, the negative electrode active material can comprise a layered carbonaceous material, and a composition of the formula $Na_xSn_{y-z}M_z$ disposed between layers of the layered carbonaceous material, wherein M is Ti, K, Ge, P, or a combination thereof, and $0 < x \leq 15$, $1 \leq y \leq 5$, and $0 \leq z \leq 1$. In one embodiment, the anodically active material having a capacity for carrier ions that is more than one mole of carrier ion per mole of anode active material when a secondary battery containing the electrode structure with the anode active material is charged from a discharged state to a charged state.

In one embodiment, the anodically active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal; and (h) combinations thereof. In one embodiment, the anodically active material is selected from the group consisting of alloys and intermetallic compounds of Si, Ge, Sn, Pb, Sb, Bi, Zn, Al, Ti, Ni, Co, or Cd with other elements. In one embodiment, the anodically active material is selected from the group consisting of oxides, carbides, nitrides, sulfides, phosphides, selenides, and tellurides of Si, Ge, Sn, Pb, Sb, Bi, Zn, Al, Ti, Fe, Ni, Co, V, and Cd. In one embodiment, the anodically active material is selected from the group consisting of silicon and the oxides and carbides of silicon. In one embodiment, the anodically active material is selected from the group consisting of graphite and carbon.

In one embodiment, the negative electrode active material may further comprise a conductive material and/or conductive aid, such as carbon-based materials, carbon black, graphite, graphene, active carbon, carbon fiber, carbon black such as acetylene black, Ketjen black, channel black, furnace black, lamp black, thermal black or the like; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like. In addition, metallic fibers such as metal mesh; metallic powders such as copper, silver, nickel and aluminum; or organic conductive materials such as polyphenylene derivatives may also be used. In yet another embodiment, a binder may be provided, such as for example one or more of polyethylene, polyethylene oxide; polypropylene, polytetrafluoroethylene (FIFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoro ethylene copolymer, an ethylene-acrylic; acid copolymer and the like may be used either alone or as a mixture.

Exemplary cathodically active materials include any of a wide range of cathode active materials. For example, for a lithium-ion battery, the cathodically active material may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, and combinations thereof. Furthermore, compounds for the cathodically active material layers can comprise lithium-containing compounds further comprising metal oxides or metal phosphates such as compounds comprising lithium, cobalt and oxygen (e.g., $LiCoO_2$), compounds comprising lithium, manganese and oxygen (e.g., $LiMn_2O_4$) and compound comprising lithium iron and phosphate (e.g., LiFePO). In one embodiment, the cathodically active material comprises at least one of lithium manganese oxide, lithium cobalt oxide, lithium nickel oxide, lithium iron phosphate, or a complex oxide formed from a combination of aforesaid oxides. In another embodiment, the cathodically active material can comprise one or more of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (where, x is 0 to 0.33), $LiMnO_3$, $LiMn_2O_3$, $LiMnO_2$, etc., lithium copper oxide ($Li_2CuO_2$); vanadium oxide such as $LiV_3O_8$, $LiFe_3O_4$, $V_2O_5$, $Cu_2V_2O_7$ etc.; Ni site-type lithium nickel oxide represented by the chemical formula of $LiNi_{1-x}M_xO_2$ (where, M=Co, Mn, Al, Cu, Fe, Mg, B or Ga, and x=0.01 to 0.3); lithium manganese complex oxide represented by the chemical formula of $LiMn_{2-x}M_xO_2$ (where, M=Co, Ni, Fe. Cr, Zn or Ta, and x=0.01 to 0.1) or $Li_2Mn_3MO_8$ (where, M=Fe, Co, Ni, Cu or Zn); $LiMn_2O_4$ in which a portion of Li is substituted with alkaline earth metal ions; a disulfide compound; $Fe_2(MoO_4)_3$, and the like. In one embodiment, the cathodically active material can comprise a lithium metal phosphate having an olivine crystal structure of Formula $Li_{1+a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, $-0.5 \le a \le +0.5$, $0 \le x \le 0.5$, and $0 \le b \le 0.1$, such at least one of $LiFePO_4$, Li(Fe, Mn)$PO_4$, Li(Fe, CO)$PO_4$, Li(Fe, Ni)$PO_4$, or the like. In one embodiment, the cathodically active material comprises at least one of $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2$ ($0 \le y \le 1$), $Li(Ni_aCo_bMn_c)O_4$ ($0<a<2$, $0<b<2$, $0<c<2$, and $a+b+c=2$), $LiMn_{2-z}Ni_zO_4$, $LiMn_{2-z}Co_zO_4$ ($0<z<2$), $LiCoPO_4$ and $LiFePO_4$, or a mixture of two or more thereof.

In yet another embodiment, a cathodically active material can comprise elemental sulfur (S8), sulfur series compounds or mixtures thereof. The sulfur series compound may specifically be $Li_2S_n$ ($n \ge 1$), an organosulfur compound, a carbon-sulfur polymer $((C_2S_x)_n$: x=2.5 to 50, $n \ge 2$) or the like. In yet another embodiment, the cathodically active material can comprise an oxide of lithium and zirconium.

In yet another embodiment, the cathodically active material can comprise at least one composite oxide of lithium and metal, such as cobalt, manganese, nickel, or a combination thereof, may be used, and examples thereof are $Li_aA_{1-b}M_bD_2$ (wherein, $0.90 \le a \le 1$, and $0 \le b \le 0.5$); $Li_aE_{1-b}M_bO_{2-c}D_c$ (wherein, $0.90 \le a \le 1$, $0 \le b \le 0.5$, and $0 \le c \le 0.05$); $LiE_{2-b}M_bO_{4-c}D_c$ (wherein, $0 \le b \le 0.5$, and $0 \le c \le 0.05$); $Li_aNi_{1-b-c}Co_bM_cD_a$ (wherein, $0.90 \le a \le 1$, $0 \le b \le 0.5$, $0 \le c \le 0.05$, and $0<a \le 2$); $Li_aNi_{1-b-c}Co_bM_cO_{2-a}X_a$ (wherein, $0.90 \le a \le 1$, $0 \le b \le 0.5$, $0 \le c \le 0.05$, and $0<a<2$); $Li_aNi_{1-b-c}Co_bM_cO_{2-a}X_2$ (wherein, $0.90 \le a \le 1$, $0 \le b \le 0.5$, $0 \le c \le 0.05$, and $0<a<2$); $Li_aNi_{1-b-c}Mn_bM_cD_a$ (wherein, $0.90 \le a \le 1$, $0 \le b \le 0.5$, $0 \le c \le 0.05$, and $0<a \le 2$); $Li_aNi_{1-b-c}Mn_bM_cO_{2-a}X_a$ (wherein, $0.90 \le a \le 1$, $0 \le b \le 0.5$, $0 \le c \le 0.05$, and $0<a<2$); $Li_aNi_{1-b-c}Mn_bM_cO_{2-a}X_2$ (wherein, $0.90 \le a \le 1$, $0 \le b \le 0.5$, $0 \le c \le 0.05$, and $0<a<2$); $Li_aNi_bE_cG_dO_2$ (wherein, $0.90 \le a \le 1$, $0 \le b \le 0.9$, $0 \le c \le 0.5$, and $0.001 \le d \le 0.1$); $Li_aNi_bCo_cMn_dGeO_2$ (wherein, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (wherein, $0.90 \le a \le 1$ and $0.001 \le b \le 0.1$); $Li_aCoG_bO_2$ (wherein, $0.90 \le a \le 1$ and $0.001 \le b \le 0.1$); $Li_aMnG_bO_2$ (wherein, $0.90 \le a \le 1$ and $0.001 \le b \le 0.1$); $Li_aMn_2G_bO_4$ (wherein, $0.90 \le a \le 1$ and $0.001b \le 0.1$); $QO_2$; $QS_2$; $LiQS_2$; $V_2O_5$; $LiV_2O_5$; $LiX'O_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$. In the formulas above, A is Ni, Co, Mn, or a combination thereof; M is Al, Ni, Co, Mn, Cr, Fe, Mg. Sr, V, a rare-earth element, or a combination thereof; D is O, F, S, P, or a combination thereof; E is Co, Mn, or a combination thereof: X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof: and J is V, Cr, Mn, Co, Ni. Cu, or a combination thereof. For example, $LiCoO_2$, $LiMn_xO_{2x}$ (x=1 or 2), $LiNi_{1-x}Mn_xO_{2x}$ ($0<x<1$), $LiNi_{1-x-y}Co_xMn_yO_2$ ($0 \le x \le 0.5$, $0 \le y \le 0.5$), or $FePO_4$ may be used. In one embodiment, the cathodically active material comprises at least one of a lithium compound such as lithium cobalt oxide, lithium nickel oxide, lithium nickel cobalt oxide, lithium nickel cobalt aluminum oxide, lithium nickel cobalt manganese oxide, lithium manganese oxide, or lithium iron phosphate; nickel sulfide; copper sulfide; sulfur; iron oxide; or vanadium oxide.

In one embodiment, the cathodically active material can comprise a sodium containing material, such as at least one of an oxide of the formula $NaM^1_aO_2$ such as $NaFeO_2$, $NaMnO_2$, $NaNiO_2$, or $NaCoO_2$; or an oxide represented by the formula $NaMn_{1-a}M^1_aO_2$, wherein $M^1$ is at least one transition metal element, and $0 \le a < 1$. Representative positive active materials include $Na[Ni_{1/2}Mn_{1/2}]O_2$, $Na_{2/3}[Fe_{1/2}Mn_{1/2}]O_2$, and the like; an oxide represented by $Na_{0.44}Mn_{1-a}M^1_aO_2$, an oxide represented by $Na_{0.7}Mn_{1-a}M^1_aO_{2.05}$ an (wherein $M^1$ is at least one transition metal element, and $0 \le a < 1$); an oxide represented by $Na_bM^2_cSi_{12}O_{30}$ as $Na_6Fe_2Si_{12}O_{30}$ or $Na_2Fe_5Si_{12}O$ (wherein $M^2$ is at least one transition metal element, $2 \le b \le 6$, and $2 \le c \le 5$); an oxide represented by $Na_dM^3_eSi_6O_{18}$ such as $Na_2Fe_2Si_6O_{18}$ or $Na_2MnFeSi_6O_{18}$ (wherein $M^3$ is at least one transition metal element, $3 \le d \le 6$, and $1 \le e \le 2$); an oxide represented by $Na_fM^4_gSi_2O_6$ such as $Na_2FeSiO_6$ (wherein $M^4$ is at least one element selected from transition metal elements, magnesium (Mg) and aluminum (Al), $1 \le f \le 2$ and $1 \le g \le 2$); a phosphate such as $NaFePO_4$, $Na_3Fe_2(PO_4)_3$, $Na_3V_2(PO_4)_3$, $Na_4Co_3(PO_4)_2P_2O_7$ and the like; a borate such as $NaFeBO_4$ or $Na_3Fe_2(BO_4)_3$: a fluoride represented by $Na_hM^5F_6$ such as $Na_3FeF_6$ or $Na_2MnF_6$ (wherein $M^5$ is at least one transition metal element, and $2 \le h \le 3$), a fluorophosphate such as $Na_3V_2(PO_4)_2F_3$, $Na_3V_2(PO_4)_2FO_2$ and the like. The positive active material is not limited to the foregoing and any suitable positive active material that is used in the art can be used. In an embodiment, the positive active material preferably comprises a layered-type oxide cathode material such as $NaMnO_2$, $Na[Ni_{1/2}Mn_{1/2}]O_2$ and $Na_{2/3}[Fe_{1/2}Mns_{1/2}]O_2$, a phosphate cathode such as $Na_3V_2(PO_4)_3$ and $Na_4Co_3(PO_4)_2P_2O_7$, or a fluorophosphate cathode such as $Na_3V_2(PO_4)_2F_3$ and $Na_3V_2(PO_4)_2FO_2$. In one embodiment, the cathodically active material selected from the group consisting of S (or $Li_2S$ in the lithiated state), LiF, Fe, Cu, Ni, $FeF_2$, $FeOaF_{3.2d}$, $FeF_3$, $CoF_3$, $CoF_2$, $CuF_2$, $NiF_2$, where $0 \le d \le 0.5$. In one embodiment, the cathodically active material comprising lithium iron phosphate ($LiFePO_4$). In one embodiment, the cathodically active material is selected from the group consisting of intercalation chemistry positive electrode material and conversion chemistry positive electrode material.

In one embodiment, the electrode current collector can comprise a negative electrode current collector, and can comprise a suitable conductive material, such as a metal material. For example, in one embodiment, the negative electrode current collector can comprise at least one of copper, nickel, aluminum, stainless steel, titanium, palladium, baked carbon, calcined carbon, indium, iron, magnesium, cobalt, germanium, lithium a surface treated material of copper or stainless steel with carbon, nickel, titanium, silver, an aluminum-cadmium alloy, and/or other alloys thereof. As another example, in one embodiment, the negative electrode current collector comprises at least one of copper, stainless steel, aluminum, nickel, titanium, baked carbon, a surface treated material of copper or stainless steel with carbon, nickel, titanium, silver, an aluminum-cadmium alloy, and/or other alloys thereof. In one embodiment, the negative electrode current collector comprises at least one of copper and stainless steel.

In one embodiment, the counter-electrode current collector can comprise a positive electrode current collector, and can comprise a suitable conductive material, such as a metal material. In one embodiment, the positive electrode current collector comprises at least one of stainless steel, aluminum, nickel, titanium, baked carbon, sintered carbon, a surface treated material of aluminum or stainless steel with carbon, nickel, titanium, silver, and/or an alloy thereof. In one embodiment, the positive electrode current collector comprises aluminum.

In yet another embodiment, the cathodically active material can further comprise one or more of a conductive aid and/or binder, which for example may be any of the conductive aids and/or binders described for the anodically active material herein.

According to certain embodiments, electrically insulating separator layers 130 may electrically isolate each member of the electrode structure 110 population from each member of the counter-electrode structure 112 population. The electrically insulating separator layers are designed to prevent electrical short circuits while also allowing the transport of ionic charge carriers that are needed to close the circuit during the passage of current in an electrochemical cell. In one embodiment, the electrically insulating separator layers are microporous and permeated with an electrolyte, e.g., a non-aqueous liquid or gel electrolyte. Alternatively, the electrically insulating separator layer may comprise a solid electrolyte, i.e., a solid ion conductor, which can serve as both a separator and the electrolyte in a battery.

In certain embodiments, electrically insulating separator layers 130 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%. Additionally, the microporous separator material may be permeated with a non-aqueous electrolyte to permit conduction of carrier ions between adjacent members of the electrode and counter-electrode populations. In certain embodiments, for example, and ignoring the porosity of the microporous separator material, at least 70 vol % of electrically insulating separator material between a member of the electrode structure 110 population and the nearest member(s) of the counter-electrode structure 112 population (i.e., an "adjacent pair") for ion exchange during a charging or discharging cycle is a microporous separator material; stated differently, microporous separator material constitutes at least 70 vol % of the electrically insulating material between a member of the electrode structure 110 population and the nearest member of the counter-electrode 112 structure population.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder can be an organic polymeric material such as a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile and polyethylene oxide. In another embodiment, the binder is selected from the group consisting of acrylates, styrenes, epoxies, and silicones. Other suitable binders may be selected from polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer, polyimide or mixtures thereof. In yet another embodiment, the binder may be selected from any of polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations thereof. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1 \times 10^{-4}$ S/cm. By way of further example, in one embodiment, the particulate material has a conductivity for carrier ions of less than $1 \times 10^{-5}$ S/cm. By way of further example, in one embodiment, the particulate material has a conductivity for carrier ions of less than $1 \times 10^{-6}$ S/cm. For example, in one embodiment, the binder is an organic material selected from the group consisting of silicates, phosphates, aluminates, aluminosilicates, and hydroxides such as magnesium hydroxide, calcium hydroxide, etc. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, $BN$, $Si_3N_4$, $Ge_3N_4$. See, for example, P. Arora and J. Zhang, "Battery Separators" Chemical Reviews 2004, 104, 4419-4462). Other suitable particles can comprise $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$ or mixtures thereof. In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

According to one embodiment of an assembled energy storage device, the microporous separator material is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. As yet another example, the electrolyte can comprise sodium ions dissolved therein, such as for example any one or more of $NaClO_4$, $NaPF_6$, $NaBF_4$, $NaCF_3SO_3$, $NaN(CF_3SO_2)_2$, $NaN(C_2FsSO_2)_2$, $NaC(CF_3SO_2)_3$ Salts of magnesium and/or potassium can similarly be provided. For example magnesium salts such as magnesium chloride ($MgCl_2$), magnesium bromide $MgBr_2$), or magnesium iodide ($MgI_2$) may be provided, and/or as well as a magnesium salt that may be at least one selected from the group consisting of magnesium perchlorate ($Mg(ClO_4)_2$), magnesium nitrate ($Mg(NO_3)_2$), magnesium sulfate ($MgSO_4$), magnesium tetrafluoroborate ($Mg(BFA)_2$), magnesium tetraphenylborate ($Mg(B(C_6H_5)_4)_2$, magnesium hexafluorophosphate ($Mg(PF_6)_2$), magnesium hexafluoroarsenate ($Mg(AsF_6)_2$), magnesium perfluoroalkylsulfonate (($Mg(R_{f1}SO_3)_2$), in which $R_{f1}$ is a perfluoroalkyl group), magnesium perfluoroalkylsulfonylimide ($Mg((R_{f2}SO_2)_2N)_2$, in which $R_{f2}$ is a perfluoroalkyl group), and magnesium hexaalkyl disilazide (($Mg(HRDS)_2$), in which R is an alkyl group). Exemplary organic solvents to dissolve the lithium salt include cyclic esters, chain esters, cyclic ethers, and chain ethers. Specific examples of the cyclic esters include propylene carbonate, ethylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers. In one embodiment, the electrode assembly comprises a non-aqueous electrolyte comprising a mixture of a lithium salt and an organic solvent.

In yet another embodiment, the electrically insulating separator 130 comprises a solid electrolyte, for example as in a solid state battery. Generally speaking, the solid electrolyte can facilitate transport of carrier ions, without requiring addition of a liquid or gel electrolyte. According to certain embodiments, in a case where a solid electrolyte is provided, the solid electrolyte may itself be capable of providing insulation between the electrodes and allowing for passage of carrier ions therethrough, and may not require addition of a liquid electrolyte permeating the structure.

In one embodiment, the secondary battery 102 can comprise electrolyte that may be any of an organic liquid electrolyte, an inorganic liquid electrolyte, an aqueous electrolyte, a non-aqueous electrolyte, a solid polymer electrolyte, a solid ceramic electrolyte, a solid glass electrolyte, a garnet electrolyte, a gel polymer electrolyte, an inorganic solid electrolyte, a molten-type inorganic electrolyte or the like. Other arrangements and/or configurations of electrically insulating separator 130, with or without liquid electrolyte, may also be provided. In one embodiment, the solid electrolyte can comprise a ceramic or glass material that is capable of providing electrical insulation while also conducting carrier ions therethrough. Examples of ion conducting material can include garnet materials, a sulfide glass, a lithium ion conducting glass ceramic, or a phosphate ceramic material. In one embodiment, a solid polymer electrolyte can comprise any of a polymer formed of polyethylene oxide (PEO)-based, polyvinyl acetate (PVA)-based, polyethyleneimine (PEI)-based, polyvinylidene fluoride (PVDF)-based, polyacrylonitrile (PAN)-based, LiPON (lithium phosphorus oxynitride), and polymethyl methacrylate (PMMA)-based polymers or copolymers thereof. In another embodiment, a sulfide-based solid electrolyte may be provided, such as a sulfide-based solid electrolyte comprising at least one of lithium and/or phosphorous, such as at least one of $Li_2S$ and $P_2S_5$, and/or other sulfides such as $SiS_2$, $GeS_2$, $Li_3PS_4$, $Li_4P_2S_7$, $Li_4SiS_4$, $Li_2S$—$P_2S_5$, and $50Li_4SiO_4 \cdot 50Li_3BO_3$, and/or $B_2S_3$. Yet other embodiments of solid electrolyte can include nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$, $Li_2S$—$P_2S_5$, $Li_2S$—$P_2S_5$-$L_4SiO_4$, $Li_2S$—$Ga_2S_3$—$GeS_2$, $Li_2S$—$Sb_2S_9$—$GeS_2$, $Li_{3.25}$—$Ge_{0.25}$—$P_{0.75}S_4$, (La,Li)$TiO_3$ (LLTO), $Li_6La_2CaTa_2O_{12}$, $Li_6La_2ANb_2O_{12}$ (A=Ca, Sr), $Li_2Nd_3TeSbO_{12}$, $Li_3BO_{2.5}N_{0.5}$, $Li_9SiAlO_8$, $Li_{1+x}Al_xGe_{2-x}$ (PO$_4$)$_3$ (LAGP), Li$_{1+x}$Al$_x$Ti$_{2-x}$(PO$_4$)$_3$ (LATP), Li$_{1+x}$Ti$_{2-x}$Al$_x$Si$_y$(PO$_4$)$_{3-y}$, LiAl$_x$Zr$_{2-x}$(PO$_4$)$_3$, LiTi$_x$Zr$_{2-x}$(PO$_4$)$_3$, Yet other embodiments of solid electrolyte can include garnet materials, such as for example described in U.S. Pat. No. 10,361,455, which is hereby incorporated herein in its entirety. In one embodiment, the garnet solid electrolyte is a nesosilicate having the general formula X$_3$Y$_2$(SiO$_4$)$_3$, where X may be a divalent cation such as Ca, Mg, Fe or Mn, or Y may be a trivalent cation such as Al, Fe, or Cr.

In one embodiment, the electrically insulating separator comprises a solid electrolyte selected from the group consisting of sulfide-based electrolytes. In another embodiment, the electrically insulating separator comprises a solid electrolyte selected from the group consisting of lithium tin phosphorus sulfide (LSn), lithium phosphorus sulfide (β-Li$_3$PS$_4$) and lithium phosphorus sulfur chloride iodide (Li$_6$PS$_5$Cl$_{0.9}$I$_{0.1}$). In another embodiment, the electrically insulating separator comprises a solid electrolyte selected from the group consisting of oxide based electrolytes. In another embodiment, the electrically insulating separator comprises a solid electrolyte selected from the group consisting of lithium lanthanum titanate (Li$_{0.34}$La$_{0.56}$TiO$_3$), Ai-doped lithium lanthanum zirconate (Li6.24La3Zr2Al0.24O11.98), Ta-doped lithium lanthanum zirconate (Li$_{6.4}$La$_3$Zr$_{1.4}$Ta$_{0.6}$O$_{12}$) and lithium aluminum titanium phosphate (Li$_{1.4}$Al$_{0.4}$Ti$_{1.6}$(PO$_4$)$_3$). In one embodiment, the electrically insulating separator comprises a polymer electrolyte selected from the group consisting of PEO-based polymer electrolyte, polymer-ceramic composite electrolyte (solid), polymer-ceramic composite electrolyte, and polymer-ceramic composite electrolyte.

Embodiments

The Enumerated Embodiments 1-336 below set forth embodiments according to the disclosure.

Enumerated Embodiment 1: A method for manufacturing a structure comprising an electrode assembly and first and second endplates, the electrode assembly comprising an electrically insulating material, wherein
 the electrode assembly comprises a population of unit cells stacked in series in a stacking direction, opposing first and second longitudinal end surfaces separated along the stacking direction, and the first and second endplates are separated in the stacking direction and overlie the first and second longitudinal end surfaces, wherein (i) each unit cell comprises an electrode structure, a counter-electrode structure, and an electrically insulating separator between the electrode and counter-electrode structures, (ii) the electrode structures, counter-electrode structures and electrically insulating separators within each unit cell have opposing first and second vertical end surfaces separated in a vertical direction, and (iii) the vertical direction is orthogonal to the stacking direction,
 the method comprising providing a porous electrically insulating material to the electrode assembly using a stencil.

Enumerated Embodiment 2. A structure comprising an electrode assembly and first and second endplates, the electrode assembly comprising an electrically insulating material, comprising:
 a population of unit cells stacked in series in a stacking direction, opposing first and second longitudinal end surfaces separated along the stacking direction, and first and second endplates separated in the stacking direction and overlying the first and second longitudinal end surfaces,
 wherein (i) each unit cell comprises an electrode structure, a counter-electrode structure, and an electrically insulating separator between the electrode and counter-electrode structures, (ii) the electrode structures, counter-electrode structures and electrically insulating separators within each unit cell have opposing first and second end surfaces separated in a vertical direction, and (iii) the vertical direction is orthogonal to the stacking direction.

Enumerated Embodiment 3: The method or structure according to any preceding Enumerated Embodiment, wherein the first and second endplates each comprise vertical thicknesses $t_{EP}$ of cross-sectional areas in planes orthogonal to the stacking direction, wherein first vertical thicknesses $t_{EP1}$ of first cross-sectional areas of each of the first and second endplates in inner regions of the respective first and second endplates that are adjacent the stacked series of unit cells, are greater than second vertical thicknesses $t_{EP2}$ of second cross-sectional areas in outer regions of the respective first and second endplates that are external to the respective inner regions in the stacking direction.

Enumerated Embodiment 4: The method or structure of any preceding Enumerated Embodiment, wherein each of the first and second endplates have respective maximum vertical thicknesses $t_{EPMAX}$ at cross-sectional areas in the plane orthogonal to the stacking direction having the greatest vertical thicknesses for each endplate, and the first and second endplates comprise first and second vertical end surface regions coinciding with the respective maximum vertical thicknesses $t_{EPMAX}$, the first and second vertical end surface regions being on opposing first and second vertical sides of the first and second endplates.

Enumerated Embodiment 5: The method or structure of any preceding Enumerated Embodiment, wherein each of the first and second endplates each have first and second vertical end surface regions coinciding with respective first and second maximum vertical extents on opposing first and second vertical sides of the first and second endplates.

Enumerated Embodiment 6: The method of any preceding Enumerated Embodiment, wherein the method comprises (a) positioning a stencil comprising a stencil frame defining a stencil aperture over the first and second endplates such that the stencil frame covers at least a portion of a periphery of the electrode assembly, and first vertical end surfaces of the electrode and counter-electrode structures of the members of the unit cell population are exposed through the stencil aperture.

Enumerated Embodiment 7: The method of any preceding Enumerated Embodiment, comprising (a) positioning a stencil comprising a stencil frame defining a stencil aperture over the first and second endplates, wherein the stencil is positioned over the first and second endplates such that a top surface of the stencil frame does not exceed first vertical end surface regions of the first and second endplates that coincide with respective maximum vertical thicknesses $t_{EPMAX}$ of each of the respective first and second endplates in the vertical direction.

Enumerated Embodiment 8: The method of any preceding Enumerated Embodiment, comprising (a) positioning a stencil comprising a stencil frame defining a stencil aperture over the first and second endplates, wherein the stencil is positioned over the first and second endplates such that a top surface of the stencil frame does not exceed first vertical end surface regions of the first and second endplates that coincide with respective first maximum vertical extents of each of the respective first and second endplates that are on a same vertical side of the electrode assembly as the top surface of the stencil frame.

Enumerated Embodiment 9: The method of any preceding Enumerated Embodiment, comprising (b) applying a porous electrically insulating material through the stencil aperture to cover the first vertical end surfaces of the electrode or the counter-electrode structure(s) of the members of the unit cell population.

Enumerated Embodiment 10: The method of any preceding Enumerated Embodiment, comprising (b) applying a porous electrically insulating material through the stencil aperture to cover the first vertical end surfaces of the counter-electrode structure(s) of the members of the unit cell population.

Enumerated Embodiment 11: The method of any preceding Enumerated Embodiment, wherein each electrode structure of members of the unit cell population comprises a layer of an electrode active material, and each counter-electrode structure of members of the unit cell population comprises a layer of a counter-electrode active material, and wherein (b) comprises applying a porous electrically insulating material through the stencil aperture to cover first vertical end surfaces of layers of the counter-electrode active material of the members of the unit cell population.

Enumerated Embodiment 12: The method of any preceding Enumerated Embodiment, comprising (c) positioning the stencil over the first and second endplates such that the second vertical end surfaces of the electrode and counter-electrode structures of the members of the unit cell population are exposed through the stencil aperture.

Enumerated Embodiment 13: The method of any preceding Enumerated Embodiment, wherein in (c) the stencil is positioned over the first and second endplates such that the top surface of the stencil frame does not exceed first vertical end surface regions of the first and second endplates that coincide with the respective second maximum vertical extents of each of the respective first and second endplates that are on a same vertical side of the electrode assembly as the top surface of the stencil frame.

Enumerated Embodiment 14: The method of any preceding Enumerated Embodiment, wherein in (c) the stencil is positioned over the first and second endplates such that the top surface of the stencil frame does not exceed second vertical end surface regions of the first and second endplates that coincide with respective maximum vertical thicknesses $t_{EPMAX}$ of the first and second endplates.

Enumerated Embodiment 15: The method of any preceding Enumerated Embodiment, comprising (d) applying the porous electrically insulating material through the stencil aperture to cover the second vertical end surfaces of the electrode or the counter-electrode structure(s) of the members of the unit cell population.

Enumerated Embodiment 16: The method of any preceding Enumerated Embodiment, comprising (d) applying the porous electrically insulating material through the stencil aperture to cover the second vertical end surfaces of the counter-electrode structure(s) of the members of the unit cell population.

Enumerated Embodiment 17: The method of any preceding Enumerated Embodiment, wherein each electrode structure of members of the unit cell population comprises a layer of an electrode active material, and each counter-electrode structure of members of the unit cell population comprises a layer of a counter-electrode active material, and wherein (d) comprises applying a porous electrically insulating material through the stencil aperture to cover second vertical end surfaces of layers of the counter-electrode active material of the members of the unit cell population.

Enumerated Embodiment 18: The method of any preceding Enumerated Embodiment, comprising rotating the electrode assembly about an axis perpendicular to the vertical direction, after an application of the porous electrically insulating material to the electrode assembly.

Enumerated Embodiment 19: The method of any preceding Enumerated Embodiment, wherein the electrode assembly is rotated following application of the porous electrically insulating material to the first vertical end surfaces of the electrode or counter-electrode structure(s), and wherein the method further comprises applying porous electrically insulating material to the second vertical end surfaces of the electrode or counter-electrode structure(s) after the rotation.

Enumerated Embodiment 20: The method or structure of any preceding Enumerated Embodiment, wherein maximum vertical thicknesses of the electrode and counter-electrode structure(s) in a cross-sectional area orthogonal to the stacking direction do not exceed the respective maximum vertical thickness $t_{EPMAX}$ of each of the first and second endplates in the vertical direction.

Enumerated Embodiment 21: The method or structure of any preceding Enumerated Embodiment, wherein maximum vertical thicknesses of the counter-electrode structure(s) in a cross-sectional area orthogonal to the stacking direction do not exceed the respective maximum vertical thickness $t_{EPMAX}$ of each of the first and second endplates in the vertical direction.

Enumerated Embodiment 22: The method or structure of any preceding Enumerated Embodiment, wherein maximum vertical thicknesses of layers of counter-electrode active material of the counter-electrode structure(s) in a cross-sectional area orthogonal to the stacking direction do not exceed the respective maximum vertical thickness $t_{EPMAX}$ of each of the first and second endplates in the vertical direction.

Enumerated Embodiment 23: The method or structure of any preceding Enumerated Embodiment, wherein the first vertical end surfaces of the electrode and counter-electrode structure(s) do not exceed first vertical end surface regions of the first and second endplates that coincide with the first maximum vertical extents of the first and second endplates on a same vertical side of the electrode assembly as the first vertical end surfaces.

Enumerated Embodiment 24: The method or structure of any preceding Enumerated Embodiment, wherein the first vertical end surfaces of the counter-electrode structure(s) do not exceed first vertical end surface regions of the first and second endplates that coincide with the first maximum vertical extents of the first and second endplates on a same vertical side of the electrode assembly as the first vertical end surfaces.

Enumerated Embodiment 25: The method or structure of any preceding Enumerated Embodiment, wherein the first vertical end surfaces of layers of counter-electrode active material of the counter-electrode structure(s) do not exceed first vertical end surface regions of the first and second endplates that coincide with the first maximum vertical extents of the first and second endplates on a same vertical side of the electrode assembly as the first vertical end surfaces.

Enumerated Embodiment 26: The method or structure of any preceding Enumerated Embodiment, wherein the second vertical end surfaces of the electrode and counter-electrode structure(s) do not exceed second vertical end surface regions of the first and second endplates that coincide with the second maximum vertical extents of the first and second endplates on a same vertical side of the electrode assembly as the second vertical end surfaces.

Enumerated Embodiment 27: The method or structure of any preceding Enumerated Embodiment, wherein the second vertical end surfaces of the counter-electrode structure(s) do not exceed second vertical end surface regions of the first and second endplates that coincide with the second maximum vertical extents of the first and second endplates on a same vertical side of the electrode assembly as the second vertical end surfaces.

Enumerated Embodiment 28: The method or structure of any preceding Enumerated Embodiment, wherein the second vertical end surfaces of layers of counter-electrode active material of the counter-electrode structure(s) do not exceed second vertical end surface regions of the first and second endplates that coincide with the second maximum vertical extents of the first and second endplates on a same vertical side of the electrode assembly as the second vertical end surfaces.

Enumerated Embodiment 29: The method or structure of any preceding Enumerated Embodiment, wherein the first vertical end surfaces of the electrode and counter-electrode structure(s) are recessed with respect to first vertical end surface regions of the first and second endplates coinciding with the first maximum vertical extents of the first and second endplates on a same vertical side of the electrode assembly as the first vertical end surfaces.

Enumerated Embodiment 30: The method or structure of any preceding Enumerated Embodiment, wherein the first vertical end surfaces of the counter-electrode structure(s) are recessed with respect to first vertical end surface regions of the first and second endplates coinciding with the first maximum vertical extents of the first and second endplates on a same vertical side of the electrode assembly as the first vertical end surfaces.

Enumerated Embodiment 31: The method or structure of any preceding Enumerated Embodiment, wherein each electrode structure of members of the unit cell population comprises a layer of an electrode active material, and each counter-electrode structure of members of the unit cell population comprises a layer of a counter-electrode active material, and wherein the first vertical end surfaces of layers of counter-electrode active material of the counter-electrode structure(s) are recessed with respect to first vertical end surface regions of the first and second endplates coinciding with first maximum vertical extents of the first and second endplates on a same vertical side of the electrode assembly as the first vertical end surfaces.

Enumerated Embodiment 32: The method or structure of any preceding Enumerated Embodiment, wherein each electrode structure of members of the unit cell population comprises a layer of an electrode active material, and each counter-electrode structure of members of the unit cell population comprises a layer of a counter-electrode active material, and wherein maximum vertical thicknesses of the layers of counter-electrode active material of the counter-electrode structure(s) in a plane orthogonal to the stacking direction do not exceed first vertical end surface regions of the first and second endplates coinciding with the respective maximum vertical thickness $t_{EPMAX}$ of each of the first and second endplates in the vertical direction.

Enumerated Embodiment 33: The method or structure of any preceding Enumerated Embodiment, wherein the second vertical end surfaces of the electrode and counter-electrode structure(s) are recessed with respect to second vertical end surface regions of the first and second endplates coinciding with second maximum vertical extents of the first and second endplates on a same vertical side of the electrode assembly as the second vertical end surfaces.

Enumerated Embodiment 34: The method or structure of any preceding Enumerated Embodiment, wherein the second vertical end surfaces of the counter-electrode structure(s) are recessed with respect to second vertical end surface regions of the first and second endplates coinciding with the second maximum vertical extent of the first and second endplates on a same vertical side of the electrode assembly as the second vertical end surfaces.

Enumerated Embodiment 35: The method or structure of any preceding Enumerated Embodiment, wherein each electrode structure of members of the unit cell population comprises a layer of an electrode active material, and each counter-electrode structure of members of the unit cell population comprises a layer of a counter-electrode active material, and wherein the second vertical end surfaces of layers of counter-electrode active material of the counter-electrode structure(s) are recessed with respect to second vertical end surface regions of the first and second endplates coinciding with second maximum vertical extents of the first and second endplates on a same vertical side of the electrode assembly as the second vertical end surfaces.

Enumerated Embodiment 36: The method of any preceding Enumerated Embodiment, wherein in (a) the stencil is positioned such that the top surface of the stencil frame is above the first vertical end surfaces of the electrode or counter-electrode structure(s) in the electrode assembly in the vertical direction.

Enumerated Embodiment 37: The method of any preceding Enumerated Embodiment, wherein in (a) the stencil is positioned such that the top surface of the stencil frame is above the first vertical end surfaces of the counter-electrode structure(s) in the electrode assembly in the vertical direction.

Enumerated Embodiment 38: The method of any preceding Enumerated Embodiment, wherein each electrode structure of members of the unit cell population comprises a layer of an electrode active material, and each counter-electrode structure of members of the unit cell population comprises a layer of a counter-electrode active material, and wherein in (a) the stencil is positioned such that the top surface of the stencil frame is above first vertical end surfaces of the layers of counter-electrode active material of the counter-electrode structure(s) in the electrode assembly in the vertical direction.

Enumerated Embodiment 39: The method of any preceding Enumerated Embodiment, wherein in (c) the stencil is positioned such that the top surface of the stencil frame is above the second vertical end surfaces of the electrode or counter-electrode structure(s) in the electrode assembly in the vertical direction.

Enumerated Embodiment 40: The method of any preceding Enumerated Embodiment, wherein in (c) the stencil is positioned such that the top surface of the stencil frame is above the second vertical end surfaces of the counter-electrode structure(s) in the electrode assembly in the vertical direction.

Enumerated Embodiment 41: The method of any preceding Enumerated Embodiment, wherein each electrode structure of members of the unit cell population comprises a layer of an electrode active material, and each counter-electrode structure of members of the unit cell population comprises a layer of a counter-electrode active material, and wherein in (c) the stencil is positioned such that the top surface of the stencil frame is above second vertical end surfaces of the layers of counter-electrode active material of the counter-electrode structure(s) in the electrode assembly in the vertical direction.

Enumerated Embodiment 42: The method of any preceding Enumerated Embodiment, wherein in (a) the stencil is positioned such that the top surface of the stencil frame does not exceed or is below the first vertical end surfaces of the electrode or counter-electrode structure(s) in the electrode assembly in the vertical direction.

Enumerated Embodiment 43: The method of any preceding Enumerated Embodiment, wherein in (a) the stencil is positioned such that the top surface of the stencil frame does not exceed or is below the first vertical end surfaces of the counter-electrode structure(s) in the electrode assembly in the vertical direction.

Enumerated Embodiment 44: The method of any preceding Enumerated Embodiment, wherein each electrode structure of members of the unit cell population comprises a layer of an electrode active material, and each counter-electrode structure of members of the unit cell population comprises a layer of a counter-electrode active material, and wherein in (a) the stencil is positioned such that the top surface of the stencil frame does not exceed or is below first vertical end surfaces of layers of the counter-electrode active material of the counter-electrode structure(s) in the electrode assembly in the vertical direction.

Enumerated Embodiment 45: The method of any preceding Enumerated Embodiment, wherein in (c) the stencil is positioned such that the top surface of the stencil frame does not exceed or is below the second vertical end surfaces of the electrode or counter-electrode structure(s) in the electrode assembly in the vertical direction.

Enumerated Embodiment 46: The method of any preceding Enumerated Embodiment, wherein in (c) the stencil is positioned such that the top surface of the stencil frame does not exceed or is below the second vertical end surfaces of the counter-electrode structure(s) in the electrode assembly in the vertical direction.

Enumerated Embodiment 47: The method of any preceding Enumerated Embodiment, wherein in any of (a) or (c), the stencil is positioned about a periphery of the first and second endplates in the stacking direction.

Enumerated Embodiment 48: The method of any preceding Enumerated Embodiment, wherein each electrode structure of members of the unit cell population comprises a layer of an electrode active material, and each counter-electrode structure of members of the unit cell population comprises a layer of a counter-electrode active material, and wherein in (c) the stencil is positioned such that the top surface of the stencil frame does not exceed or is below second vertical end surfaces of layers of the counter-electrode active material of the counter-electrode structure(s) in the electrode assembly in the vertical direction.

Enumerated Embodiment 49: The method of any preceding Enumerated Embodiment, wherein in (a) the stencil frame is received on surfaces of the outer regions of the first and second endplates, the outer regions having the second vertical thicknesses $t_{EP2}$ in the second cross-sectional areas orthogonal to the stacking direction that are smaller than the first vertical thicknesses $t_{EP1}$ in the second cross-sectional areas orthogonal to the stacking direction in the inner regions adjacent the stacked series of unit cells.

Enumerated Embodiment 50: The method of any preceding Enumerated Embodiment, wherein in (c) the stencil frame is received on surfaces of the outer regions of the first and second endplates, the outer regions having the second vertical thicknesses $t_{EP2}$ in the second cross-sectional areas orthogonal to the stacking direction that are smaller than the first vertical thicknesses $t_{EP1}$ in the second cross-sectional areas orthogonal to the stacking direction in the inner regions adjacent the stacked series of unit cells.

Enumerated Embodiment 51: The method of any preceding Enumerated Embodiment, wherein in (a) the stencil frame is received on surfaces of the outer regions of the first and second endplates that do not exceed or are less than first surface regions of the first and second endplates that coincide with the first maximum vertical extents of the respective first and second endplates in the vertical direction.

Enumerated Embodiment 52: The method of any preceding Enumerated Embodiment, wherein in (c) the stencil frame is received on surfaces of the outer regions of the first and second endplates that do not exceed or are less than second surface regions of the first and second endplates that coincide with the second maximum vertical extents of the respective first and second endplates in the vertical direction.

Enumerated Embodiment 53: The method or structure of any preceding Enumerated Embodiment, wherein the first and second endplates each comprise first and second endplate vertical end surfaces on respective opposing first and second vertical sides of the first and second endplates, at least one of the first and second vertical end surfaces comprising an inner surface region in the inner region adjacent the stacked series of unit cells, and an outer surface region in the outer region that is external to the inner region in the stacking direction, the outer surface region being offset inwardly in the vertical direction from the inner surface region.

Enumerated Embodiment 54: The method or structure of any preceding Enumerated Embodiment, wherein each of the first and second endplate vertical end surfaces comprise opposing inner surface regions separated in the vertical direction in the inner regions adjacent the stacked series of unit cells, and opposing outer surface regions separated in the vertical direction in the outer regions that are external to the inner surface regions in the stacking direction, the opposing outer surface regions of each of the first and second endplate vertical end surfaces being offset inwardly in the vertical direction from the opposing inner surface regions.

Enumerated Embodiment 55: The method according to any preceding Enumerated Embodiment, wherein the stencil frame comprises first and second opposing ledges, and wherein in either of (a) or (c) the stencil is positioned over the electrode assembly such that the first and second opposing ledges of the stencil frame are received by the inwardly offset outer surface regions of the first and second endplates that are on a same vertical side of the electrode assembly as the stencil frame.

Enumerated Embodiment 56: The method according to any preceding Enumerated Embodiment, wherein the stencil frame comprises first and second opposing ledges, and wherein in any of (a) and (c) the upper frame surfaces of the first and second opposing frame regions are positioned such that they do not extend exceed, or are recessed with respect to, first surface regions of the first and second endplates that coincide with the respective maximum vertical thicknesses $t_{EPMAX}$ of the first and second endplates in the vertical direction.

Enumerated Embodiment 57: The method according to any preceding Enumerated Embodiment, wherein the stencil frame comprises first and second opposing ledges, and wherein in (a) the upper frame surfaces of the first and second opposing frame regions are positioned such that they do not extend exceed, or are recessed with respect to, first surface regions of the first and second endplates that coincide with first maximum vertical extents of the first and second endplates that are on a same vertical side of the electrode assembly as the upper surfaces of the first and second opposing frame regions.

Enumerated Embodiment 58: The method according to any preceding Enumerated Embodiment, wherein the stencil frame comprises first and second opposing ledges, and wherein in (c) the upper frame surfaces of the first and second opposing frame regions are positioned such that they do not extend exceed, or are recessed with respect to, second surface regions of the first and second endplates that coincide with the second maximum vertical extent of the first and second endplates that are on a same vertical side of the electrode assembly as the upper surfaces of the first and second opposing frame regions.

Enumerated Embodiment 59: The method or structure according to any preceding Enumerated Embodiment, wherein the electrode assembly comprises a longitudinal axis (Y) in the stacking direction, and a vertical axis (Z) in the vertical direction, and wherein the first and second endplates each comprise first and second opposing vertical end surfaces having a cross-sectional profile in a Y-Z plane that is chamfered, sloped, stepped, or any combination thereof.

Enumerated Embodiment 60: The method or structure of any preceding Enumerated Embodiment, wherein the cross-sectional profile of each of the first and second endplates in the Y-Z plane decreases monotonically from the inner region to the outer region of each of the respective first and second endplates.

Enumerated Embodiment 61: The method or structure of any preceding Enumerated Embodiment, wherein the cross-sectional profile of each of the first and second endplates in the Y-Z plane decreases step-wise from the inner region to the outer region in each of the respective first and second end plates.

Enumerated Embodiment 62: The method or structure of any preceding Enumerated Embodiment, wherein outer regions of the respective first and second end plates comprise stepped features adapted to receive a stencil frame.

Enumerated Embodiment 63: The method of any preceding Enumerated Embodiment, comprising comprises rotating the electrode assembly about a longitudinal axis in the stacking direction or a transverse axis in a transverse direction that is orthogonal to the stacking direction and vertical direction, to reverse the positions of the first and second vertical end surfaces of the electrode and counter-electrode structures in the vertical direction.

Enumerated Embodiment 64: The method of any preceding Enumerated Embodiment, wherein (b) comprises using a blade to apply a slurry of the porous electrically insulating material through the stencil aperture to cover the first vertical end surfaces of the electrode or the counter-electrode structure(s) of the members of the unit cell population.

Enumerated Embodiment 65: The method of any preceding Enumerated Embodiment, wherein (b) comprises using a blade to apply a slurry of the porous electrically insulating material through the stencil aperture to cover the first vertical end surfaces of the counter-electrode structure(s) of the members of the unit cell population.

Enumerated Embodiment 66: The method of any preceding Enumerated Embodiment, wherein each electrode structure of members of the unit cell population comprises a layer of an electrode active material, and each counter-electrode structure of members of the unit cell population comprises a layer of a counter-electrode active material, and wherein (b) comprises using a blade to apply a slurry of the porous electrically insulating material through the stencil aperture to cover first vertical end surfaces of layers of counter-electrode active material of the counter-electrode structure(s) of the members of the unit cell population.

Enumerated Embodiment 67: The method of any preceding Enumerated Embodiment, wherein (d) comprises using a blade to apply a slurry of the porous electrically insulating material through the stencil aperture to cover the second vertical end surfaces of the electrode or the counter-electrode structure(s) of the members of the unit cell population.

Enumerated Embodiment 68: The method of any preceding Enumerated Embodiment, wherein (d) comprises using a blade to apply a slurry of the porous electrically insulating material through the stencil aperture to cover the second vertical end surfaces of the counter-electrode structure(s) of the members of the unit cell population.

Enumerated Embodiment 69: The method of any preceding Enumerated Embodiment, wherein each electrode structure of members of the unit cell population comprises a layer of an electrode active material, and each counter-electrode structure of members of the unit cell population comprises a layer of a counter-electrode active material, and wherein (d) comprises using a blade to apply a slurry of the porous electrically insulating material through the stencil aperture to cover second vertical end surfaces of layers of counter-electrode active material of the counter-electrode structure(s) of the members of the unit cell population.

Enumerated Embodiment 70: The method according to any preceding Enumerated Embodiment, wherein (b) comprises running a blade along the first vertical end surfaces of the first and second endplates in a transverse direction that is orthogonal to the vertical and stacking directions to apply the porous electrically insulating material through the stencil aperture to the first vertical end surfaces of the electrode or counter-electrode structure(s).

Enumerated Embodiment 71: The method according to any preceding Enumerated Embodiment, wherein the blade is run across the first vertical end surfaces at first surface regions of the first and second endplates that coincide with the respective maximum vertical thicknesses $t_{EPMAX}$ in the vertical direction.

Enumerated Embodiment 72: The method according to any preceding Enumerated Embodiment, wherein the blade is run across the first vertical end surfaces at first surface regions of the first and second endplates coinciding with the respective first maximum extents of the first and second endplates in the vertical direction.

Enumerated Embodiment 73: The method according to any preceding Enumerated Embodiment, wherein (b) comprises running a blade in a transverse direction that is orthogonal to the stacking direction and the vertical direction, across first vertical end surfaces of the first and second endplates.

Enumerated Embodiment 74: The method according to any preceding Enumerated Embodiment, wherein in (b) a length of the blade extends across the electrode assembly from the first endplate to the second endplate in the stacking direction.

Enumerated Embodiment 75: The method according to any preceding Enumerated Embodiment, wherein (b) comprises applying the porous electrically insulating material to any of the blade or a surface of the electrode assembly, and running the blade along first vertical end surfaces of the first and second endplate in the transverse direction.

Enumerated Embodiment 76: The method according to any preceding Enumerated Embodiment, wherein (d) comprises running a blade along the second vertical end surfaces of the first and second endplates in a transverse direction that is orthogonal to the vertical and stacking directions to apply the porous electrically insulating material through the stencil aperture to the second end surfaces of the electrode or counter-electrode structure(s).

Enumerated Embodiment 77: The method according to any preceding Enumerated Embodiment, wherein the blade is run across second vertical end surfaces at second surface regions of the first and second endplates that coincide with the respective maximum vertical thicknesses $t_{EPMAX}$ of the first and second endplates in the vertical direction.

Enumerated Embodiment 78: The method according to any preceding Enumerated Embodiment, wherein the blade is run across second vertical end surfaces at second surface regions the first and second endplates that coincide with the respective second maximum vertical extents of the first and second endplates in the vertical direction.

Enumerated Embodiment 79: The method according to any preceding Enumerated Embodiment, wherein the blade is run in a transverse direction that is orthogonal to the stacking direction and the vertical direction, across the second vertical end surfaces of the first and second endplates.

Enumerated Embodiment 80: The method according to any preceding Enumerated Embodiment, wherein in (d) a length of the blade extends across the electrode assembly from the first endplate to the second endplate in the stacking direction.

Enumerated Embodiment 81: The method according to any preceding Enumerated Embodiment, wherein (d) comprises running a blade along the second vertical end surfaces of the first and second endplates in a transverse direction that is orthogonal to the vertical and stacking directions to apply the porous electrically insulating material through the stencil aperture to the second vertical end surfaces of the electrode or counter-electrode structure(s).

Enumerated Embodiment 82: The method according to any preceding Enumerated Embodiment, wherein (d) comprises applying the porous electrically insulating material to any of the blade or a surface of the electrode assembly, and running the blade along the second vertical end surfaces of the first and second endplate in the transverse direction.

Enumerated Embodiment 83: The method according to any preceding Enumerated Embodiment, wherein (a) comprises positioning the stencil such that at least a portion of the first vertical end surfaces of the first and second endplates that are adjacent the stacked series of unit cells are exposed through the stencil aperture.

Enumerated Embodiment 84: The method according to any preceding Enumerated Embodiment, wherein (c) comprises positioning the stencil such that at least a portion of the second vertical end surfaces of the first and second endplates that are adjacent the stacked series of unit cells is exposed through the stencil aperture.

Enumerated Embodiment 85: The method according to any preceding Enumerated Embodiment, wherein (a) comprises positioning the stencil such that the first surface regions on the first vertical sides of the first and second endplates coinciding with the respective maximum vertical thicknesses $t_{EPMAX}$ of the first and second endplates in the vertical direction are exposed through the stencil aperture.

Enumerated Embodiment 86: The method according to any preceding Enumerated Embodiment, wherein (a) comprises positioning the stencil such that the first surface regions on the first vertical sides of the first and second endplates coinciding with first maximum vertical extents of the first and second endplates are exposed through the stencil aperture.

Enumerated Embodiment 87: The method according to any preceding Enumerated Embodiment, wherein (c) comprises positioning the stencil such that the second surface regions on the second vertical sides of the first and second endplates coinciding with respective maximum vertical thicknesses $t_{EPMAX}$ of the first and second endplates in the vertical direction are exposed through the stencil aperture.

Enumerated Embodiment 88: The method according to any preceding Enumerated Embodiment, wherein (c) comprises positioning the stencil such that the second surface regions on the second vertical sides of the first and second endplates coinciding with the second maximum vertical extents of the first and second endplates are exposed through the stencil aperture.

Enumerated Embodiment 89: The method according to any preceding Enumerated Embodiment, wherein in any of (a) and (c), the stencil is positioned such that the stencil frame at least partly covers a periphery of the electrode assembly in the transverse direction that is orthogonal to both the stacking direction and the vertical direction.

Enumerated Embodiment 90: The method or structure according to any preceding Enumerated Embodiment, wherein each unit cell comprises an electrode current collector end section and a counter-electrode current collector end section extending from the respective electrode structure and counter-electrode structure in opposing transverse directions that are orthogonal to both the stacking direction and the vertical direction.

Enumerated Embodiment 91: The method or structure of any preceding Enumerated Embodiment, wherein end sections of any of the electrode and counter-electrode current collectors are recessed in the vertical direction with respect to the first and second vertical end surfaces of the electrode and counter-electrode structures.

Enumerated Embodiment 92: The method according to any preceding Enumerated Embodiment, wherein in any of (a) and (c), the stencil is positioned such that the stencil frame at least partly covers the end sections of any of the electrode and counter-electrode current collectors at the periphery of the electrode assembly in the transverse direction that is orthogonal to the stacking and vertical directions.

Enumerated Embodiment 93: The method according to any preceding Enumerated Embodiment, wherein in any of (a) and (c), the stencil is positioned such that the ends of the electrode and counter-electrode current collectors are recessed with respect to the stencil frame.

Enumerated Embodiment 94: The method according to any preceding Enumerated Embodiment, wherein in any of (a) and (c), the stencil is positioned such that opposing transverse ledges of the stencil frame are positioned over the ends of the electrode and counter-electrode current collectors.

Enumerated Embodiment 95: The method or structure according to any preceding Enumerated Embodiment, wherein first and second vertical end surfaces of the ends of the electrode and counter-electrode current collectors are recessed at least 0.010 mm with respect to any of (i) the first and second vertical end surfaces of the electrode structures, (ii) first and second surface regions of the first and second endplates that coincide with the first and second maximum vertical extents of the first and second endplates, and (iii) first and second surface regions of the first and second endplates that coincide with respective maximum vertical thicknesses $t_{EPMAX}$ of the first and second endplates in the vertical direction.

Enumerated Embodiment 96: The method or structure according to any preceding Enumerated Embodiment, wherein first and second vertical end surfaces of the ends of the electrode and counter-electrode current collectors are recessed at least 0.025 mm with respect to any of (i) the first and second vertical end surfaces of the electrode structures, (ii) first surface regions of the first and second endplates that coincide with the first and second maximum vertical extents of the first and second endplates, and (iii) first surface regions of the first and second endplates that coincide with respective maximum vertical thicknesses $t_{EPMAX}$ of the first and second endplates in the vertical direction.

Enumerated Embodiment 97: The method or structure according to any preceding Enumerated Embodiment, wherein first and second vertical end surfaces of the ends of the electrode and counter-electrode current collectors are recessed at least 0.050 mm with respect to any of (i) the first and second vertical end surfaces of the electrode structures, (ii) first surface regions of the first and second endplates that coincide with the first and second maximum vertical extents of the first and second endplates, and (iii) first surface regions of the first and second endplates that coincide with respective maximum vertical thicknesses $t_{EPMAX}$ of the first and second endplates in the vertical direction.

Enumerated Embodiment 98: The method or structure according to any preceding Enumerated Embodiment, wherein the first and second vertical end surfaces of the ends of the electrode and counter-electrode current collectors are recessed to accommodate the stencil frame in a vertical distance between the first and second vertical end surfaces of the ends of the electrode and counter-electrode current collectors, and the first and second vertical end surfaces of the electrode or counter-electrode structures.

Enumerated Embodiment 99: The method of any preceding Enumerated Embodiment, further comprising placing the electrode assembly between a set of opposing bumpers in the stacking direction, and applying a pressure via the bumpers to the first and second endplates in the stacking direction.

Enumerated Embodiment 100: The method of any preceding Enumerated Embodiment, wherein the electrode assembly is placed between the bumpers such that first surface regions of the first and second endplates that coincide with first maximum vertical extents of the first and second endplates extend past first and second vertical end surfaces of the bumpers in the vertical direction.

Enumerated Embodiment 101: The method of any preceding Enumerated Embodiment, wherein the electrode assembly is placed between the bumpers such that first surface regions of the first and second endplates that coincide with respective maximum vertical thicknesses $t_{EPMAX}$ of the first and second endplates in the vertical direction extend past first and second vertical end surfaces of the bumpers in the vertical direction.

Enumerated Embodiment 102: The method of any preceding Enumerated Embodiment, further comprising resting at least a portion of the stencil frame on the set of opposing bumpers.

Enumerated Embodiment 103: The method of any preceding Enumerated Embodiment, wherein the first and second surface regions of the first and second endplates coinciding with the first and second maximum vertical extents of the first and second endplates extend at least 0.010 mm past the first and second vertical end surfaces of the set of bumpers.

Enumerated Embodiment 104: The method of any preceding Enumerated Embodiment, wherein the first and second surface regions of the first and second endplates coinciding with the respective maximum vertical thicknesses $t_{EPMAX}$ of the first and second endplates in the vertical direction extend at least 0.010 mm past the first and second vertical end surfaces of the set of bumpers.

Enumerated Embodiment 105: The method of any preceding Enumerated Embodiment, wherein the first and second surface regions of the first and second endplates coinciding with the first and second maximum vertical extents of the first and second endplates extend at least 0.025 mm past the first and second vertical end surfaces of the set of bumpers.

Enumerated Embodiment 106: The method of any preceding Enumerated Embodiment, wherein the first and second surface regions of the first and second endplates coinciding with the respective maximum vertical thicknesses $t_{EPMAX}$ of the first and second endplates in the vertical direction extend at least 0.025 mm past the first and second vertical end surfaces of the set of bumpers.

Enumerated Embodiment 107: The method of any preceding Enumerated Embodiment, wherein the first and second surface regions of the first and second endplates coinciding with the first and second maximum vertical extents of the first and second endplates extends at least 0.050 mm past the first and second vertical end surfaces of the set of bumpers.

Enumerated Embodiment 108: The method of any preceding Enumerated Embodiment, wherein the first and second surface regions of the first and second endplates coinciding with the respective maximum vertical thicknesses $t_{EPMAX}$ of the first and second endplates in the vertical direction extends at least 0.050 mm past the first and second vertical end surfaces of the set of bumpers.

Enumerated Embodiment 109: The method or structure of any preceding Enumerated Embodiment, wherein the cross-sectional thickness $t_{EP}$ of each of the first and second endplates decreases in the stacking direction from the inner region of the respective first and second endplates that is adjacent the stacked series of unit cells, to outer second region of the respective first and second endplates that is external to the inner region in the stacking direction.

Enumerated Embodiment 110: A secondary battery comprising the structure according to any preceding Enumerated Embodiment.

Enumerated Embodiment 111: A secondary battery manufactured according to the method of any preceding Enumerated Embodiment.

Enumerated Embodiment 112: A method for transferring carrier ions from an auxiliary electrode comprising a source of carrier ions to the structure or secondary battery comprising the electrode assembly of any preceding Enumerated Embodiment, wherein
  the porous electrically insulating material covers the first or second vertical end surface(s) of the electrode or the counter-electrode structure(s) of the members of the unit cell population, and the porous electrically insulating material has a porosity in the range of from 20% to 60%, and
  the method comprises transferring carrier ions through the porous electrically insulating material from the auxiliary electrode to members of the unit cell population.

Enumerated Embodiment 113: The structure or secondary battery comprising the structure according to any preceding Enumerated Embodiment, the electrode assembly comprising:

porous electrically insulating material that covers the first or second vertical end surfacers) of the electrode or the counter-electrode structure(s) of the members of the unit cell population, and (v) the porous electrically insulating material has a porosity in the range of from 20% to 60%.

Enumerated Embodiment 114: The method, structure, or secondary battery according to any preceding Enumerated Embodiment, wherein the porous electrically insulating material covers both the first and second vertical end surface(s) of the electrode or the counter-electrode structure(s) of the members of the unit cell population.

Enumerated Embodiment 115: The method, structure, or secondary battery according to any preceding Enumerated Embodiment, wherein the porous electrically insulating material covers the first or second vertical end surface(s) of both the electrode and the counter-electrode structure(s) of the members of the unit cell population.

Enumerated Embodiment 116: The method, structure, or secondary battery according to any preceding Enumerated Embodiment, wherein the porous electrically insulating material covers both the first and second vertical end surface(s) of both the electrode and the counter-electrode structure(s) of the members of the unit cell population.

Enumerated Embodiment 117: The method according to any preceding Enumerated Embodiment, wherein carrier ions are transferred to achieve and/or restore a predetermined counter-electrode structure end of discharge voltage Vces cod, and a predetermined electrode structure end of discharge voltage Ves,eod.

Enumerated Embodiment 118: The method according to any preceding Enumerated Embodiment, wherein the carrier ions are transferred to replenish carrier ions lost to the formation of SEI.

Enumerated Embodiment 119: The method according to any preceding Enumerated Embodiment, wherein the carrier ions are transferred to compensate for a loss of carrier ions during an initial or subsequent charging cycle performed by the electrode assembly, Enumerated Embodiment 120: The method according to any preceding Enumerated Embodiment, wherein the method comprises (i) transferring carrier ions from counter-electrode structures to electrode structures in the unit cell population during an initial or subsequent charging cycle to at least partially charge the electrode assembly, and (ii) transferring carrier ions from the auxiliary electrode, to counter-electrode structures and/or electrode structures, through the porous electrically insulating material, to provide the electrode assembly with the predetermined counter-electrode structure end of discharge voltage Vces,eod, and the predetermined electrode structure end of discharge voltage Ves,eod.

Enumerated Embodiment 121: The method according to any preceding Enumerated Embodiment, wherein the process further comprises (iii) transferring, after (ii), carrier ions from the counter-electrode structure to the electrode structure of members of the unit cell population to charge the electrode assembly.

Enumerated Embodiment 122: The method according to any preceding Enumerated Embodiment, wherein (ii) is performed simultaneously with (i).

Enumerated Embodiment 123: The method according to any preceding Enumerated Embodiment comprising, in (ii), applying a bias voltage between the auxiliary electrode and the electrode structure and/or counter-electrode structure of members of the unit cell population to provide a flow of carrier ions through the porous electrically insulating material members.

Enumerated Embodiment 124: The method, structure, or secondary battery of any preceding Enumerated Embodiment, wherein members of the unit cell population have first and second edge margins that comprise the opposing first and second vertical end surfaces, wherein first vertical end surfaces of the electrode and counter-electrode structures within a same unit cell population member are vertically offset from one another to form an first recess, and second vertical end surfaces of the electrode and counter-electrode structures within a same unit cell population member are vertically offset from one another to form a second recess, wherein the counter-electrode structure first and second end surfaces are vertically offset inwardly with respect to the respective electrode structure first and second vertical end surfaces within the same unit cell population member, and wherein the porous electrically insulating material is located within at least one of the first and second recesses.

Enumerated Embodiment 125: The method, structure, or secondary battery of any preceding Enumerated Embodiment, wherein the porous electrically insulating material substantially fills the first and second recesses of members of the unit cell population.

Enumerated Embodiment 126: The method, structure, or secondary battery of any preceding Enumerated Embodiment wherein, for members of the unit cell population, at least a portion of the porous electrically insulating material covering the first or second vertical end surfaces of the electrode structure and/or the counter-electrode structure is adjacent the electrically insulating separator.

Enumerated Embodiment 127: The method, structure, or secondary battery of any preceding Enumerated Embodiment, wherein the porous electrically insulating material substantially fills regions of the first and second recesses that are inwardly disposed with respect to the first and second vertical end surfaces of the electrode structures in members of the unit cell population, and that are abutting a side of the electrically insulating separator facing the counter-electrode structure.

Enumerated Embodiment 128: The method, structure, or secondary battery of any preceding Enumerated Embodiment, wherein the electrode structures of the members of the unit cell population comprise electrode active material layers and electrode current collector layers, and the counter-electrode structures of members of the unit cell population comprise counter-electrode active material layers and counter-electrode current collector layers, and wherein the porous electrically insulating material covers first and second vertical end surfaces of counter-electrode active material layers of the members of the unit cell population.

Enumerated Embodiment 129: The method, structure, or secondary battery of any preceding Enumerated Embodiment, wherein the porous electrically insulating material comprises a porosity of at least 25%.

Enumerated Embodiment 130: The method, structure, or secondary battery of any preceding Enumerated Embodiment, wherein the porous electrically insulating material comprises a porosity of at least 30%.

Enumerated Embodiment 131: The method, structure, or secondary battery of any preceding Enumerated Embodiment, wherein the porous electrically insulating material comprises a porosity of at least 35%.

Enumerated Embodiment 132: The method, structure, or secondary battery of any preceding Enumerated Embodiment, wherein the porous electrically insulating material comprises a porosity of at least 40%.

Enumerated Embodiment 133: The method, structure, or secondary battery of any preceding Enumerated Embodiment, wherein the porous electrically insulating material comprises a porosity of at least 45%.

Enumerated Embodiment 134: The method, structure, or secondary battery of any preceding Enumerated Embodiment, wherein the porous electrically insulating material comprises a porosity of at least 50%.

Enumerated Embodiment 135: The method, structure, or secondary battery of any preceding Enumerated Embodiment, wherein the porous electrically insulating material comprises a porosity of at least 55%.

Enumerated Embodiment 136: The method, structure, or secondary battery of any preceding Enumerated Embodiment, wherein the porous electrically insulating material comprises a porosity of no more than 55%.

Enumerated Embodiment 137: The method, structure, or secondary battery of any preceding Enumerated Embodiment, wherein the porous electrically insulating material comprises a porosity of no more than 50%.

Enumerated Embodiment 138: The method, structure, or secondary battery of any preceding Enumerated Embodiment, wherein the porous electrically insulating material comprises a porosity of no more than 45%.

Enumerated Embodiment 139: The method, structure, or secondary battery of any preceding Enumerated Embodiment, wherein the porous electrically insulating material comprises a porosity of no more than 40%.

Enumerated Embodiment 140: The method, structure, or secondary battery of any preceding Enumerated Embodiment, wherein the porous electrically insulating material comprises a porosity of no more than 35%.

Enumerated Embodiment 141: The method, structure, or secondary battery of any preceding Enumerated Embodiment, wherein the electrically insulating separator is microporous and a ratio of the porosity of the porous electrically insulating material to a porosity of the electrically insulating separator is in a range of from 1:0.75 to 1:1.5.

Enumerated Embodiment 142: The method, structure, or secondary battery of any preceding Enumerated Embodiment, wherein the porous electrically insulating material comprises a particulate material dispersed in a binder material.

Enumerated Embodiment 143: The method, structure, or secondary battery of any preceding Enumerated Embodiment, wherein the particulate material comprises a stable metal oxide and/or ceramic.

Enumerated Embodiment 144: The method, structure, or secondary battery of any preceding Enumerated Embodiment, wherein the particulate material comprises any one or more of alumina, boron nitride, titania, silica, zirconia, magnesium oxide and calcium oxide.

Enumerated Embodiment 145: The method, structure, or secondary battery of any preceding Enumerated Embodiment, wherein the particulate material comprises alumina.

Enumerated Embodiment 146: The method, structure, or secondary battery of any preceding Enumerated Embodiment, wherein the particulate material comprises particles having a d50 particle size (median particle size) of at least 0.35 microns.

Enumerated Embodiment 147: The method, structure, or secondary battery of any preceding Enumerated Embodiment, wherein the particulate material comprises particles having a d50 particle size (median particle size) of at least 0.45 microns.

Enumerated Embodiment 148: The method, structure, or secondary battery of any preceding Enumerated Embodiment, wherein the particulate material comprises particles having a d50 particle size (median particle size) of at least 0.5 microns.

Enumerated Embodiment 149: The method, structure, or secondary battery of any preceding Enumerated Embodiment, wherein the particulate material comprises particles having a d50 particle size (median particle size) of at least 0.75 microns.

Enumerated Embodiment 150: The method, structure, or secondary battery of any preceding Enumerated Embodiment, wherein the particulate material comprises particles having a d50 particle size (median particle size) of no more than 40 microns.

Enumerated Embodiment 151: The method, structure, or secondary battery of any preceding Enumerated Embodiment, wherein the particulate material comprises particles having a d50 particle size (median particle size) of no more than 35 microns.

Enumerated Embodiment 152: The method, structure, or secondary battery of any preceding Enumerated Embodiment, wherein the particulate material comprises particles having a d50 particle size (median particle size) of no more than 25 microns.

Enumerated Embodiment 153: The method, structure, or secondary battery of any preceding Enumerated Embodiment, wherein the particulate material comprises particles having a d50 particle size (median particle size) of no more than 20 microns.

Enumerated Embodiment 154: The method, structure, or secondary battery of any preceding Enumerated Embodiment, wherein at least 80% by weight of the particles have a particle size of at least 0.35 microns.

Enumerated Embodiment 155: The method, structure, or secondary battery of any preceding Enumerated Embodiment, wherein at least 85% by weight of the particles have a particle size of at least 0.35 microns.

Enumerated Embodiment 156: The method, structure, or secondary battery of any preceding Enumerated Embodiment, wherein at least 90% by weight of the particles have a particle size of at least 0.35 microns.

Enumerated Embodiment 157: The method, structure, or secondary battery of any preceding Enumerated Embodiment, wherein at least 95% by weight of the particles have a particle size of at least 0.35 microns.

Enumerated Embodiment 158: The method, structure, or secondary battery of any preceding Enumerated Embodiment, wherein at least 80% by weight of the particles have a particle size of at least at least 0.45 microns.

Enumerated Embodiment 159: The method, structure, or secondary battery of any preceding Enumerated Embodiment, wherein at least 85% by weight of the particles have a particle size of at least 0.45 microns.

Enumerated Embodiment 160: The method, structure, or secondary battery of any preceding Enumerated Embodiment, wherein at least 90% by weight of the particles have a particle size of at least 0.45 microns.

Enumerated Embodiment 161: The method, structure, or secondary battery of any preceding Enumerated Embodiment, wherein at least 95% by weight of the particles have a particle size of at least 0.45 microns.

Enumerated Embodiment 162: The method, structure, or secondary battery of any preceding Enumerated Embodiment, wherein at least 80% by weight of the particles have a particle size of at least 0.5 microns.

Enumerated Embodiment 163: The method, structure, or secondary battery of any preceding Enumerated Embodiment, wherein at least 85% by weight of the particles have a particle size of at least 0.5 microns.

Enumerated Embodiment 164: The method, structure, or secondary battery of any preceding Enumerated Embodiment, wherein at least 90% by weight of the particles have a particle size of at least 0.5 microns.

Enumerated Embodiment 165: The method, structure, or secondary battery of any preceding Enumerated Embodiment, wherein at least 95% by weight of the particles have a particle size of at least 0.5 microns.

Enumerated Embodiment 166: The method, structure, or secondary battery of any preceding Enumerated Embodiment, wherein at least 80% by weight of the particles have a particle size of at least 0.75 microns.

Enumerated Embodiment 167: The method, structure, or secondary battery of any preceding Enumerated Embodiment, wherein at least 85% by weight of the particles have a particle size of at least 0.75 microns.

Enumerated Embodiment 168: The method, structure, or secondary battery of any preceding Enumerated Embodiment, wherein at least 90% by weight of the particles have a particle size of at least 0.75 microns.

Enumerated Embodiment 169: The method, structure, or secondary battery of any preceding Enumerated Embodiment, wherein at least 95% by weight of the particles have a particle size of at least 0.75 microns.

Enumerated Embodiment 170: The method, structure, or secondary battery of any preceding Enumerated Embodiment, wherein at least 80% by weight of the particles have a particle size of no more than 40 microns.

Enumerated Embodiment 171: The method, structure, or secondary battery of any preceding Enumerated Embodiment, wherein at least 85% by weight of the particles have a particle size of no more than 40 microns.

Enumerated Embodiment 172: The method, structure, or secondary battery of any preceding Enumerated Embodiment, wherein at least 90% by weight of the particles have a particle size of no more than 40 microns.

Enumerated Embodiment 173: The method, structure, or secondary battery of any preceding Enumerated Embodiment, wherein at least 95% by weight of the particles have a particle size of no more than 40 microns.

Enumerated Embodiment 174: The method, structure, or secondary battery of any preceding Enumerated Embodiment, wherein at least 80% by weight of the particles have a particle size of no more than 35 microns.

Enumerated Embodiment 175: The method, structure, or secondary battery of any preceding Enumerated Embodiment, wherein at least 85% by weight of the particles have a particle size of no more than 35 microns.

Enumerated Embodiment 176: The method, structure, or secondary battery of any preceding Enumerated Embodiment, wherein at least 90% by weight of the particles have a particle size of no more than 35 microns.

Enumerated Embodiment 177: The method, structure, or secondary battery of any preceding Enumerated Embodiment, wherein at least 95% by weight of the particles have a particle size of no more than 35 microns.

Enumerated Embodiment 178: The method, structure, or secondary battery of any preceding Enumerated Embodiment, wherein at least 80% by weight of the particles have a particle size of no more than 25 microns.

Enumerated Embodiment 179: The method, structure, or secondary battery of any preceding Enumerated Embodiment 2, wherein at least 85% by weight of the particles have a particle size of no more than 25 microns.

Enumerated Embodiment 180: The method, structure, or secondary battery of any preceding Enumerated Embodiment, wherein at least 90% by weight of the particles have a particle size of no more than 25 microns.

Enumerated Embodiment 181: The method, structure, or secondary battery of any preceding Enumerated Embodiment, wherein at least 95% by weight of the particles have a particle size of no more than 25 microns.

Enumerated Embodiment 182: The method, structure, or secondary battery of any preceding Enumerated Embodiment, wherein at least 80% by weight of the particles have a particle size of no more than 20 microns.

Enumerated Embodiment 183: The method, structure, or secondary battery of any preceding Enumerated Embodiment, wherein at least 85% by weight of the particles have a particle size of no more than 25 microns.

Enumerated Embodiment 184: The method, structure, or secondary battery of any preceding Enumerated Embodiment, wherein at least 90% by weight of the particles have a particle size of no more than 25 microns.

Enumerated Embodiment 185: The method, structure, or secondary battery of any preceding Enumerated Embodiment, wherein at least 95% by weight of the particles have a particle size of no more than 25 microns.

Enumerated Embodiment 186: The method, structure, or secondary battery of any preceding Enumerated Embodiment, wherein the particulate material comprises at least 70 wt % of the porous electrically insulating material.

Enumerated Embodiment 187: The method, structure, or secondary battery of any preceding Enumerated Embodiment, wherein the particulate material comprises at least 75 wt % of the porous electrically insulating material.

Enumerated Embodiment 188: The method, structure, or secondary battery of any preceding Enumerated Embodiment, wherein the particulate material comprises at least 80 wt % of the porous electrically insulating material.

Enumerated Embodiment 189: The method, structure, or secondary battery of any preceding Enumerated Embodiment, wherein the particulate material comprises at least 85 wt % of the porous electrically insulating material.

Enumerated Embodiment 190: The method, structure, or secondary battery of any preceding Enumerated Embodiment, wherein the particulate material comprises no more than 99.5 wt % of the porous electrically insulating material.

Enumerated Embodiment 191: The method, structure, or secondary battery of any preceding Enumerated Embodiment, wherein the particulate material comprises no more than 97 wt % of the porous electrically insulating material.

Enumerated Embodiment 192: The method, structure, or secondary battery of any preceding Enumerated Embodiment, wherein the particulate material comprises no more than 95 wt % of the porous electrically insulating material.

Enumerated Embodiment 193: The method, structure, or secondary battery of any preceding Enumerated Embodiment, wherein the particulate material comprises no more than 90 wt % of the porous electrically insulating material.

Enumerated Embodiment 194: The method, structure, or secondary battery of any preceding Enumerated Embodiment, wherein the binder material comprises a polymeric material selected from any of the group consisting of polyvinylidene fluoride (PVDF), polyethylene, polypropylene, ethylene acrylic acid (EAA), ethylene methacrylic acid (EMAA), and copolymers thereof.

Enumerated Embodiment 195: The method, structure, or secondary battery of any preceding Enumerated Embodiment, wherein the electrode assembly has mutually perpendicular transverse, longitudinal and vertical axes corresponding to the x, y and z axes, respectively, of an imaginary three-dimensional Cartesian coordinate system, the first longitudinal end surface and the second longitudinal end surface separated from each other in the longitudinal direction, and a lateral surface surrounding an electrode assembly longitudinal axis AEA and connecting the first and second longitudinal end surfaces, the lateral surface having opposing first and second regions on opposite sides of the longitudinal axis and separated in a first direction that is orthogonal to the longitudinal axis, the electrode assembly having a maximum width WEA measured in the longitudinal direction, a maximum length LEA bounded by the lateral surface and measured in the transverse direction, and a maximum height HEA bounded by the lateral surface and measured in the vertical direction, and further wherein each electrode structure of members of the unit cell population comprise a length LE as measured in the transverse direction between first and second opposing transverse end surfaces of the electrode structure, and a height HE as measured in the vertical direction between first and second opposing vertical end surfaces of the electrode structure, and a width WE as measured in the longitudinal direction between first and second opposing surfaces of the electrode structure, and each counter-electrode structure of members of the unit cell population comprises a length LCE as measured in the transverse direction between first and second opposing transverse end surfaces of the counter-electrode structure, a height HCE as measured in the vertical direction between first and second vertical end surfaces of the counter-electrode structure, and a width WOE as measured in the longitudinal direction between first and second opposing surfaces of the counter-electrode structure, and wherein the ratio of LE to each of WE and HE is at least 5:1, respectively, and a ratio of HE to WE is in the range of about 2:1 to about 100:1, for electrode structures of members of the unit cell population, and the ratio of LCE to each of WCE and HCE is at least 5:1, respectively, and a ratio of HCE to WOE is in the range of about 2:1 to about 100:1, for counter-electrode structures of members of the unit cell population.

Enumerated Embodiment 196: The method, structure, or secondary battery of any preceding Enumerated Embodiment, wherein the porous electrically insulating material extends at least 50% of the length LCE of the counter-electrode structure of members of the unit cell population.

Enumerated Embodiment 197: The method, structure, or secondary battery of any preceding Enumerated Embodiment, wherein the porous electrically insulating material extends at least 60% of the length LCE of the counter-electrode structure of members of the unit cell population.

Enumerated Embodiment 198: The method, structure, or secondary battery of any preceding Enumerated Embodiment, wherein the porous electrically insulating material extends at least 75% of the length LCE of the counter-electrode structure of members of the unit cell population.

Enumerated Embodiment 199: The method, structure, or secondary battery of any preceding Enumerated Embodiment, wherein the porous electrically insulating material extends at least 85% of the length LCE of the counter-electrode structure of members of the unit cell population.

Enumerated Embodiment 200: The method, structure, or secondary battery of any preceding Enumerated Embodiment, wherein the porous electrically insulating material extends at least 90% of the length LCE of the counter-electrode structure of members of the unit cell population.

Enumerated Embodiment 201: The method, structure, or secondary battery of any preceding Enumerated Embodiment, wherein each electrode structure of members of the unit cell population comprises a layer of an electrode active material, and each counter-electrode structure of members of the unit cell population comprises a layer of a counter-electrode active material, and wherein, for adjacent electrode and counter-electrode active material layers in a unit cell member, the first vertical end surface of the counter-electrode active material layer comprises a first recess that is inwardly disposed with respect to the first vertical end surfaces of the electrode active material layer and the separator, the second vertical end surface of the counter-electrode active material layer comprises a second recess that is inwardly disposed with respect to the second vertical end surfaces of the electrode active material layer and the separator, and the porous electrically insulating material is disposed adjacent the electrically insulating separator and within the first recess of the first vertical end surface of the counter-electrode active material layer, and the porous electrically insulating material is disposed adjacent the electrically insulating separator and within the second recess of the second vertical end surface of the counter-electrode active material layer.

Enumerated Embodiment 202: The method, structure, or secondary battery of any preceding Enumerated Embodiment, wherein the secondary battery comprises a set of electrode constraints.

Enumerated Embodiment 203: The method, structure, or secondary battery of any preceding Enumerated Embodiment, wherein the set of electrode constraints comprise a primary growth constraint system comprising first and second primary growth constraints and at least one primary connecting member, the first and second primary growth constraints separated from each other in the stacking direction, and the at least one primary connecting member connecting the first and second primary growth constraints, wherein the primary growth constraint system restrains growth of the electrode assembly in the stacking direction, and wherein the first and second primary growth constraints correspond to the respective first and second endplates.

Enumerated Embodiment 204: The method, structure, or secondary battery of any preceding Enumerated Embodiment, wherein the set of electrode constraints comprises a secondary growth constraint system comprising first and second secondary growth constraints separated in the vertical direction and connected by at least one secondary connecting member, wherein the secondary growth constraint system at least partially restrains growth of the electrode assembly in the vertical direction upon cycling of the electrode assembly.

Enumerated Embodiment 205: The method, structure, or secondary battery of any preceding Enumerated Embodiment, wherein any of the at least one primary connecting member and at least one secondary connecting member are under tension.

Enumerated Embodiment 206: The method, structure, or secondary battery of any preceding Enumerated Embodiment, wherein the first and second secondary growth constraints are connected to the first and second endplates corresponding to the first and second primary growth constraints.

Enumerated Embodiment 207: The method, structure, or secondary battery of any preceding Enumerated Embodiment, wherein end segments of the first and secondary growth constraints at opposing longitudinal ends of the first and second secondary growth constraints wrap about at least a portion of the first and second vertical end surfaces of each of the first and second endplates.

Enumerated Embodiment 208: The method, structure, or secondary battery of any preceding Enumerated Embodiment 1, wherein end segments of the first and second secondary growth constraints wrap about at least a portion of the first and second vertical end surfaces of each of the first and second endplates, to connect to exterior longitudinal end surfaces of the first and second endplates.

Enumerated Embodiment 209: The method, structure, or secondary battery of any preceding Enumerated Embodiment, wherein the end segments of the first and second secondary growth constraints are connected to exterior longitudinal end surfaces of the first and second endplates by any one or more of adhering, gluing, welding, bonding, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Enumerated Embodiment 210: The method, structure, or secondary battery of any preceding Enumerated Embodiment, wherein the end segments of the first and second secondary growth constraints wrap about at least a portion of the first and second vertical end surfaces of each of the first and second endplates, to provide a curved profile of the end segments in a plane formed by the vertical axis and a longitudinal axis that is parallel to the stacking direction.

Enumerated Embodiment 211: The method, structure, or secondary battery of any preceding Enumerated Embodiment, wherein the end segments of the first and second growth constraints are curved about the first and second vertical end surfaces of the first and second endplates.

Enumerated Embodiment 212: The method, structure, or secondary battery of any preceding Enumerated Embodiment, wherein the primary growth constraint system restrains growth of the electrode assembly in the longitudinal direction during cycling of a secondary battery comprising the electrode assembly such that any increase in the Feret diameter of the electrode assembly in the longitudinal direction over 20 consecutive cycles of the secondary battery is less than 20%.

Enumerated Embodiment 213: The method, structure, or secondary battery of any preceding Enumerated Embodiment, wherein the secondary growth constraint system restrains growth of the electrode assembly in the vertical direction such that any increase in the Feret diameter of the electrode assembly in the vertical direction over 20 consecutive cycles upon repeated cycling of the secondary battery is less than 20%.

Enumerated Embodiment 214: The method, structure, or secondary battery of any preceding Enumerated Embodiment, wherein the first primary growth constraint at least partially covers the first longitudinal end surface of the electrode assembly, and the second primary growth constraint at least partially covers the second longitudinal end surface of the electrode assembly.

Enumerated Embodiment 215: The method, structure, or secondary battery of any preceding Enumerated Embodiment, wherein a surface area of a projection of the electrode assembly in a plane orthogonal to the stacking direction, is smaller than the surface areas of projections of the electrode assembly onto other orthogonal planes.

Enumerated Embodiment 216: The method, structure, or secondary battery of any preceding Enumerated Embodiment, wherein the first primary connecting member is the first secondary growth constraint, the second primary connecting member is the second secondary growth constraint, and the first primary growth constraint or the second primary growth constraint is the first secondary connecting member.

Enumerated Embodiment 217: The method, structure, or secondary battery of any preceding Enumerated Embodiment, wherein the at least one secondary connecting member comprises a member that is interior to longitudinal first and second ends of the electrode assembly along the longitudinal axis.

Enumerated Embodiment 218: The method, structure, or secondary battery of any preceding Enumerated Embodiment, wherein the surface area of the first and second longitudinal end surfaces is less than 33% of the surface area of the electrode assembly.

Enumerated Embodiment 219: The method, structure, or secondary battery of any preceding Enumerated Embodiment, wherein the surface area of the first and second longitudinal end surfaces is less than 25% of the surface area of the electrode assembly.

Enumerated Embodiment 220: The method, structure, or secondary battery of any preceding Enumerated Embodiment, wherein the surface area of the first and second longitudinal end surfaces is less than 20% of the surface area of the electrode assembly.

Enumerated Embodiment 221: The method, structure, or secondary battery of any preceding Enumerated Embodiment, wherein the surface area of the first and second longitudinal end surfaces is less than 15% of the surface area of the electrode assembly.

Enumerated Embodiment 222: The method, structure, or secondary battery of any preceding Enumerated Embodiment, wherein the surface area of the first and second longitudinal end surfaces is less than 10% of the surface area of the electrode assembly.

Enumerated Embodiment 223: The method, structure, or secondary battery of any preceding Enumerated Embodiment, wherein at least one of the primary and secondary growth constraint systems comprises a material having an ultimate tensile strength of at least 10,000 psi (>70 MPa).

Enumerated Embodiment 224: The method, structure, or secondary battery of any preceding Enumerated Embodiment, wherein at least one of the first primary growth constraint, the second primary growth constraint, the first secondary growth constraint, and the second secondary growth constraint, comprises a material having an ultimate tensile strength of at least 10,000 psi (>70 MPa).

Enumerated Embodiment 225: The method, structure, or secondary battery of any preceding Enumerated Embodiment, wherein at least one of the primary and secondary growth constraint systems comprises a sheet of material having a thickness in the range of about 10 to about 100 micrometers.

Enumerated Embodiment 226: The method, structure, or secondary battery of any preceding Enumerated Embodiment, wherein at least one of the primary and secondary growth constraint systems comprises a sheet of material having a thickness in the range of about 30 to about 75 micrometers.

Enumerated Embodiment 227: The method, structure, or secondary battery of any preceding Enumerated Embodiment, wherein the first and second primary growth constraints exert a pressure on the first and second longitudinal end surfaces that exceeds the pressure maintained on the electrode assembly in each of two directions that are mutually perpendicular and perpendicular to the stacking direction.

Enumerated Embodiment 228: The method, structure, or secondary battery of any preceding Enumerated Embodiment, wherein the first and second primary growth constraints exert a pressure on the first and second longitudinal end surfaces that exceeds the pressure maintained on the electrode assembly in each of two directions that are mutually perpendicular and perpendicular to the stacking direction by a factor of at least 2.

Enumerated Embodiment 229: The method, structure, or secondary battery of any preceding Enumerated Embodiment, wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 3.

Enumerated Embodiment 230: The method, structure, or secondary battery of any preceding Enumerated Embodiment, wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 4.

Enumerated Embodiment 231: The method, structure, or secondary battery of any preceding Enumerated Embodiment, wherein the first and second primary growth constraints exert a pressure on the first and second longitudinal end surfaces that exceeds the pressure maintained on the electrode assembly in each of two directions that are mutually perpendicular and perpendicular to the stacking direction by factor of at least 5.

Enumerated Embodiment 232: The method, structure, or secondary battery of any preceding Enumerated Embodiment, wherein the first and second secondary growth constraints are connected to the at least one secondary connecting member by any one or more of adhering, gluing, welding, bonding, soldering, sintering, press contacting, brazing, thermal spraying joining, clamping, wire bonding, ribbon bonding, ultrasonic bonding, ultrasonic welding, resistance welding, laser beam welding, electron beam welding, induction welding, cold welding, plasma spraying, flame spraying, and arc spraying.

Enumerated Embodiment 233: The method, structure, or secondary battery of any preceding Enumerated Embodiment, wherein each of the first and second longitudinal end surfaces are under a compressive load of at least 100 psi.

Enumerated Embodiment 234: The method, structure, or secondary battery of any preceding Enumerated Embodiment, wherein each of the first and second longitudinal end surfaces are under a compressive load of at least 200 psi.

Enumerated Embodiment 235: The method, structure, or secondary battery of any preceding Enumerated Embodiment, wherein each of the first and second longitudinal end surfaces are under a compressive load of at least 300 psi.

Enumerated Embodiment 236: The method, structure, or secondary battery of any preceding Enumerated Embodiment, wherein each of the first and second longitudinal end surfaces are under a compressive load of at least 400 psi.

Enumerated Embodiment 237: The method, structure, or secondary battery of any preceding Enumerated Embodiment, wherein each of the first and second longitudinal end surfaces are under a compressive load of at least 500 psi.

Enumerated Embodiment 238: The method, structure, or secondary battery of any preceding Enumerated Embodiment, wherein each of the first and second longitudinal end surfaces are under a compressive load of at least 600 psi.

Enumerated Embodiment 239: The method, structure, or secondary battery of any preceding Enumerated Embodiment, wherein each of the first and second longitudinal end surfaces are under a compressive load of at least 700 psi.

Enumerated Embodiment 240: The method, structure, or secondary battery of any preceding Enumerated Embodiment, wherein each of the first and second longitudinal end surfaces are under a compressive load of at least 800 psi.

Enumerated Embodiment 241: The method, structure, or secondary battery of any preceding Enumerated Embodiment, wherein each of the first and second longitudinal end surfaces are under a compressive load of at least 900 psi.

Enumerated Embodiment 242: The method, structure, or secondary battery of any preceding Enumerated Embodiment, wherein each of the first and second longitudinal end surfaces are under a compressive load of at least 1000 psi.

Enumerated Embodiment 243. The method, structure, or secondary battery of any preceding Enumerated Embodiment, wherein a projection of the members of the electrode structure population and the counter-electrode structure population onto the first longitudinal surface circumscribes a first projected area and a projection of the members of the electrode structure population and the counter-electrode structure population onto the second longitudinal surface circumscribes a second projected area, and wherein the first and second primary growth constraints impose an average compressive load to each of the first and second projected areas of at least 0.7 MPa, averaged over the surface area of the first and second projected areas, respectively.

Enumerated Embodiment 244. The method, structure, or secondary battery of any preceding Enumerated Embodiment, wherein the first and second primary growth constraints impose an average compressive load to each of the first and second projected areas of at least 1.75 MPa, averaged over the surface area of the first and second projected areas, respectively.

Enumerated Embodiment 245. The method, structure, or secondary battery of any preceding Enumerated Embodiment, wherein the first and second primary growth constraints impose an average compressive load to each of the first and second projected areas of at least 2.8 MPa, averaged over the surface area of the first and second projected areas, respectively.

Enumerated Embodiment 246. The method, structure, or secondary battery of any preceding Enumerated Embodiment, wherein the first and second primary growth constraints impose an average compressive load to each of the first and second projected areas of at least 3.5 MPa, averaged over the surface area of the first and second projected areas, respectively.

Enumerated Embodiment 247. The method, structure, or secondary battery of any preceding Enumerated Embodiment 0, wherein the first and second primary growth constraints impose an average compressive load to each of the first and second projected areas of at least 5.25 MPa, averaged over the surface area of the first and second projected areas, respectively.

Enumerated Embodiment 248. The method, structure, or secondary battery of any preceding Enumerated Embodiment, wherein the first and second primary growth constraints impose an average compressive load to each of the first and second projected areas of at least 7 MPa, averaged over the surface area of the first and second projected areas, respectively.

Enumerated Embodiment 249. The method, structure, or secondary battery of any preceding Enumerated Embodiment, wherein the first and second primary growth constraints impose an average compressive load to each of the first and second projected areas of at least 8.75 MPa, averaged over the surface area of the first and second projected areas, respectively.

Enumerated Embodiment 250. The method, structure, or secondary battery of any preceding Enumerated Embodiment, wherein the first and second primary growth constraints impose an average compressive load to each of the first and second projected areas of at least 10 MPa, averaged over the surface area of the first and second projected areas, respectively.

Enumerated Embodiment 251. The method, structure, or secondary battery of any preceding Enumerated Embodiment, wherein the secondary battery has a rated capacity and the first and second longitudinal end surfaces are under such compressive loads when the secondary battery is charged to at least 75% of its rated capacity.

Enumerated Embodiment 252: The method, structure, or secondary battery of any preceding Enumerated Embodiment, wherein the set of electrode constraints comprises a secondary growth constraint system comprising first and second secondary growth constraints separated in the vertical direction and connected to electrode current collectors of members of the population of unit cells, wherein the secondary growth constraint system at least partially restrains growth of the electrode assembly in the vertical direction upon cycling of the electrode assembly.

Enumerated Embodiment 253: The method, structure, or secondary battery of any preceding Enumerated Embodiment, wherein the first and second secondary growth constraints comprise apertures formed through respective vertical thicknesses thereof, with at least a portion of the apertures being aligned over the porous electrically insulating material in the vertical direction, and optionally wherein carrier ions are transferred from the auxiliary electrode via the apertures and through the porous electrically insulating material to the electrode structure and/or counter-electrode structures.

Enumerated Embodiment 254: The method, structure, or secondary battery of any preceding Enumerated Embodiment, wherein (i) the electrode structures are anode structures and the counter-electrode structures are cathode structures, or (ii) the electrode structures are cathode structures and the counter-electrode structures are anode structures.

Enumerated Embodiment 255: The method, structure, or secondary battery of any preceding Enumerated Embodiment, wherein the electrode structures are anode structures comprising anodically active material layers, and the counter-electrode structures are cathode structures comprising cathodically active material layers.

Enumerated Embodiment 256: The method, structure, or secondary battery of any preceding Enumerated Embodiment, wherein the electrode assembly is contained with a sealed battery enclosure.

Enumerated Embodiment 257: The method, structure, or secondary battery of any preceding Enumerated Embodiment, wherein carrier ions and the set of electrode constraints are contained within the sealed battery enclosure.

Enumerated Embodiment 258: The method, structure, or secondary battery of any preceding Enumerated Embodiment, wherein the electrode structure comprises an anode active material comprising any one of more of carbon materials, graphite, soft or hard carbons, metals, semi-metals, alloys, oxides, compounds capable of forming an alloy with lithium, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, lithium titanate, palladium, lithium metals, carbon, petroleum cokes, activated carbon, graphite, silicon compounds, silicon alloys, tin compounds, non-graphitizable carbon, graphite-based carbon, $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 < x \leq 1$; $1 \leq y \leq 3$; $1 \leq z \leq 8$), a lithium alloy, a silicon-based alloy, a tin-based alloy; a metal oxide, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, a conductive polymer, polyacetylene, Li—Co—Ni-based material, crystalline graphite, natural graphite, synthetic graphite, amorphous carbon, Kish graphite, pyrolytic carbon, mesophase pitch-based carbon fibers, meso-carbon microbeads, mesophase pitches, graphitized carbon fiber, high-temperature sintered carbon, petroleum, coal tar pitch derived cokes, tin oxide, titanium nitrate, lithium metal film, an alloy of lithium and one or more types of metals selected from the group consisting of Na, K, Rb, Cs, Fr, Be, Mg, Ca, Sr, Ba, Ra, Al and Sn, a metal compound capable of alloying and/or intercalating with lithium selected from any of Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Sn alloy, an Al alloy, a metal oxide capable of doping and dedoping lithium ions, $SiO_v$ ($0 < v < 2$), $SnO_2$, vanadium oxide, lithium vanadium oxide, a composite including a metal compound and carbon material, a Si—C composite, a Sn—C composite, a transition metal oxide, $Li_4/_3Ti_5/_3O_4$, SnO, a carbonaceous material, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite, and a composition of the formula $Na_xSn_{y-z}M_z$ disposed between layers of the layered carbonaceous material, wherein M is Ti, K, Ge, P, or a combination thereof, and $0 < x \leq 15$, $1 \leq y \leq 5$, and $0 \leq z \leq 1$, as well as oxides, alloys, nitrides, fluorides of any of the foregoing, and any combination of any of the foregoing.

Enumerated Embodiment 259: The method, structure, or secondary battery of any preceding Enumerated Embodiment, wherein the electrode structure comprises an anode active material having a capacity for carrier ions that is more than one mole of carrier ion per mole of anode active material when a secondary battery containing the electrode structure with the anode active material is charged from a discharged state to a charged state.

Enumerated Embodiment 260: The method, structure, or secondary battery of any preceding Enumerated Embodiment, wherein the electrode structure comprises an anode active material selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, ZnCo2O4; (f) particles of graphite and carbon; (g) lithium metal; and (h) combinations thereof.

Enumerated Embodiment 261: The method, structure, or secondary battery of any preceding Enumerated Embodiment, wherein the electrode structure comprises an anode active material selected from the group consisting of silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd).

Enumerated Embodiment 262: The method, structure, or secondary battery of any preceding Enumerated Embodiment, wherein the electrode structure comprises an anode active material selected from the group consisting of alloys and intermetallic compounds of Si, Ge, Sn, Pb, Sb, Bi, Zn, Al, Ti, Ni, Co, or Cd with other elements.

Enumerated Embodiment 263: The method, structure, or secondary battery of any preceding Enumerated Embodiment, wherein the electrode structure comprises an anode active material selected from the group consisting of oxides, carbides, nitrides, sulfides, phosphides, selenides, and tellurides of Si, Ge, Sn, Pb, Sb, Bi, Zn, Al, Ti, Fe, Ni, Co, V, and Cd.

Enumerated Embodiment 264: The method, structure, or secondary battery of any preceding Enumerated Embodiment, wherein the electrode structure comprises an anode active material selected from the group consisting of oxides, carbides, nitrides, sulfides, phosphides, selenides, and tellurides of Si.

Enumerated Embodiment 265: The method, structure, or secondary battery of any preceding Enumerated Embodiment, wherein the electrode structure comprises an anode active material selected from the group consisting of silicon and the oxides and carbides of silicon.

Enumerated Embodiment 266: The method, structure, or secondary battery of any preceding Enumerated Embodiment, wherein the electrode structure comprises an anode active material comprising at least one of lithium metal, a lithium metal alloy, silicon, silicon alloy, silicon oxide, tin, tin alloy, tin oxide, and a carbon-containing material.

Enumerated Embodiment 267: The method, structure, or secondary battery of any preceding Enumerated Embodiment, wherein the electrode structure comprises an anode active material comprising at least one of silicon and silicon oxide.

Enumerated Embodiment 268: The method, structure, or secondary battery of any preceding Enumerated Embodiment, wherein the electrode structure comprises an anode active material comprising at least one of lithium and lithium metal alloy.

Enumerated Embodiment 269. The method, structure, or secondary battery according to any preceding Enumerated Embodiment, wherein the electrode structure comprises an anode active material comprising a carbon-containing material.

Enumerated Embodiment 270: method, structure, or secondary battery according to any preceding Enumerated Embodiment, wherein the electrode structure comprises an anode active material selected from the group consisting of graphite and carbon.

Enumerated Embodiment 271: The method, structure, or secondary battery of any preceding Enumerated Embodiment, wherein the electrically insulating separator comprises a microporous separator material permeated with a non-aqueous liquid electrolyte.

Enumerated Embodiment 272: The method, structure, or secondary battery of any preceding Enumerated Embodiment, wherein the electrically insulating separator comprises a solid state separator comprising a solid electrolyte.

Enumerated Embodiment 273: The method, structure, or secondary battery of any preceding Enumerated Embodiment, wherein the electrically insulating separator comprises a ceramic material, glass or garnet material.

Enumerated Embodiment 274: The method, structure, or secondary battery of any preceding Enumerated Embodiment, the electrode assembly comprising an electrolyte selected from the group consisting of non-aqueous liquid electrolytes, gel electrolytes, solid electrolytes and combinations thereof.

Enumerated Embodiment 275: The method, structure, or secondary battery of any preceding Enumerated Embodiment, wherein the electrode assembly comprises a liquid electrolyte.

Enumerated Embodiment 276: The method, structure, or secondary battery of any preceding Enumerated Embodiment, wherein the electrode assembly comprises an aqueous liquid electrolyte.

Enumerated Embodiment 277: The method, structure, or secondary battery of any preceding Enumerated Embodiment, wherein the electrode assembly comprises a non-aqueous liquid electrolyte.

Enumerated Embodiment 278: The method, structure, or secondary battery of any preceding Enumerated Embodiment, wherein the electrode assembly comprises a non-aqueous electrolyte comprising a mixture of a lithium salt and an organic solvent.

Enumerated Embodiment 279: The method, structure, or secondary battery of any preceding Enumerated Embodiment, wherein the electrode assembly comprises a gel electrolyte.

Enumerated Embodiment 280: The method, structure, or secondary battery of any preceding Enumerated Embodiment, wherein the electrically insulating separator comprises a solid electrolyte.

Enumerated Embodiment 281: The method, structure, or secondary battery of any preceding Enumerated Embodiment, wherein the electrically insulating separator comprises a solid electrolyte selected from the group consisting of sulfide-based electrolytes.

Enumerated Embodiment 282: The method, structure, or secondary battery of any preceding Enumerated Embodiment, wherein the electrically insulating separator comprises a solid electrolyte selected from the group consisting of lithium tin phosphorus sulfide (LSn), lithium phosphorus sulfide ($\beta$-Li3PS4) and lithium phosphorus sulfur chloride iodide (Li6PS5Cl0.9I0.1).

Enumerated Embodiment 283: The method, structure, or secondary battery of any preceding Enumerated Embodiment, wherein the electrically insulating separator comprises a solid electrolyte selected from the group consisting of oxide based electrolytes.

Enumerated Embodiment 284: The method, structure, or secondary battery of any preceding Enumerated Embodiment, wherein the electrically insulating separator comprises a solid electrolyte selected from the group consisting of lithium lanthanum titanate (Li0.34La0.56TiO3), Al-doped lithium lanthanum zirconate (Li6.24La3Zr2Al0.24O11.98), Ta-doped lithium lanthanum zirconate (Li6.4La3Zr1.4Ta0.6O12) and lithium aluminum titanium phosphate (Li1.4Al0.4Ti1.6(PO4)3).

Enumerated Embodiment 285: The method, structure, or secondary battery of any preceding Enumerated Embodiment, wherein the electrically insulating separator comprises a solid polymer electrolyte.

Enumerated Embodiment 286: The method, structure, or secondary battery of any preceding Enumerated Embodiment, wherein the electrically insulating separator comprises a polymer electrolyte selected from the group consisting of PEO-based polymer electrolyte, polymer-ceramic composite electrolyte (solid), polymer-ceramic composite electrolyte, and polymer-ceramic composite electrolyte.

Enumerated Embodiment 287: The method, structure, or secondary battery of any preceding Enumerated Embodiment, wherein the electrically insulating separator comprises a solid inorganic electrolyte.

Enumerated Embodiment 288: The method, structure, or secondary battery of any preceding Enumerated Embodiment, wherein the electrically insulating separator comprises a solid organic electrolyte.

Enumerated Embodiment 289: The method, structure, or secondary battery of any preceding Enumerated Embodiment, wherein the electrically insulating separator comprises a ceramic electrolyte.

Enumerated Embodiment 290: The method, structure, or secondary battery of any preceding Enumerated Embodiment, wherein the electrically insulating separator comprises an inorganic electrolyte.

Enumerated Embodiment 291: The method, structure, or secondary battery of any preceding Enumerated Embodiment, wherein the electrically insulating separator comprises a ceramic.

Enumerated Embodiment 292: The method, structure, or secondary battery of any preceding Enumerated Embodiment wherein the electrically insulating separator comprises a garnet material.

Enumerated Embodiment 293: The method, structure, or secondary battery of any preceding Enumerated Embodiment, comprising an electrolyte selected from the group consisting of aqueous electrolytes, a non-aqueous liquid electrolyte, a solid polymer electrolyte, a solid ceramic electrolyte, a solid glass electrolyte, a solid garnet electrolyte, a gel polymer electrolyte, an inorganic solid electrolyte, and a molten-type inorganic electrolyte.

Enumerated Embodiment 294: The method, structure, or secondary battery of any preceding Enumerated Embodiment, wherein counter-electrode structures comprise a cathodically active material comprising at least one of transition metal oxides, transition metal sulfides, transition metal nitrides, lithium-transition metal oxides, lithium-transition metal sulfides, lithium-transition metal nitrides, including transition metal oxides, transition metal sulfides, and transition metal nitrides having metal elements having a d-shell or f-shell, and/or where the metal element is any selected from Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au, $LiCoO_2$, LiNi0.5Mn1.5O4, Li(NixCoyAlz)O2, LiFePO4, Li2MnO4, V2O5, molybdenum oxysulfides, phosphates, silicates, vanadates, sulfur, sulfur compounds, oxygen (air), Li(NixMnyCoz)O2, lithium-containing compounds comprising metal oxides or metal phosphates, compounds comprising lithium, cobalt and oxygen (e.g., LiCoO2), compounds comprising lithium, manganese and oxygen (e.g., LiMn2O4) compounds comprising lithium iron and phosphate (e.g., LiFePO4), lithium manganese oxide, lithium cobalt oxide, lithium nickel oxide, lithium iron phosphate, lithium cobalt oxide (LiCoO2), lithium nickel oxide (LiNiO2), a substituted compound with one or more transition metals, lithium manganese oxide, Li1+xMn2−xO4 (where, x is 0 to 0.33), LiMnO3, LiMn2O3, LiMnO2, lithium copper oxide (Li2CuO2), vanadium oxide, LiV3O8, LiFe3O4, V2O5, Cu2V2O7, Ni site-type lithium nickel oxide represented by the chemical formula of LiNi1−xMxO2 (where, M=Co, Mn, Al, Cu, Fe, Mg, B or Ga, and x=0.01 to 0.3), lithium manganese complex oxide represented by the chemical formula of LiMn2−xMxO2 (where, M=Co, Ni, Fe, Cr, Zn or Ta, and x=0.01 to 0.1), Li2Mn3MO8 (where, M=Fe, Co, Ni, Cu or Zn), LiMn2O4 in which a portion of Li is substituted with alkaline earth metal ions, a disulfide compound, Fe2(MoO4)3, a lithium metal phosphate having an olivine crystal structure of Formula 2: Li1+aFe1−xM'x(PO4−b)Xb wherein M' is at least one selected from Al, Mg, Ni, Co, Mn, Ti, Ga, Cu, V, Nb, Zr, Ce, In, Zn, and Y, X is at least one selected from F, S, and N, $-0.55 \le a \le 5+0.5$, $0 \le x \le 0.5$, and $0 \le b \le 0.1$, LiFePO4, Li(Fe, Mn)PO4, Li(Fe, Co)PO4, Li(Fe, Ni)PO4, $LiCoO_2$, LiNiO2, LiMnO2, LiMn2O4, LiNi1−yCoyO2, LiCo1−yMnyO2, LiNi1−yMnyO2 ($0 \le y \le 1$), Li(NiaCobMnc)O4 ($0<a<2$, $0<b<2$, $0<c<2$, and $a+b+c=2$), LiMn2−zNizO4, LiMn2−zCozO4 ($0<z<2$), LiCoPO4 and LiFePO4, elemental sulfur (S8), sulfur series compounds, Li2Sn ($n \ge 1$), an organosulfur compound, a carbon-sulfur polymer ((C2Sx)n: x=2.5 to 50, $n \ge 2$), an oxide of lithium and zirconium, a composite oxide of lithium and metal (cobalt, manganese, nickel, or a combination thereof), LiaA1−bMbD2 (wherein, $0.90 \le a \le 1$, and $0 \le b \le 0.5$), LiaE1−bMbO2−cDc (wherein, $0.90 \le a \le 1$, $0 \le b \le 0.5$, and $0 \le c \le 0.05$), LiE2−bMbO4−cDc (wherein, $0 \le b \le 0.5$, and $0 \le c \le 0.05$), LiaNi1−b−cCobMcDa (wherein, $0.90 \le a \le 1$, $0 \le b \le 0.5$, $0 \le c \le 0.05$, and $0<a \le 2$), LiaNi1−b−cCobMcO2−aXa (wherein, $0.90 \le a \le 1$, $0 \le b \le 0.5$, $0 \le c \le 0.05$, and $0<a<2$), LiaNi1−b−cCobMcO2−aX2 (wherein, $0.90 \le a \le 1$, $0 \le b \le 0.5$, $0 \le c \le 0.05$, and $0<a<2$), LiaNi1−b−cMnbMcDa (wherein, $0.90 \le a \le 1$, $0 \le b \le 0.5$, $0 \le c \le 0.5$, and $0<a \le 2$), LiaNi1−b−cMnbMcO2−aXa (wherein, $0.90 \le a \le 1$, $0 \le b \le 0.5$, $0 \le c \le 0.5$, and $0<a<2$), LiaNi1−b−cMnbMcO2−aX2 (wherein, $0.90 \le a \le 1$, $0 \le b \le 0.5$, $0 \le c \le 0.5$, and $0<a<2$), LiaNibEcGdO2 (wherein, $0.90 \le a \le 1$, $0 \le b \le 0.9$, $0 \le c \le 0.5$, and $0.001 \le d \le 0.1$), LiaNibCocMndGeO2 (wherein, $0.90 \le a \le 1$, $0 \le b \le 0.9$, $0 \le c \le 0.5$, $0 \le d \times 0.5$, and $0.001 \le e \le 0.1$), LiaNiGbO2 (wherein, $0.90 \le a \le 1$ and $0.001 \le b \le 0.1$), LiaCoGbO2 (wherein, $0.90 \le a \le 1$ and $0.001 \le b \le 0.1$), LiaMnGbO2 (wherein, $0.90 \le a \le 1$ and $0.001 \le b \le 0.1$), LiaMn2GbO4 (wherein, $0.90 \le a \le 1$ and $0.001 \le b \le 0.1$), QO2, QS2, LiQS2, V2O5, LiV2O5, LiX'O2, LiNiVO4, Li(3−f)J2(PO4)3 ($0 \le f \le 2$); Li(3−f)Fe2(PO4)3 ($0 \le f \le 2$), LiFePO4. (A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof), LiCoO2, LiMnxO2x (x=1 or 2), LiNi1−xMnxO2x ($0<x<1$), LiNi1−x−yCoxMnyO2 ($0 \le x \le 0.5$, $0 \le y \le 0.5$), FePO4, a lithium compound, lithium cobalt oxide, lithium nickel oxide, lithium nickel cobalt oxide, lithium nickel cobalt aluminum oxide, lithium nickel cobalt manganese oxide, lithium manganese oxide, lithium iron phosphate (LiFePO4), nickel sulfide, copper sulfide, sulfur, iron oxide, vanadium oxide, a sodium containing material, an oxide of the formula NaM1aO2 (wherein M1 is at least one transition metal element, and 0≤a<1), NaFeO2, NaMnO2, NaNiO2, NaCoO2, an oxide represented by the formula NaMn1−aM1aO2 (wherein M1 is at least one transition metal element, and 0≤a<1), Na[Ni1/2Mn1/2]O2, Na2/3 [Fe1/2Mn1/2]O2, an oxide represented by Na0.44Mn1−aM1aO2 (wherein M1 is at least one transition metal element, and 0≤a<1), an oxide represented by Na0.7Mn1−aM1a O2.05 an (wherein M1 is at least one transition metal element, and 0≤a<1) an oxide represented by NabM2cSi12O30 (wherein M2 is at least one transition metal element, 2×b≤6, and 2≤c≤5), Na6Fe2Si12O30, Na2Fe5Si12O (wherein M2 is at least one transition metal element, 2≤b≤6, and 2≤c≤5), an oxide represented by NadM3eSi6O18 (wherein M3 is at least one transition metal element, 3≤d≤6, and 1≤e×2), Na2Fe2Si6O18, Na2MnFeSi6O18 (wherein M3 is at least one transition metal element, 3×d×6, and 1≤e≤2), an oxide represented by NafM4gSi2O6 (wherein M4 is at least one element selected from transition metal elements, magnesium (Mg) and aluminum (Al), 1≤f≤2 and 1≤g≤2), a phosphate, Na2FeSiO6, NaFePO4, Na3Fe2(PO4)3, Na3V2(PO4)3, Na4Co3(PO4)2P2O7, a borate, NaFeBO4 or Na3Fe2(BO4)3, a fluoride, NahM5F6 (wherein M5 is at least one transition metal element, and 2≤h≤3), Na3FeF6, Na2MnF6, a fluorophosphate, Na3V2(PO4)2F3, Na3V2(PO4)2FO2, NaMnO2, Na[Ni1/2Mn1/2]O2, Na2/3[Fe1/2Mn1/2]O2, Na3V2(PO4)3, Na4Co3(PO4)2P2O7, Na3V2(PO4)2F3 and/or Na3V2(PO4)2FO2, as well as any complex oxides and/or other combinations of the foregoing.

Enumerated Embodiment 295: The method, structure, or secondary battery of any preceding Enumerated Embodiment, wherein counter-electrode structures comprise a cathodically active material selected from the group consisting of intercalation chemistry positive electrode material and conversion chemistry positive electrode material.

Enumerated Embodiment 296: The method, structure, or secondary battery of any preceding Enumerated Embodiment, wherein counter-electrode structures comprise a cathodically active material selected from the group consisting of S (or Li2S in the lithiated state), LiF, Fe, Cu, Ni, FeF2, FeOdF3.2d, FeF3, CoF3, CoF2, CuF2, NiF2, where 0≤d≤0.5.

Enumerated Embodiment 297: The method, structure, or secondary battery of any preceding Enumerated Embodiment, wherein the counter-electrode structures comprise a cathodically active material comprising at least one of a transition metal oxide, transition metal sulfide, transition metal nitride, transition metal phosphate, and transition metal nitride.

Enumerated Embodiment 298: The method, structure, or secondary battery of any preceding Enumerated Embodiment, wherein counter-electrode structures comprise a cathodically active material comprising lithium iron phosphate (LiFePO4).

Enumerated Embodiment 299: The method, structure, or secondary battery of any preceding Enumerated Embodiment, wherein the counter-electrode structures comprise a cathodically active material comprising a transition metal oxide containing lithium and at least one of cobalt and nickel.

Enumerated Embodiment 300: The method, structure, or secondary battery of any preceding Enumerated Embodiment, wherein the electrode structures comprise anode structures comprising anode current collectors comprising at least one of copper, nickel, aluminum, stainless steel, titanium, palladium, baked carbon, calcined carbon, indium, iron, magnesium, cobalt, germanium, lithium a surface treated material of copper or stainless steel with carbon, nickel, titanium, silver, an aluminum-cadmium alloy, and/or alloys thereof.

Enumerated Embodiment 301: The method, structure, or secondary battery of any preceding Enumerated Embodiment, wherein the electrode structures comprise anode current collectors comprising at least one of copper, nickel, stainless steel and alloys thereof.

Enumerated Embodiment 302: The method, structure, or secondary battery of any preceding Enumerated Embodiment, wherein the counter-electrode structures comprise cathode structures comprising cathode current collectors comprising at least one of stainless steel, aluminum, nickel, titanium, baked carbon, sintered carbon, a surface treated material of aluminum or stainless steel with carbon, nickel, titanium, silver, and/or an alloy thereof.

Enumerated Embodiment 303: The method, structure, or secondary battery of any preceding Enumerated Embodiment, wherein the cathode current collectors comprise at least one of stainless steel, aluminum, nickel, titanium, baked carbon, sintered carbon, a surface treated material of aluminum or stainless steel with carbon, silver, or an alloy thereof.

Enumerated Embodiment 304: The method, structure, or secondary battery of any preceding Enumerated Embodiment, comprising a constraint system with first and second secondary growth constraints comprising any of stainless steel, titanium, or glass fiber composite.

Enumerated Embodiment 305: The method, structure, or secondary battery of any preceding Enumerated Embodiment, comprising a constraint system with first and second secondary growth constraints comprising stainless steel.

Enumerated Embodiment 306: The method, structure, or secondary battery of any preceding Enumerated Embodiment, comprising a constraint system with first and second secondary growth constraints comprising a coating of insulating material on inner and outer surfaces thereof.

Enumerated Embodiment 307: The method, structure, or secondary battery of any preceding Enumerated Embodiment, wherein the electrode assembly comprises at least 5 electrode structures and at least 5 counter-electrode structures.

Enumerated Embodiment 308: The method, structure, or secondary battery of any preceding Enumerated Embodiment, wherein the electrode assembly comprises at least 10 electrode structures and at least 10 counter-electrode structures.

Enumerated Embodiment 309: The method, structure, or secondary battery of any preceding Enumerated Embodiment, wherein the electrode assembly comprises at least 50 electrode structures and at least 50 counter-electrode structures.

Enumerated Embodiment 310: The method, structure, or secondary battery of any preceding Enumerated Embodiment, wherein the electrode assembly comprises at least 100 electrode structures and at least 100 counter-electrode structures.

Enumerated Embodiment 311: The method, structure, or secondary battery of any preceding Enumerated Embodiment, wherein the electrode assembly comprises at least 500 electrode structures and at least 500 counter-electrode structures.

Enumerated Embodiment 312: The method, structure, or secondary battery of any preceding Enumerated Embodiment, wherein the counter-electrode structures comprise counter-electrode current collectors comprising aluminum.

Enumerated Embodiment 313: A method of manufacturing the structure or secondary battery according to any preceding Enumerated Embodiment, comprising:

stacking the population of unit cells stacked in series in the stacking direction, wherein (i) each unit cell comprises the electrode structure, the counter-electrode structure, and the electrically insulating separator between the electrode and counter-electrode structures, (ii) the electrode structures, counter-electrode structures and electrically insulating separators within each unit cell have opposing first and second vertical end surfaces separated in the vertical direction, and (iii) the vertical direction is orthogonal to the stacking direction, and covering the first or second vertical end surface(s) of the electrode or the counter-electrode structure(s) of the members of the unit cell population with the porous electrically insulating material, the porous electrically insulating material having the porosity in the range of from 20% to 60%.

Enumerated Embodiment 314: The method according to any preceding Enumerated Embodiment, wherein the porous electrically insulating material is provided by coating the first or second end surfaces with a slurry or paste comprising particulate material binder material in a solvent, and evaporating the solvent to leave particulate material dispersed in the binder material on the first or second end surfaces.

Enumerated Embodiment 315: The method according to any preceding Enumerated Embodiment, wherein the binder material is soluble in the solvent, and the solvent is evaporated by heating and/or drying of the solvent by gas flow.

Enumerated Embodiment 316: The method according to any preceding Enumerated Embodiment, wherein solvent comprises any of N-methyl-2-pyrrolidone (NMP), heptane, octane, toluene, xylene, or mixed hydrocarbon solvents.

Enumerated Embodiment 317: The method according to any preceding Enumerated Embodiment, wherein the slurry and/or paste comprises at least 50 wt % of particulate material.

Enumerated Embodiment 318: The method according to any preceding Enumerated Embodiment wherein the slurry and/or paste comprises at least 55 wt % of particulate material.

Enumerated Embodiment 319: The method according to any preceding Enumerated Embodiment, wherein the slurry and/or paste comprises at least 60 wt % of particulate material.

Enumerated Embodiment 320: The method according to any preceding Enumerated Embodiment, wherein the slurry and/or paste comprises at least 65 wt % of particulate material.

Enumerated Embodiment 321: The method according to any preceding Enumerated Embodiment, wherein the slurry and/or paste comprises at least 70 wt % of particulate material.

Enumerated Embodiment 322: The method according to any preceding Enumerated Embodiment, wherein the slurry and/or paste comprises at least 75 wt % of particulate material.

Enumerated Embodiment 323: The method according to any preceding Enumerated Embodiment, wherein the slurry and/or paste comprises at least 80 wt % of particulate material.

Enumerated Embodiment 324: The method according to any preceding Enumerated Embodiment, wherein the slurry and/or paste comprises no more than 90 wt % of particulate material.

Enumerated Embodiment 325: The method according to any preceding Enumerated Embodiment, wherein the slurry and/or paste comprises no more than 85 wt % of particulate material.

Enumerated Embodiment 326: The method according to any preceding Enumerated Embodiment 9, wherein the slurry and/or paste comprises no more than 80 wt % of particulate material.

Enumerated Embodiment 327: The method according to any preceding Enumerated Embodiment, wherein the slurry and/or paste comprises no more than 75 wt % of particulate material.

Enumerated Embodiment 328: The method according to any preceding Enumerated Embodiment, further comprising:

connecting first and second secondary growth constraints separated in the vertical direction to members of the population of electrode structures, wherein the secondary growth constraint system at least partially restrains growth of the electrode assembly in the vertical direction upon cycling of the electrode assembly.

Enumerated Embodiment 329: The method according to any preceding Enumerated Embodiment, further comprising:

connecting first and second secondary growth constraints separated in the vertical direction to current collectors of members of the population of electrode structures, wherein the secondary growth constraint system at least partially restrains growth of the electrode assembly in the vertical direction upon cycling of the electrode assembly.

Enumerated Embodiment 330: The method according to any preceding Enumerated Embodiment, further comprising:

connecting first and second secondary growth constraints separated in the vertical direction to first and second opposing vertical end surfaces of members of the population of electrode structures.

Enumerated Embodiment 331: The method according to any preceding Enumerated Embodiment, further comprising:

connecting first and second secondary growth constraints separated in the vertical direction to first and second opposing vertical end surfaces of current collectors of members of the population of electrode structures.

Enumerated Embodiment 332: The method, structure, or secondary battery of any preceding Enumerated Embodiment, wherein first and second secondary growth constraints separated in the vertical direction are connected to members of the population of electrode structures, wherein the secondary growth constraint system at least partially restrains growth of the electrode assembly in the vertical direction upon cycling of the electrode assembly.

Enumerated Embodiment 333: The method, structure, or secondary battery according to any preceding Enumerated Embodiment, wherein first and second secondary growth constraints separated in the vertical direction are connected to current collectors of members of the population of electrode structures, wherein the secondary growth constraint system at least partially restrains growth of the electrode assembly in the vertical direction upon cycling of the electrode assembly.

Enumerated Embodiment 334: The method, structure, or secondary battery according to any preceding Enumerated Embodiment, wherein first and second secondary growth constraints separated in the vertical direction are connected to first and second opposing vertical end surfaces of members of the population of electrode structures.

Enumerated Embodiment 335: The method, structure, or secondary battery according to any preceding Enumerated Embodiment, wherein first and second secondary growth constraints separated in the vertical direction are connected to first and second opposing vertical end surfaces of current collectors of members of the population of electrode structures.

Enumerated Embodiment 336: The method, structure, or secondary battery according to any preceding Enumerated Embodiment, wherein the first and second secondary growth constraints comprising apertures formed through respective vertical thicknesses thereof.

INCORPORATION BY REFERENCE

All publications and patents mentioned herein, including those items listed below, are hereby incorporated by reference in their entirety for all purposes as if each individual publication or patent was specifically and individually incorporated by reference. In case of conflict, the present application, including any definitions herein, will control.

EQUIVALENTS

While specific embodiments have been discussed, the above specification is illustrative, and not restrictive. Many variations will become apparent to those skilled in the art upon review of this specification. The full scope of the embodiments should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained.

What is claimed is:

1. A structure for energy storage, the structure comprising an electrode assembly, a first endplate opposing, and separated from, a second endplate, the electrode assembly comprising:
   (a) an electrically insulating material;
   (b) a population of unit cells stacked along a stacking direction, unit cells of the population of unit cells being electrically coupled with each other in series, the stacking direction opposing, or in a direction of, a longitudinal direction, the population of unit cells having a first longitudinal end surface opposing to, and separated from, a second longitudinal end surface, the first longitudinal end surface and the second longitudinal end surface being stacked along the stacking direction, the first endplate and the second endplate being stacked along the stacking direction, the first endplate vertically overlapping the first longitudinal end surface, the second endplate vertically overlapping the second longitudinal end surface,
   each unit cell of the population of unit cells comprising an electrode structure separated from a counter-electrode structure, and a separator comprising the electrically insulating material disposed between the electrode structure and the counter-electrode structure, the electrode structure, the counter-electrode structure, and the separator, each having a first end surface opposing to, and vertically separated from, a second end surfaces, a vertical direction being orthogonal to the stacking direction, an endplate comprising a vertical thickness along the vertical direction and an inner portion coupled with opposing outer portions separated vertically along the endplate,
   the first endplate comprising a first vertical thickness having a first maximum thickness and a first inner portion coupled with opposing first outer portions separated vertically along the first endplate, a vertical thickness of the first inner portion (i) being greater than a vertical thickness of any of the first outer portions and (ii) coinciding with the first maximum thickness, the second endplate comprising a second vertical thickness having a second maximum thickness and a second inner portion coupled with opposing second outer portions separated vertically along the second endplate, a vertical thickness of the second inner portion (iii) being greater than a vertical thickness of any of the second outer portions and (iv) coinciding with the second maximum thickness; and
   (c) a porous electrically insulating material at least partially covering the first longitudinal end surface and/or the second longitudinal end surface, the porous electrically insulating material being configured to allow transit of carrier ions therethrough to the first end surface and to the second end surface.

2. The structure of claim 1, wherein the stacking direction is along a stacking axis, the structure further comprising a constraint system coupled with the population of unit cells at opposing sides of the population of unit cells, the opposing sides being along an axis normal to the stacking axis.

3. The structure of claim 2, wherein the constraint system comprises apertures.

4. The structure of claim 3, wherein an aperture opening has a long axis disposed along the stacking direction, the aperture opening being of the apertures.

5. The structure of claim 3, wherein the apertures are evenly spaced along a portion of the constraint system.

6. The structure of claim 3, wherein the constraint system comprises a set of opposing constraints.

7. The structure of claim 6, wherein the opposing constraints of the set of opposing constraints are separated from each other by a gap.

8. The structure of claim 3, wherein the constraint system is configured to restrict endplates from separating from the constraint system and away from the population of unit cells, the endplates comprising the first endplate or the second endplate.

9. The structure of claim 3, wherein the constraint system is configured to restrict the first endplate and the second endplate from separating from the constraint system and away from the population of unit cells, when the population of unit cells are under compressive pressure.

10. The structure of claim 3, wherein the constraint system comprises at least one aperture through which the porous electrically insulating material is visible.

11. The structure of claim 2, wherein the constraint system comprises at least one aperture having an oblong shaped lateral cross section.

12. The structure of claim 1, wherein the porous electrically insulating material is configured to allow transit of carrier ions therethrough.

13. The structure of claim 1, wherein the porous electrically insulating material is configured to allow transfer of the carrier ions to replenish the carrier ions in the electrode assembly during an initial formation process and/or during cycling between charged and discharged states.

14. The structure of claim 13, wherein the porous electrically insulating material is configured to allow transfer of the carrier ions to replenish the carrier ions in the electrode assembly during an initial formation process.

15. The structure of claim 1, further comprising bumpers configured to adjust compressive pressure in the structure.

16. The structure of claim 1, wherein the porous electrically insulating material comprises a ceramic.

17. The structure of claim 1, wherein the porous electrically insulating material comprises a polymer.

18. The structure of claim 1, wherein the electrode structure comprises a current collector folded along the stacking direction to connect with an electrode busbar.

19. The structure of claim 18, wherein the electrode structure comprises a current collector folded towards the stacking direction to connect with an electrode busbar.

20. The structure of claim 18, wherein each unit cell of the population of the unit cells comprises the electrode structure comprising the current collector folded towards the stacking direction to connect with the electrode busbar.

* * * * *